United States Patent
Tsusaka et al.

(10) Patent No.: US 8,423,188 B2
(45) Date of Patent: Apr. 16, 2013

(54) CONTROL APPARATUS AND CONTROL METHOD FOR ROBOT ARM, ROBOT, CONTROL PROGRAM FOR ROBOT ARM, AND INTEGRATED ELECTRONIC CIRCUIT

(75) Inventors: Yuko Tsusaka, Osaka (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 12/918,897

(22) PCT Filed: Dec. 24, 2009

(86) PCT No.: PCT/JP2009/007155
§ 371 (c)(1),
(2), (4) Date: Aug. 23, 2010

(87) PCT Pub. No.: WO2010/079564
PCT Pub. Date: Jul. 15, 2010

(65) Prior Publication Data
US 2011/0015785 A1    Jan. 20, 2011

(30) Foreign Application Priority Data
Jan. 9, 2009    (JP) .................................. 2009-003166

(51) Int. Cl.
*G05B 19/042*    (2006.01)
*B25J 13/08*    (2006.01)
(52) U.S. Cl.
USPC ............ 700/253; 700/250; 700/254; 901/46; 901/50; 901/4

(58) Field of Classification Search ........................ 901/4
See application file for complete search history.

(56) References Cited

U.S. PATENT DOCUMENTS

| 4,132,938 A * | 1/1979 | Sano et al. ................. 318/568.1 |
| 5,214,858 A * | 6/1993 | Pepper et al. .................. 33/558 |
| 6,222,338 B1 * | 4/2001 | Villaret .................... 318/568.13 |
| 7,558,647 B2 | 7/2009 | Okazaki |
| 7,751,938 B2 | 7/2010 | Tsusaka et al. |
| 2007/0156157 A1 * | 7/2007 | Nahum et al. ................. 606/130 |

FOREIGN PATENT DOCUMENTS
JP    59-157715    9/1984
JP    10-249769    9/1998
(Continued)

OTHER PUBLICATIONS

International Search Report issued Feb. 23, 2010 in International (PCT) Application No. PCT/JP2009/007155.

(Continued)

*Primary Examiner* — Khoi Tran
*Assistant Examiner* — Ryan Rink
(74) *Attorney, Agent, or Firm* — Wenderoth, Lind & Ponack, L.L.P.

(57) ABSTRACT

After switching a control method for a robot arm based upon characteristic information containing pieces of information relating to a grabbed position of the robot arm by a person and a presence/absence of detection of a force as well as to presence/absence of influences from a drag, during an operation of the robot arm, by a control method switching unit, information relating to the force of operation information is corrected by an operation correcting unit in response to a manipulation of the person.

19 Claims, 34 Drawing Sheets

FOREIGN PATENT DOCUMENTS

| | | |
|---|---|---|
| JP | 2005-306546 | 11/2005 |
| JP | 2007-136588 | 6/2007 |
| JP | 2007-168000 | 7/2007 |
| WO | 2007/080733 | 7/2007 |
| WO | 2009/004772 | 1/2009 |

OTHER PUBLICATIONS

International Preliminary Report on Patentability and Written Opinion of the International Searching Authority issued Aug. 25, 2011 in International (PCT) Application No. PCT/JP2009/007155.

* cited by examiner

Fig. 5

| JOB ID | OPERATION ID | POSITION AND ORIENTATION (m) $(x,y,z,\phi,\theta,\psi)$ | FORCE (N) $(f_x, f_y, f_z, f_\phi, f_\theta, f_\psi)$ | FLAG (32 bits) | HAND | TIME (sec) | CORRECTION PARAMETER FLAG (32 bit) | PROGRESS INFORMATION |
|---|---|---|---|---|---|---|---|---|
| : | : | : | : | : | : | : | : | : |
| 1 | 1 | 0.1,0.1,0, 0,0,0 | 0,0.5,0,0,0,0 | 0,1,3,4,5,8 bit:1 | 1 | 0.37 | 8th bit:1 THE REST:0 | 1 |
| 1 | 2 | 0.1,0.2,0, 0,0,0 | 0,0.5,0,0,0,0 | 0,1,3,4,5,8 bit:1 | 1 | 0.37 | 8th bit:1 THE REST:0 | 0 |
| : | : | : | : | : | : | : | : | : |
| 1 | 7 | 0.2,0.2,0, 0,0,0 | 0,0.5,0,0,0,0 | 0,1,3,4,5,8 bit:1 | 1 | 0.37 | 8th bit:1 THE REST:0 | 0 |
| 1 | 8 | 0.2,0.1,0, 0,0,0 | 0,0.5,0,0,0,0 | 0,1,3,4,5,8 bit:1 | 1 | 0.37 | 8th bit:1 THE REST:0 | 0 |
| : | : | : | : | : | : | : | : | : |
| 2 | 1 | 0.1,0.1,0.4, 0,0,0 | | 0-5 bit:1 THE REST:0 | | | 0,1,2 bit:1 THE REST:0 | |
| 2 | 2 | 0.1,0.2,0.4, 0,0,0 | | 0-5 bit:1 THE REST:0 | | | 0,1,2 bit:1 THE REST:0 | |
| : | : | : | : | : | : | : | : | : |
| 2 | 8 | 0.2,0.2,0.4, 0,0,0 | | 0-5 bit:1 THE REST:0 | | | 0,1,2 bit:1 THE REST:0 | |
| : | : | : | : | : | : | : | : | : |

Fig. 6

| BIT NUMBER | 31 | ... | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|
| | | | | UNUSED | | | | | | $f_\psi$ | $f_\theta$ | $f_\phi$ | $f_z$ | $f_y$ | $f_x$ | $\psi$ | $\theta$ | $\phi$ | z | y | x |
| VALUE | 0 | ... | 0 | 0 | 0 | 0 | 0 | 0 | 0 | 0 | 0 | 0 | 1 | 0 | 0 | 1 | 1 | 1 | 0 | 1 | 1 |

Bits 6–11: FORCE
Bits 0–5: POSITION-ORIENTATION

Fig. 7

| BIT NUMBER | 31 | ... | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|
| | | | | UNUSED | | | | | | $f_\psi$ | $f_\theta$ | $f_\phi$ | $f_z$ | $f_y$ | $f_x$ | $\psi$ | $\theta$ | $\phi$ | z | y | x |
| VALUE | 0 | ... | | | | 0 | 0 | 0 | 0 | 0 | 0 | 0 | 1 | 0 | 0 | 1 | 1 | 1 | 0 | 1 | 1 |

Bits 0–5: POSITION-ORIENTATION
Bits 6–11: FORCE

Fig. 9A

| GRABBED POSITION ID | PRESENCE/ABSENCE OF DETECTION | PRESENCE/ABSENCE OF POSSIBILITY OF INFLUENCES FROM DRAG |
|---|---|---|
| 1 | 0 | 1 |
| 2 | 0 | 1 |
| 3 | 1 | 1 |
| 4 | 1 | 1 |

| GRABBED POSITION ID | GRABBED POSITION |
|---|---|
| 1 | UPPER ARM |
| 2 | FORE-ARM |
| 3 | WRIST |
| 4 | HAND |

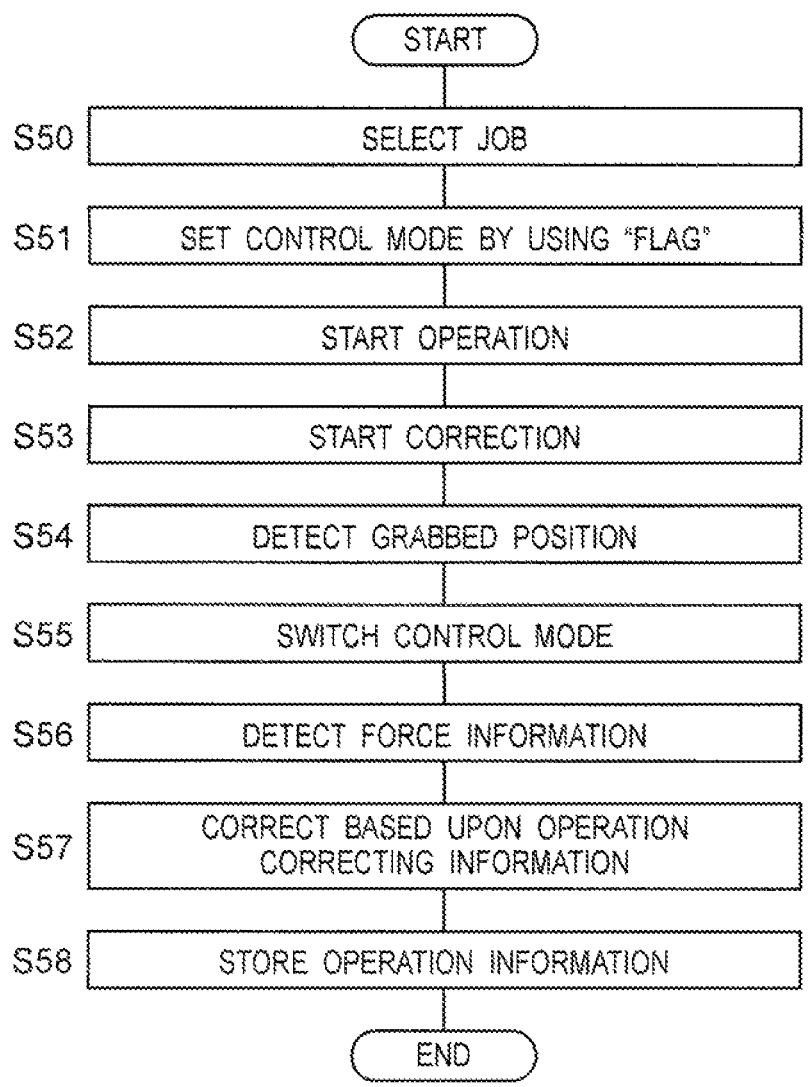

Fig.20A

| CALCULATION METHOD | FLAG |
|---|---|
| MAXIMUM | 0 |
| MINIMUM | 0 |
| AVERAGE | 0 |
| SUMMED | 1 |
| WEIGHTED | 0,4 |

Fig.20B

| | ID 1 | ID 2 | ID 3 |
|---|---|---|---|
| CALCULATION METHOD | FLAG | FLAG | FLAG |
| MAXIMUM | 0 | 0 | 1 |
| MINIMUM | 0 | 1 | 0 |
| AVERAGE | 0 | 0 | 0 |
| SUMMED | 1 | 0 | 1 |
| WEIGHTED | 0 | 0 | 0 |

Fig.20C

| COEFFICIENT ID | COEFFICIENT |
|---|---|
| 1 | 0.2,0.8 |
| 2 | 0.4,0.6 |
| 3 | 0.7,0.2,0.1 |
| 4 | 0.6,0.4 |

Fig.24

| JOB ID | ROBOT ID | OPERATION ID | POSITION AND ORIENTATION (m) (x,y,z,φ,θ,ψ) | FORCE (N) (fx, fy, fz, fφ, fθ, fψ) | FLAG (32 bits) | HAND | TIME (sec) | CORRECTION PARAMETER FLAG (32 bit) | PROGRESS INFORMATION |
|---|---|---|---|---|---|---|---|---|---|
| : | : | : | : | : | : | : | : | : | : |
| 1 | 1 | 1 | 0.1,0.1,0, 0,0,0 | 0,0,5,0,0,0 | 0,1,3,4,5,8 bit:1 | 1 | 0.37 | 8th bit:1 THE REST:0 | 1 |
| 1 | 2 | 1 | 0.1,0.1,0, 0,0,0 | 0,0,5,0,0,0 | 0,1,3,4,5,8 bit:1 | 1 | 0.37 | 8th bit:1 THE REST:0 | 1 |
| 1 | 1 | 2 | 0.1,0.2,0, 0,0,0 | 0,0,5,0,0,0 | 0,1,3,4,5,8 bit:1 | 1 | 0.37 | 8th bit:1 THE REST:0 | 0 |
| 1 | 2 | 2 | 0.1,0.2,0, 0,0,0 | 0,0,5,0,0,0 | 0,1,3,4,5,8 bit:1 | 1 | 0.37 | 8th bit:1 THE REST:0 | 0 |
| : | : | : | : | : | : | : | : | : | : |
| 1 | 1 | 7 | 0.2,0.2,0, 0,0,0 | 0,0,5,0,0,0 | 0,1,3,4,5,8 bit:1 | 1 | 0.37 | 8th bit:1 THE REST:0 | 0 |
| 1 | 2 | 7 | 0.2,0.2,0, 0,0,0 | 0,0,5,0,0,0 | 0,1,3,4,5,8 bit:1 | 1 | 0.37 | 8th bit:1 THE REST:0 | 0 |
| 1 | 1 | 8 | 0.2,0.1,0, 0,0,0 | 0,0,5,0,0,0 | 0,1,3,4,5,8 bit:1 | 1 | 0.37 | 8th bit:1 THE REST:0 | 0 |
| 1 | 2 | 8 | 0.2,0.1,0, 0,0,0 | 0,0,5,0,0,0 | 0,1,3,4,5,8 bit:1 | 1 | 0.37 | 8th bit:1 THE REST:0 | 0 |
| : | : | : | : | : | : | : | : | : | : |

Fig.25A

| ROBOT ID | GRABBED POSITION ID | PRESENCE/ABSENCE OF DETECTION | PRESENCE/ABSENCE OF POSSIBILITY OF INFLUENCES FROM DRAG |
|---|---|---|---|
| 1 | 1 | 0 | 1 |
| 1 | 2 | 0 | 1 |
| 1 | 3 | 1 | 1 |
| 1 | 4 | 1 | 1 |
| 2 | 1 | 0 | 1 |
| 2 | 2 | 0 | 1 |
| 2 | 3 | 1 | 1 |
| 2 | 4 | 1 | 1 |

*Fig.25B*

| GRABBED POSITION ID | GRABBED POSITION |
|---|---|
| 1 | UPPER ARM |
| 2 | FORE-ARM |
| 3 | WRIST |
| 4 | HAND |

*Fig.26A*

| CALCULATION METHOD | FLAG |
|---|---|
| MAXIMUM | 0 |
| MINIMUM | 0 |
| AVERAGE | 0 |
| SUMMED | 1 |
| WEIGHTED | 0,4 |

*Fig.26B*

| | ID 1 | ID 2 | ID 3 |
|---|---|---|---|
| CALCULATION METHOD | FLAG | FLAG | FLAG |
| MAXIMUM | 0 | 0 | 1 |
| MINIMUM | 0 | 1 | 0 |
| AVERAGE | 0 | 0 | 0 |
| SUMMED | 1 | 0 | 1 |
| WEIGHTED | 0 | 0 | 0 |

Fig.26C

| COEFFICIENT ID | COEFFICIENT |
|---|---|
| 1 | 0.2,0.8 |
| 2 | 0.4,0.6 |
| 3 | 0.7,0.2,0.1 |
| 4 | 0.6,0.4 |

Fig.30A

| GRABBED POSITION ID | PRESENCE/ABSENCE OF DETECTION | PRESENCE/ABSENCE OF POSSIBILITY OF INFLUENCES FROM DRAG |
|---|---|---|
| 1 | 0 | 1 |
| 2 | 1 | 0 |
| 3 | 1 | 1 |
| 4 | 1 | 1 |

Fig.30B

| GRABBED POSITION ID | GRABBED POSITION |
|---|---|
| 1 | UPPER ARM |
| 2 | FORE-ARM |
| 3 | WRIST |
| 4 | HAND |

Fig.31A

| GRABBED POSITION ID | PRESENCE/ABSENCE OF DETECTION | PRESENCE/ABSENCE OF POSSIBILITY OF INFLUENCES FROM DRAG |
|---|---|---|
| 1 | 1 | 1 |
| 2 | 1 | 1 |
| 3 | 1 | 1 |
| 4 | 1 | 1 |

*Fig.31B*

| GRABBED POSITION ID | GRABBED POSITION |
|---|---|
| 1 | UPPER ARM |
| 2 | FORE-ARM |
| 3 | WRIST |
| 4 | HAND |

CONTROL APPARATUS AND CONTROL METHOD FOR ROBOT ARM, ROBOT, CONTROL PROGRAM FOR ROBOT ARM, AND INTEGRATED ELECTRONIC CIRCUIT

TECHNICAL FIELD

The present invention relates to a control apparatus and a control method for a robot arm, used for generating operations of a robot as well as for teaching the operations to the robot, a robot provided with such a control apparatus for a robot arm, a control program for a robot arm, and an integrated electronic circuit.

BACKGROUND ART

In recent years, house-service robots, such as nursing robots or housekeeping support robots, have been vigorously developed. Different from the industrial robot, the house-service robot is manipulated by amateurs in home; therefore, it is necessary to easily teach operations to the robot. Moreover, since there are various operation environments in which the robot carries out a job depending on homes, it is necessary for the robot to flexibly adjust to the corresponding home environment.

For example, a teaching method for the robot device has been proposed in which a force sensor is attached to the wrist or the like of a robot, and a teaching person directly grabs a handle attached to the tip of the force sensor, and directs the robot to teaching points so that teaching processes for the positions of the robot are carried out (see Patent Document 1).

PRIOR ART DOCUMENTS

Patent Document 1: JP-A No. 59-157715

SUMMARY OF THE INVENTION

Issues to be Solved by the Invention

In Patent Document 1, however, since all the teaching points need to be taught by the teaching person, the teaching process takes long time, resulting in time-consuming troublesome tasks. Moreover, in the industrial field, upon revising one portion of taught movements, the revision needs to be made through a programming process by using a remote control apparatus referred to as a teaching pendant, or all the operations need to be, taught all over again from the beginning, failing to provide an efficient process.

In particular, in the case of a house-service robot, the teaching time needs to be made as short as possible. Moreover, a combined use of the programming process by the remote control apparatus such as the teaching pendant causes an increase in manipulation steps, and learning of programming languages is required, with the result that this method becomes very difficult for amateurs at home.

Moreover, the home environment varies from moment to moment, and it is difficult to predict all the environmental variations at the time of teaching, and even if the detections can be made by providing many censors, there is a possibility of erroneous operations when the detection precision is not 100%.

Furthermore, in the industrial robot, a teaching job for teaching operations to the robot and a main job actually carried out by the robot are clearly divided, and carried out respectively; however, in the house-service robot, since an amateur at home carries out the manipulation, it is difficult to carry out the teaching job and the actual job in a separate manner, resulting in troublesome tasks (see Patent Document 1).

Therefore, in association with a robot in operation, a person recognizes a circumstance, and by transmitting the recognition to the robot each time it becomes possible to manipulate the robot without making the person conscious about the teaching job, and even in a case where an environmental fluctuation that was not predicted at the time of teaching occurs, the person is allowed to teach the fluctuation each time so that it becomes possible to operate the robot.

For example, a wiping job is a cleaning job to be carried out by applying a certain force to a stained surface so as to remove the stain. In a case where, midway during a wiping job executed by the robot, a person finds a badly stained portion, and when the person directly grabs the robot and instructs how to apply a force thereto so as to carry out the wiping job more strongly, the operation of the robot is controlled so as to carry out the wiping job more strongly.

Since the wiping job is a job to rub a stain off by applying a certain degree of force, it is possible to allow the robot to carry out the job with higher precision, by controlling it with a force being set as a target value, rather than by controlling the robot with a position being set as a target value. In this job the job is carried out with the force being set as the target value; therefore, in a case where, for example, the person directly grabs the robot and instructs the robot how to apply a force so as to carry out the wiping job more strongly, an issue is raised in that it is not distinguishable whether the force applied by the person is actually the force applied by the person, or a force cause by an external disturbance, such as a drag from the contact surface (stained surface).

In a case where a force sensor or the like is attached to the robot arm so as to detect a force applied by a person, it is preliminarily determined which portion of the robot is grabbed upon carrying out a teaching process in the case of an industrial robot, for example, a handle (handle portion) or the like, formed on the robot arm, and by installing a force sensor or the like in the handle portion, the force applied by a person is detected. However, in a home as shown in FIG. 18, in such cases where (a) an obstacle 99 or the like is located at the handle portion with the result that the person grabs a portion other than the handle portion so as to carry out manipulation, where (b) a plurality of persons carry out manipulations simultaneously, and where (c) the person grabs a plurality of portions by using both of the hands, it is not possible to detect the force applied by the person correctly.

In view of these issues, an object of the present invention is to provide a control apparatus and a control method for a robot arm that achieve a robot controlling process by which the operator can easily carry out a teaching process on the robot in a short period of time, even in the event of an unpredictable environmental fluctuation, as well as a robot, a control program for a robot arm and an integrated electronic circuit for use in such a method.

Means for Solving the Issues

In order to achieve the above-mentioned objective, the present invention has the following structures:

According to a first aspect of the present invention, there is provided a control apparatus for a robot arm, which controls an operation of the robot arm so as to carry out a job by using the robot arm, comprising:

an operation information acquiring unit that acquires operation information relating to the operation of the robot arm;

a grabbed position detection unit that, when a person grabs the robot arm, detects a grabbed position of the robot arm by the person;

a characteristic information acquiring unit that acquires pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position;

a control method switching unit that switches control methods of the robot arm depending on the grabbed position detected by the grabbed position detection unit and the characteristic information acquired by the characteristic information acquiring unit; and an operation correcting unit that, during the operation of the robot arm based upon the operation information acquired by the operation information acquiring unit, after the control method has been switched by the control method switching unit in accordance with the grabbed position and the characteristic information, corrects information relating to a force of the operation information acquired by the operation information acquiring unit in response to a manipulation of the person, wherein, based upon the operation information corrected by the operation correcting unit, the operation of the robot arm is controlled.

According to a 10th aspect of the present invention, there is provided a control method for a robot arm, which controls an operation of a robot arm so that a job is carried out by the robot arm, comprising:

acquiring operation information relating to the operation of the robot arm by using an information acquiring unit;

when a person grabs the robot arm, detecting a grabbed position of the robot arm by the person by using a grabbed position detection unit;

acquiring pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position, by using a characteristic information acquiring unit;

switching control methods, of the robot arm depending on the grabbed position detected by the grabbed position detection unit and the characteristic information acquired by the characteristic information acquiring unit, by using a control method switching unit;

during the operation of the robot arm based upon the operation information acquired by the operation information acquiring unit, after the control method has been switched by the control method switching unit in accordance with the grabbed position and the characteristic information, correcting information relating to a force of the operation information acquired by the operation information acquiring unit in response to a manipulation of the person, by using an operation correcting unit; and based upon the operation information corrected by the operation correcting unit, controlling the operation of the robot arm.

According to a 12th aspect of the present invention, there is provided a control program for a robot arm, which controls an operation of a robot arm so that a job is carried out by the robot arm, allowing a computer to execute steps of:

acquiring operation information relating to the operation of the robot arm by using an information acquiring unit;

when a person grabs the robot arm, detecting grabbed position of the robot arm by the person by using a grabbed position detection unit;

acquiring pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position, by using a characteristic information acquiring unit;

switching control methods of the robot arm depending on the grabbed position detected by the grabbed position detection unit and the characteristic information acquired by the characteristic information acquiring unit, by using a control method switching unit;

during the operation of the robot arm based upon the operation information acquired by the operation information acquiring unit, after the control method has been switched by the control method switching unit in accordance with the grabbed position and the characteristic information, correcting information relating to a force of the operation information acquired by the operation information acquiring unit in response to a manipulation of the person, by using an operation correcting unit; and based upon the operation information corrected by the operation correcting unit, controlling the operation of the robot arm.

According to a 13th aspect of the present invention, there is provided an integrated electronic circuit for a robot arm, which controls an operation of a robot arm so that a job is carried out by the robot arm, comprising operation steps of:

acquiring operation information relating to the operation of the robot arm by using an information acquiring unit;

when a person grabs the robot arm, detecting a grabbed position of the robot arm by the person by using a grabbed position detection unit;

acquiring pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position, by using a characteristic information acquiring unit;

switching control methods of the robot arm depending on the grabbed position detected by the grabbed position detection unit and the characteristic information acquired by the characteristic information acquiring unit, by using a control method switching unit;

during the operation of the robot arm based upon the operation information acquired by the operation information acquiring unit, after the control method has been switched by the control method switching unit in accordance with the grabbed position and the characteristic information, correcting information relating to a force of the operation information acquired by the operation information acquiring unit in response to a manipulation of the person, by using an operation correcting unit; and based upon the operation information corrected by the operation correcting unit, controlling the operation of the robot arm.

Effects of the Invention

As described above, in accordance with the control apparatus for a robot arm and the robot of the present invention, since the operation information acquiring unit, the grabbed position detection unit, the characteristic information acquiring unit, the control method switching unit and the operation correcting unit are prepared, it is possible to carry out a robot controlling operation by which, even when any portion of the robot arm is grabbed by a person, the operation of the robot, described in operation information, can be easily corrected. That is, by switching the control method of the robot arm based upon characteristic information containing pieces of information relating to a presence/absence of detection of the grabbed position and the applied force of the robot arm by the person, as well as relating to a presence/absence of influences from a drag, and, after the switching has been made in the control method switching unit based upon the grabbed position and the characteristic information, during an operation of the robot arm based upon operation information, the information relating to a force of the operation information can be corrected by the operation correcting unit in response to a manipulation by the person.

Moreover, in accordance with the control method for a robot arm, the control program for the robot arm and the integrated electronic circuit, after the switching has been made in the control method switching unit switches the control method of the robot arm based upon characteristic information containing pieces of information relating to a presence/absence of detection of the grabbed position of the robot arm by the person, as well as relating to a presence/absence of influences from a drag, even when any portion of the robot arm is grabbed by a person during an operation of the robot arm, it is possible to carry out a robot controlling operation by which the information relating to a force of operation information can be corrected by the operation correcting unit, in response to a manipulation of the person.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5 is an explanatory view showing a list of operation information of an operation information database of the control apparatus for a robot of the first embodiment of the present invention;

FIG. 6 is an explanatory view showing flag information of the operation information database of the control apparatus for a robot of the first embodiment of the present invention;

FIG. 7 is an explanatory view showing information relating to correction parameter flags of the operation information database of the control apparatus for a robot of the first embodiment of the present invention;

FIG. 9A is an explanatory view showing a list of a force detection unit characteristic database of the control apparatus for a robot of the first embodiment of the present invention;

FIG. 17 is a flow chart showing operation steps of an operation correction unit, an operation instruction unit, an operation storage unit, the control method switching unit, a grabbed position detection unit and a control parameter managing unit of the control apparatus for a robot in the first embodiment of the present invention;

FIG. 20A is an explanatory view showing a list of a force calculation method table to be used in a force calculation unit of the control apparatus for a robot in the second embodiment of the present invention;

FIG. 20B is an explanatory view showing the list of a force calculation method table to be used in force calculation unit of the control apparatus for a robot in the second embodiment of the present invention;

FIG. 20C is an explanatory view showing the list of a force calculation method table to be used in a force calculation unit of the control apparatus for a robot in the second embodiment of the present invention;

FIG. 24 is an explanatory view showing a list of operation information of an operation information database of the control apparatus for a robot of the third embodiment of the present invention;

FIG. 25A is an explanatory view showing a list of a force detection unit characteristic database of the control apparatus for a robot of the third embodiment of the present invention;

FIG. 25B is an explanatory view showing the list of a force detection unit characteristic database of the control apparatus for a robot of the third embodiment of the present invention;

FIG. 26A is an explanatory view showing a list of a force calculation method table to be used in a force calculation unit of the control apparatus for a robot in the third embodiment of the present invention;

FIG. 26B is an explanatory view showing the list of a force calculation method table to be used in a force calculation unit of the control apparatus for a robot in the third embodiment of the present invention;

FIG. 26C is an explanatory view showing the list of a force calculation method table to be used in a force calculation unit of the control apparatus for a robot in the third embodiment of the present invention;

FIG. 30A is an explanatory view showing a list of a force detection unit characteristic database of the control apparatus for a robot of the first embodiment of the present invention;

FIG. 30B is an explanatory view showing the list of a force detection unit characteristic database of the control apparatus for a robot arm of the first embodiment of the present invention;

FIG. 31A is an explanatory view showing a list of a force detection unit characteristic database of the control apparatus for a robot of the first embodiment of the present invention; and FIG. 31B is an explanatory view showing the list of a force detection unit characteristic database of the control apparatus for a robot arm of the first embodiment of the present invention.

DESCRIPTION OF THE EMBODIMENTS

Figure 1:
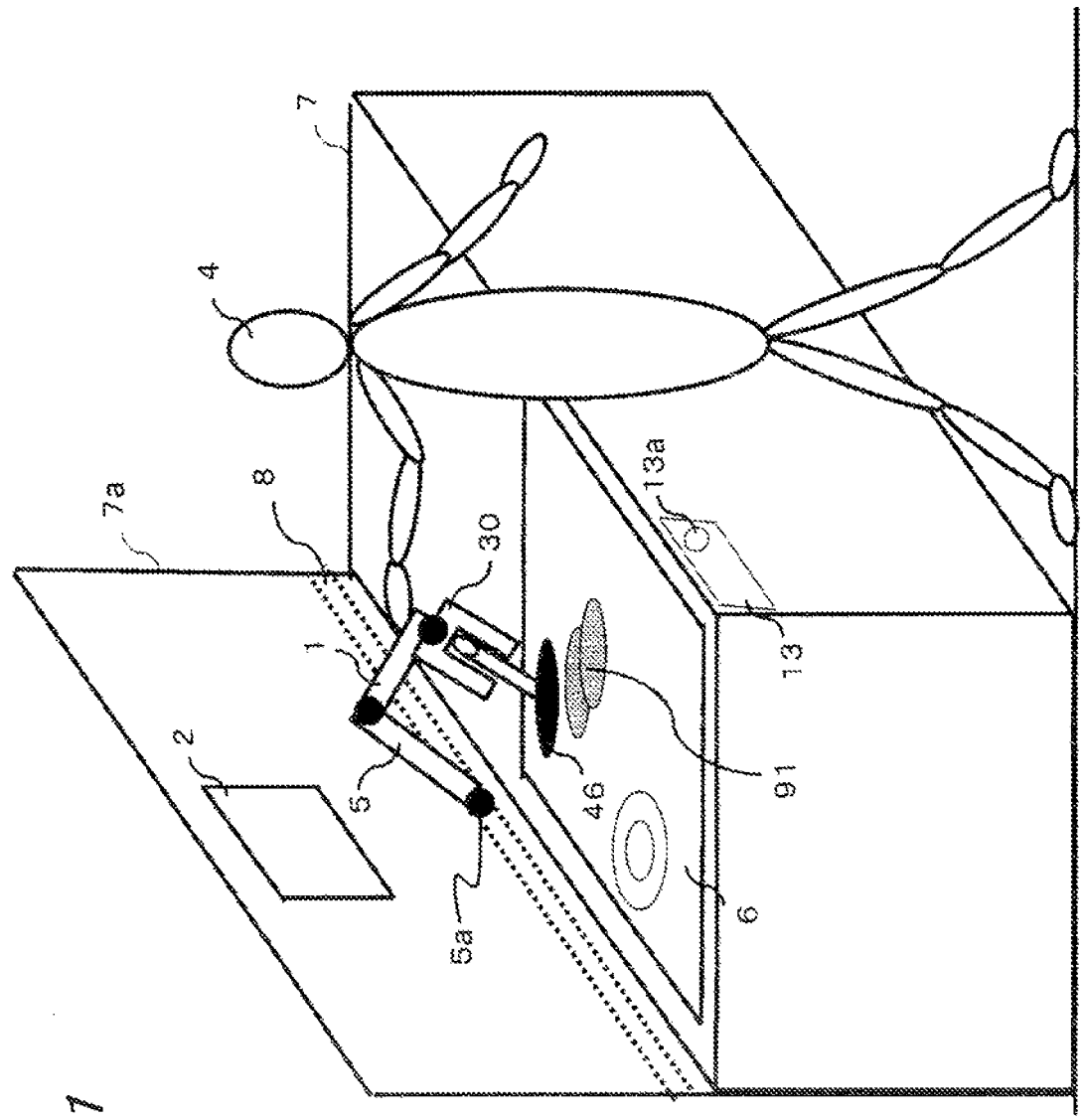
FIG. 1 is a view showing schematic structures of a control apparatus for a robot in a first embodiment of the present invention.

Referring to Figures, the following description will discuss embodiments of the present invention in detail.

Prior to the detailed explanation of embodiments of the present invention by reference to Figures, the following description will discuss various modes, of the present invention.

According to a first aspect of the present invention, there is provided a control apparatus for a robot arm, which controls an operation of the robot arm so as to carry out a job by using the robot arm, comprising:

an operation information acquiring unit that acquires operation information relating to the operation of the robot arm;

a grabbed position detection unit that, when a person grabs the robot arm, detects a grabbed position of the robot arm by the person;

a characteristic information acquiring unit that acquires pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position;

a control method switching unit that switches control methods of the robot arm depending on the grabbed position detected by the grabbed position detection unit and the characteristic information acquired by the characteristic information acquiring unit; and an operation correcting unit that, during the operation of the robot arm based upon the operation information acquired by the operation information acquiring unit, after the control method has been switched by the control method switching unit in accordance with the grabbed position and the characteristic information, corrects information relating to a force of the operation information acquired by the operation information acquiring unit in response to a manipulation of the person, wherein, based upon the operation information corrected by the operation correcting unit, the operation of the robot arm is controlled.

According to a second aspect of the present invention, there is provided the control apparatus for a robot arm according to the first aspect, further comprising:

a force detection unit that detects a force externally applied to the robot arm, wherein, upon detecting the force externally applied to the robot arm by the force detection unit, the characteristic information acquiring unit acquires the information relating to a presence/absence of influences of a drag from a contact surface at the time when the person grabs the robot arm, of the pieces of characteristic information, and after the control method has been switched by the control method switching unit in accordance with the operation information during the operation of the robot arm, the operation correcting unit corrects information relating to a force of the operation information, in response to the force detected by the force detection unit as the manipulation of the person.

According to a third aspect of the present invention, there is provided the control apparatus for a robot arm according to the second aspect, wherein the control method switching unit makes switching to any one of the following control methods:

(I) a control method for controlling the operation of the robot arm so that the robot arm is moved by a force applied to the robot arm by the person, (II) a control method for controlling the operation of the robot arm so as not to be moved even upon application of a force to the robot arm by the person, and (III) a control method for controlling the operation of the robot arm by using the control method prior to the switching, and in a case of the control method of (I), the force detection unit carries out the detection by using either a method in which the force is detected midway during the movement of the robot arm, or a method in which the force is detected in a stopped state of the robot arm, from the movement, in which after the movement of the robot arm, the robot arm directly or indirectly collides with the contact face, and in cases of the control method of (II) and the control method of (III), the force detection unit detects the force upon application of the force to the robot arm by the person.

According to a fourth aspect of the present invention, there is provided the control apparatus for a robot arm according to the third aspect, wherein the control method switching unit makes switching, to any one of the following control methods:

(I) in a case where the characteristic information contains information indicating that there are no influences of a drag from the contact surface, and also contains information indicating that a force applied to the robot arm at the grabbed position by the person is located in a range detectable by the force detection unit, a control method for controlling the operation of the robot arm by using the control method prior to the switching, or a control method for controlling the operation of the robot arm so as not to be moved by a force applied to the robot arm by the person, (II) in a case where the characteristic information contains information indicating that there are influences of a drag from the contact surface, and also contains information indicating that a force applied to the robot arm at the grabbed position by the person is located in a range detectable by the force detection unit, a control method for controlling the operation of the robot arm so that, even upon application of a force to the robot arm by the person, the robot arm is prevented from being moved to be directly or indirectly made in contact with the contact surface, (III) in a case where the characteristic information contains information indicating that there are influences of a drag from the contact surface, and also contains information indicating that a force applied to the robot arm at the grabbed position by the person is located out of a range detectable by the force detection unit, a control method for controlling the operation of the robot arm so that the robot arm is moved by a force applied to the robot arm by the person.

According to a fifth aspect of the present invention, there is provided the control apparatus for a robot arm according to the third aspect, wherein, upon detection of a plurality of grabbed positions by the grabbed position detection unit, in accordance with the respective grabbed positions and a characteristic of the force detection unit, the control method switching unit successively makes switching to any one of the following control methods:

(I) a control method for controlling the operation of the robot arm so that the robot arm is moved by a force applied by the person, (II) a control method for controlling the operation of the robot arm so as not to be moved even upon application of a force to the robot arm by the person, and (III) a control method for controlling the operation of the robot arm by using the control method prior to the switching, with the force detection unit being allowed to detect the force relating to each of the control methods, and wherein the force is detected by the force detection unit through the respective control methods, and further comprising a force calculation unit, which, based upon a plurality of values detected at the grabbed positions by the force detection unit, calculates a value of the force applied to the robot arm by the person, wherein the operation correcting unit corrects the operation information of the operation information database, by using the value of the force calculated by the force calculation unit.

According to a sixth aspect of the present invention, there is provided the control apparatus for a robot arm according to the fifth aspect, wherein the force calculation unit calculates the value of a force applied to the robot arm by the person by using any one of the following calculation methods:

(I) a method for calculating a sum of the plural values detected by the force detection unit, (II) a method for calculating a minimum value among the plural values detected by the force detection unit, (III) a method for calculating a maximum value among the plural values detected by the force detection unit, and (IV) a method in which, by multiplying each of the plural values detected by the force detection unit by a weighting coefficient, and then summing up resulting values, and wherein the operation correcting unit corrects information relating to a force of the operation information acquired by the operation information acquiring unit, based upon the value, calculated by the force calculation unit.

According to a seventh aspect of the present invention, there is provided the control apparatus for a robot arm according to the second or third aspect, comprising: a plurality of robot arms;

wherein the grabbed position detection unit detects which robot arm of the plurality of robot arms is being grabbed by the person, and wherein in a case where the person is grabbing one of robot arms among the plurality of robot arms, the force detection unit installed in the one of robot arms detects the force, and further comprising a force calculation unit, that calculates a value for use in correcting the other robot arm that is not being grabbed by the person, based upon the value detected by the force detection unit, wherein the operation correcting unit corrects the operation information acquired by the operation information acquiring unit, based upon the value calculated by the force calculation unit.

According to an eighth aspect of the present invention, there is provided the control apparatus for a robot arm according to the seventh aspect, wherein the force calculation unit calculates the value of a force applied to the robot arm by the person by using any one of the following calculation methods:

(I) a method for calculating a sum of the plural values detected by the force detection unit, (II) a method for calculating a minimum value among the plural values detected by the force detection unit, (III) a method for calculating a maximum value among the plural values detected by the force detection unit, and (IV) a method in which, by multiplying each of the plural values detected by the force detection unit by a weighting coefficient, and then summing up resulting values, and wherein the operation correcting unit corrects the pieces of operation information relating to all the robot arms acquired by the operation information acquiring unit, based upon the value calculated by the force calculation unit.

According to a ninth aspect of the present invention, there is provided the control method for a robot arm according to the third aspect, wherein, upon switching to a control method for controlling the operation of the robot arm so as not to be moved, even upon application of a force to the robot arm by the person, switching is alternately made between the control method prior to the switching and the control method after the switching by the control method switching unit, and when switched to the control method after the switching, the force detection unit detects the force.

According to a 10th aspect of the present invention, there is provided a control method for a robot arm, which controls an operation of a robot arm so that a job is carried out by the robot arm, comprising:

acquiring operation information relating to the operation of the robot arm by using an information acquiring unit;

when a person grabs the robot arm, detecting grabbed position of the robot arm by the person by using a grabbed position detection unit;

acquiring pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position, by using a characteristic information acquiring unit;

switching control methods of the robot arm depending on the grabbed position detected by the grabbed position detection unit and the characteristic information acquired by the characteristic information acquiring unit, by using a control method switching unit;

during the operation of the robot arm based upon the operation information acquired by the operation information acquiring unit; after the control method has been switched by the control method switching unit in accordance with the grabbed position and the characteristic information, correcting information relating to a force of the operation information acquired by the operation information acquiring unit in response to a manipulation of the person, by using an operation correcting unit; and based upon the operation information corrected by the operation correcting unit, controlling the operation of the robot arm.

According to an 11th aspect of the present invention, there is provided a robot comprising:

a robot arm; and a control apparatus for a robot arm, disclosed in any one of the first to eighth aspects, for use in controlling the operation of the robot arm.

According to a 12th aspect of the present invention, there is provided a control program for a robot arm, which controls an operation of a robot arm so that a job is carried out by the robot arm, allowing a computer to execute steps of:

acquiring operation information relating to the operation of the robot arm by using an information acquiring unit;

when a person grabs the robot arm, detecting a grabbed position of the robot arm by the person by using a grabbed position detection unit;

acquiring pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position, by using a characteristic information acquiring unit;

switching control methods of the robot arm depending on the grabbed position detected by the grabbed position detection unit and the characteristic information acquired by the characteristic information acquiring unit, by using a control method switching unit;

during the operation of the robot arm based upon the operation information acquired by the operation information acquiring unit, after the control method has been switched by the control, method switching unit in accordance with the grabbed position and the characteristic information, correcting information relating to a force of the operation information acquired by the operation information acquiring unit in response to a manipulation of the person, by using an operation correcting unit; and based upon the operation information corrected by the operation correcting unit, controlling the operation of the robot arm.

According to a 13th aspect of the present invention, there is provided an integrated electronic circuit for a robot arm, which controls an operation of a robot arm so that a job is carried out by the robot arm, comprising operation steps of:

acquiring operation information relating to the operation of the robot arm by using an information acquiring unit;

when a person grabs the robot arm, detecting a grabbed position of the robot arm by the person by using a grabbed position detection unit;

acquiring pieces of characteristic information including information relating to a presence/absence of detection of a force at a time when the person grabs the robot arm at the grabbed position detected by the grabbed position detection unit and information relating to a presence/absence of influences of a drag from a contact surface when the robot arm is manipulated while being grabbed by the person at the grabbed position, by using a characteristic information acquiring unit, switching control methods of the robot arm depending on the grabbed position detected by the grabbed position detection unit and the characteristic information acquired by the characteristic information acquiring unit, by using a control method switching unit;

during the operation of the robot arm based upon the operation information acquired by the operation information acquiring unit, after the control method has been switched by the control method switching unit in accordance with the grabbed position and the characteristic information, correcting information relating to a force of the operation information acquired by the operation information acquiring unit in response to a manipulation of the person, by using an operation correcting unit; and based upon the operation information corrected by the operation correcting unit, controlling the operation of the robot arm.

Referring to Figures, the following description will discuss embodiments of the present invention in detail.

First Embodiment

Figure 2:
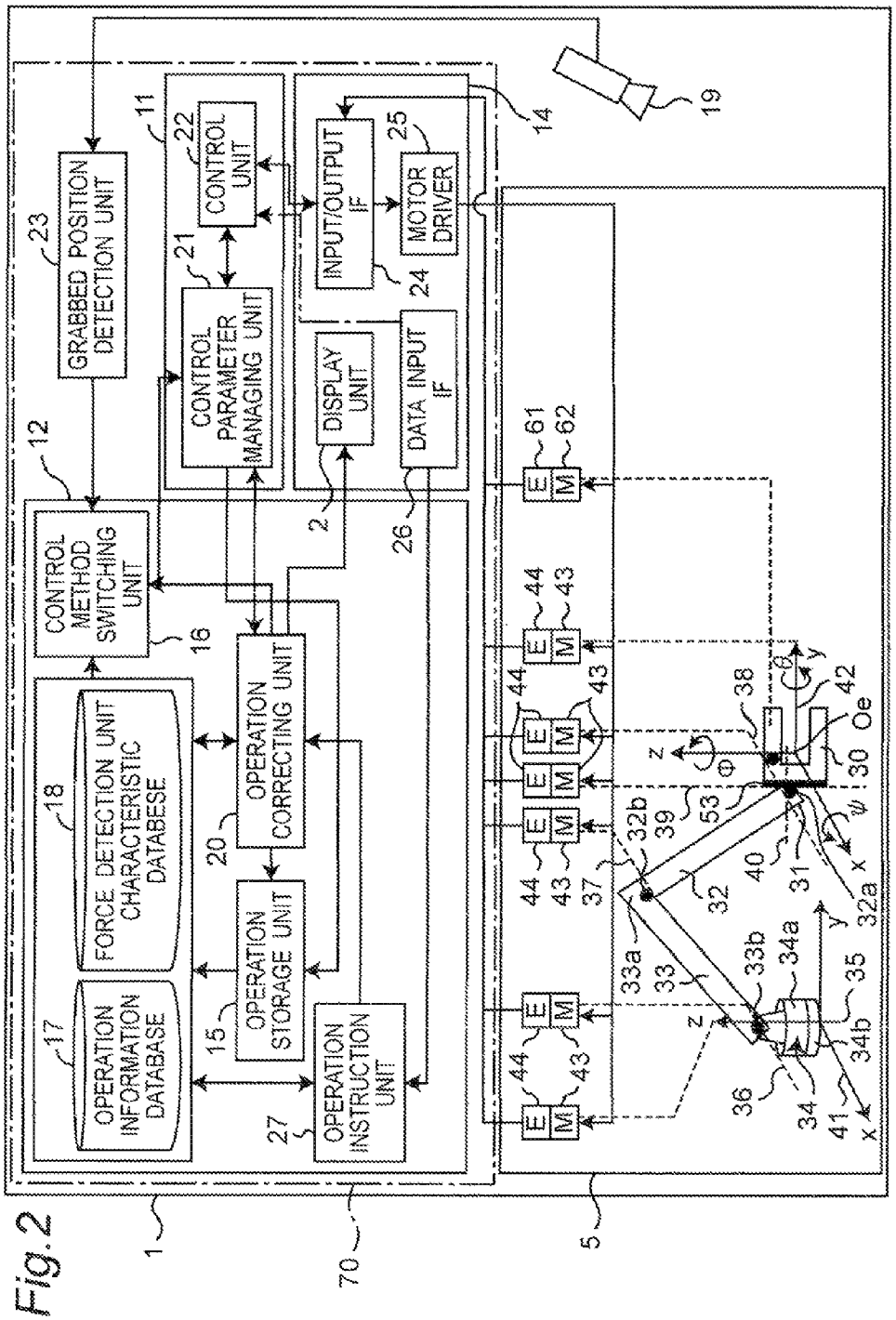
FIG. 2 is a view showing detailed structures of the control apparatus and a robot arm to be controlled that form a robot system in the first embodiment of the present invention.

First, the following description will discuss a structure of a robot system 1 provided with a robot arm control apparatus in a first embodiment of the present invention. FIGS. 1 and 2 are views that schematically show the robot system 1 provided with a robot arm 5 and its control apparatus 70 of the first embodiment of the present invention.

As shown in FIG. 1, the robot arm 5 of the robot system 1 is attached to a wall surface 7a of, for example, a kitchen in a home or a work bench 7 such as a table. The base end 5a of the robot arm 5 is shiftably supported on a rail 8 secured onto the wall surface 7a so that the robot arm 5 is allowed to move on the rail 8 in lateral directions (for example, in horizontal directions) along the rail 8, by a force of a person 4.

The robot system 1 is a system for carrying out a job in a home that is executed by the robot arm 5 and the person 4 in cooperation with each other, for example, a job for wiping off stains 91 in the kitchen by using the robot arm 5 or a job for mixing cooking materials on the bottom of a pot. FIG. 1 shows an example of a sequence of processes in which a wiping cleaning job is carried out by the robot system 1.

First, the person 4 directly grabs the robot arm so that the person 4 applies a force to the robot arm 5. Thus, by the force applied to the robot arm 5 from the person 4, the robot arm 5 is allowed to move along the rail 8 so that the robot arm 5 is directed to the vicinity of a cooking apparatus 6, such as an IH cooking heater or a gas heater.

Next, the person 4 attaches a sponge 46 serving as one example of a cleaning tool for use in wiping job to a hand 30 on the tip of the robot arm 5.

Next, when the person 4, for example, pushes button 13a of an operation panel 13 of the robot system 1, placed on a side surface or the like of a cooking apparatus 6, that is, uses a data input IF 26, so that an operation starting instruction is inputted to the robot arm 5, the robot arm 5 is activated, and a job preliminarily selected (in this case, the wiping job) is started.

Figure 29:
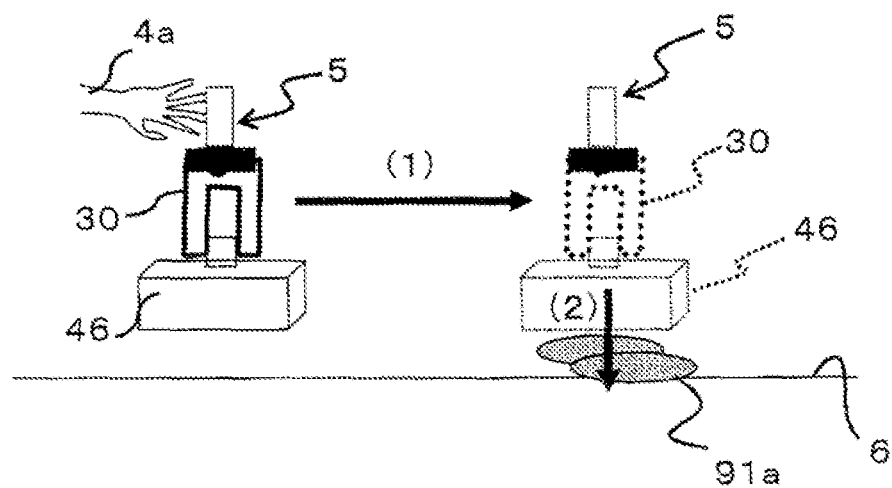
FIG. 29 is a view showing a robot arm manipulating state by a person in the first embodiment of the present invention.

In a case where, while the robot arm 5 is carrying out the wiping job on the cooking apparatus 6 by using the cleaning tool 46 grabbed by its hand 30, the person 4 finds a badly stained portion 91a that is different from the very place on which the wiping job is executed, the person 4 directly grabs the robot arm 5 by his or her hand 4a, and applies a force to the robot arm 5 so that the robot arm 5 is moved (in an arrow (1) direction in FIG. 29) to the corresponding portion 91a. Moreover, by applying a force to the robot arm 5 by the hand 4a of the person 4 in a direction toward which a correction is desirably made (in an arrow (2) direction in FIG. 29) at the badly stained portion 91a, a correcting instruction used for correcting the operation is inputted to the robot arm 5 so that the operation of the robot arm 5 is corrected so as to carry out the wiping job with a stronger force (see FIG. 29).

The rail 8 is disposed on the wall surface 7a of the work bench 7; however, in the case of an island kitchen without wall surfaces, it may be attached to a suitable place for a job, such as a ceiling surface or a side surface of a top plate of the island kitchen.

Moreover, although the operation panel 13 is secured to a side surface of the cooking apparatus 6, a remote control unit capable of carrying out remote operations may be used in place of the operation panel 13.

FIG. 2 is a view showing detailed structures of the robot arm 5 to be controlled and the control apparatus 70 for the robot arm 5 that form a robot system 1. As shown in FIG. 2, the control apparatus 70 of the robot arm 5 is provided with a grabbed position detection unit 23, an operation generating device 12 for generating operations of the robot arm 5, a control apparatus main unit 11, and a peripheral apparatus 14.

—Robot Arm—

For example, the robot arm 5 of the first embodiment is prepared as a multi-joint robot arm made of a multi-link manipulator having six degrees of freedom. The robot arm 5 is provided with the hand 30, a fore-arm link 32 with a wrist portion 31 to which the hand 30 is attached formed on its tip 32a, an upper arm link 33 having its tip 33a rotatably coupled to the base end 32b of the fore-arm link 32, and a base portion 34 to which the base end 33b of the upper arm link 33 is rotatably coupled so as to be supported thereon. The base portion 34 is shiftably coupled to the rail 8; however, this may be secured to a fixed position. The wrist portion 31 has three rotation axes relating to a fourth joint portion 38, a fifth joint portion 39, and a sixth joint portion 40 so that the relative orientation (direction) of the hand 30 relative to the fore-arm link 32 can be changed. That is, in FIG. 2, the fourth joint portion 38 makes it possible to change the relative orientation of the hand 30 to the wrist portion 31 around the lateral axis ($\phi$). The fifth joint portion 39 makes it possible to change the relative orientation of the hand 30 to the wrist portion 31 around the longitudinal axis ($\phi$) that is orthogonal to the lateral axis of the fourth joint portion 38. The sixth joint portion 40 makes it possible to change the relative orientation of the hand 30 relative to the wrist portion 31 around the lateral axis ($\theta$) that is respectively orthogonal to the lateral axis ($\psi$) of the fourth joint portion 38 and the longitudinal axis ($\phi$) of the fifth joint portion 39. The other end of the fore-arm link 32 is allowed to rotate around the third joint portion 37 relative to the tip of the upper arm link 33, that is, around a lateral axis in parallel with the lateral axis of the fourth joint portion 38. The other end of the upper arm link 33 is allowed to rotate around the second joint portion 36 relative to the base portion 34, that is, around a lateral axis in parallel with the lateral axis of the fourth joint portion 38. Moreover, an upper movable portion 34a of the base portion 34 is allowed to rotate around the first joint portion 35 relative to a lower-side fixed portion 34b of the base portion 34, that is, around a longitudinal axis in parallel with the longitudinal axis of the fifth joint portion 39.

As a result, the robot arm 5 is allowed to rotate around the total six axes to form the multi-link manipulator having six degrees of freedom.

Each of the joint portions forming the rotation portions of the respective axes is provided with a rotation driving device, such as a motor 43, and an encoder 44 used for detecting a rotation phase angle (that is, a joint angle) of the rotation axis of the motor 43. The motor 43 of the first embodiment is installed in the inside of each of the joint portions of the robot arm 5. The motor 43 is drive-controlled by a motor driver 25, which will be described later, installed, in one of link members of two link members forming each of the joint portions. The rotation axis of the motor 43 that is installed in one of the link members of each joint portion is coupled to the other link member, and the rotation axis is thus forwardly/reversely rotated so that the other link member is allowed to rotate around each of the axes relative to the one of the link members.

Reference numeral 41 represents an absolute coordinate system in which the relative positional relationship is secured to the lower-side securing unit 34b of the base portion 34, and 42 represents a tip-unit coordinate system in which the relative positional relationship is fixed to the hand 30. The origin position $O_o$ (X, Y, Z) of the tip-unit coordinate system 42 viewed from the absolute coordinate system 41 is defined as a tip unit position (position of the hand 30) of the robot arm 5, and the orientation of the tip-unit coordinate system 42, viewed from the absolute coordinate system 41, is represented by coordinates ($\phi$, $\theta$, $\psi$), using the roll angle, pitch angle and yaw angle, and defined as the tip-unit orientation of the robot arm 5, and the tip unit position and orientation vectors are defined as vectors r=[x, y, z, $\phi$, $\theta$, $\psi$]$^T$.

Figure 4A:
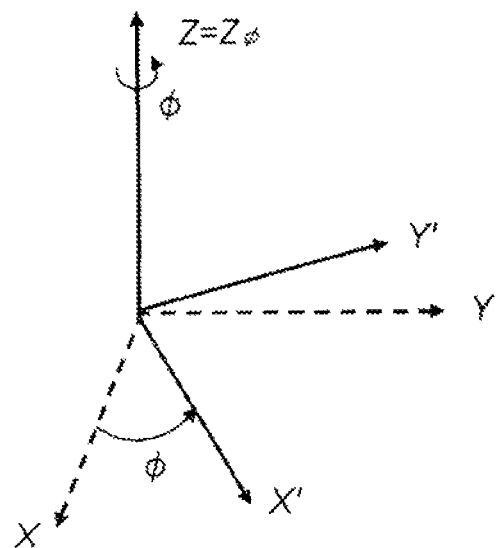
FIG. 4A is a view relating to a coordinate system of the robot arm in the control apparatus of the first embodiment of the present invention.
Figure 4B:
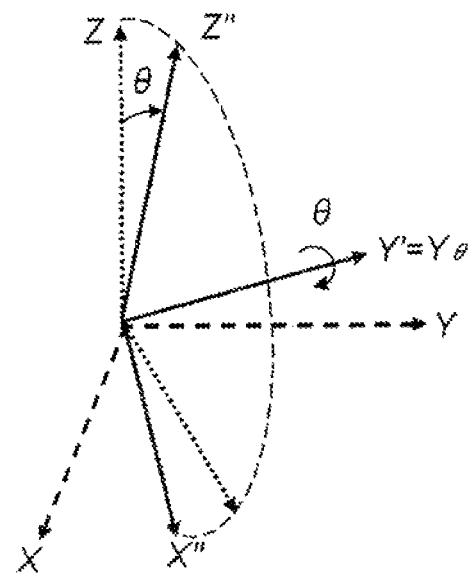
FIG. 4B is a view relating to the coordinate system of the robot arm in the control apparatus of the first embodiment of the present invention.
Figure 4C:
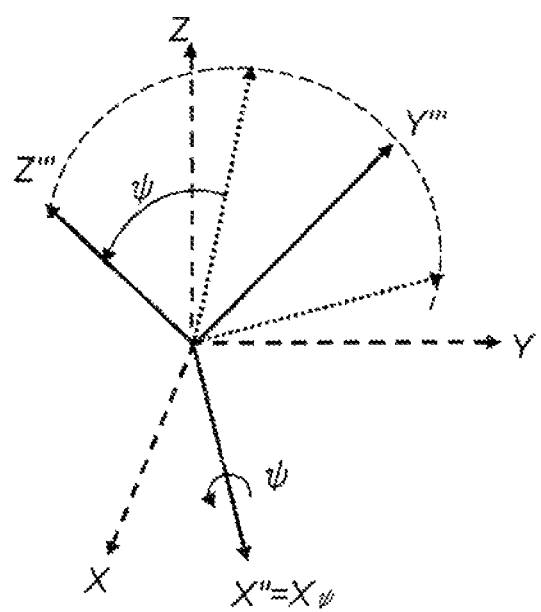
FIG. 4C is a view relating to the coordinate system of the robot arm in the control apparatus of the first embodiment of the present invention.

In the first embodiment, a coordinate system, obtained by rotating the absolute coordinate system 35 by an angle $\phi$ with the Z-axis serving as the rotation axis, is prepared (see FIG. 4A), and the coordinate axes at this time are indicated by [X', Y', Z]. Next, this coordinate system is rotated by an angle $\theta$ with the Y'-axis serving as the rotation axis (see FIG. 4B), and the coordinate axes at this time are indicated by [X", Y', Z"]. Lastly, this coordinate system is rotated by an angle $\psi$ with the X"-axis serving as the rotation axis (see FIG. 4C), and the orientation of the coordinate system at this time is represented by a roll angle $\phi$, a pitch angle $\theta$, and a yaw angle $\psi$ so that the orientation vectors at this time are given as ($\phi$, $\theta$, $\psi$). In a case where a coordinate system, obtained by parallel shifting the origin position of the coordinate system of the orientation ($\phi$, $\theta$, $\psi$) to the origin position $O_o$ (x, y, z) of the tip-unit coordinate system 42, is coincident with the tip-unit coordinate system 42, the orientation vectors of the tip-unit orientation system are defined as ($\phi$, $\theta$, $\psi$).

Upon controlling the tip-unit position and orientation of the robot arm 5, the tip-unit position and orientation vectors r are made to follow tip-unit position and orientation target vectors $r_d$ generated in a target track generation unit 55, which will be described later.

The force detection unit 53, such as a force sensor, detects a force applied to the robot arm 5 from the person 4 or the like. More specifically, the force, applied to the force detection unit 53, is detected in respectively different directions of six axes of the three directions (x, y, z directions) and orientation directions ($\phi$, $\theta$, $\psi$ directions).

Figure 27A:
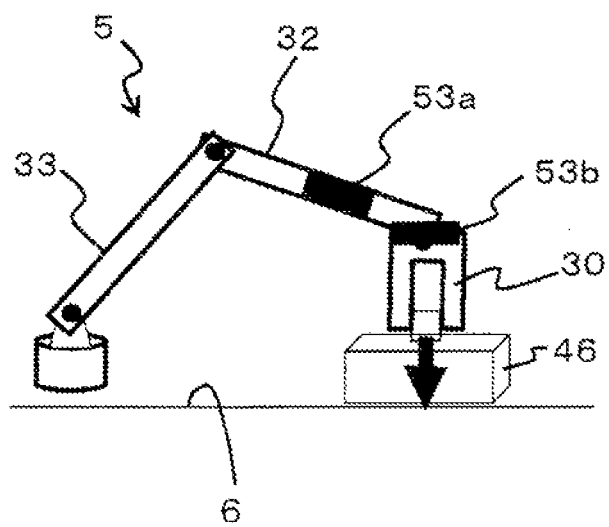
FIG. 27A is an explanatory view showing structural example of a force detection unit of the control apparatus for a robot of the first embodiment of the present invention.

As shown in FIG. 27A, for example, in a case where a force sensor 53a for use in manipulation and a force sensor 53b for use in force control, which will be described later, are installed as one structural example of the force detection unit 53, forces applied to the respective force sensors 53a and 53b are detected as the force detection unit 53.

Figure 27B:
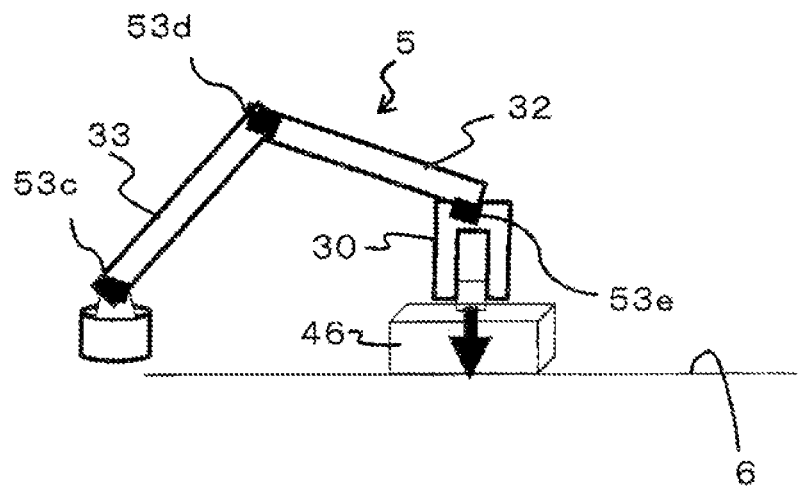
FIG. 27B is an explanatory view showing another structural example of a force detection unit of the control apparatus for a robot of the first embodiment of the present invention.

Moreover, as shown in FIG. 27B, in a case where, as another structural example of the force detection unit 53, torque sensors 53c, 53d, and 53e are installed in the respective joint portions, an electric current value i=[$i_1$, $i_2$, $i_3$, $i_4$, $i_5$, $i_6$]$^T$ of each joint angle, which flows through the motor 43 that drives each of the joint portions of the robot arm 5, and is measured by a current sensor of the motor driver 24, is received by the force detection unit 53 through the input/output IF 24 so that the resulting force is detected as the force detection unit 53. Moreover, the current value q of each joint angle, measured by each of the encoders 44, is received by the force detection unit 53 through the input/output IF 24, and a joint angle error compensating output $u_{qa}$ is also received thereby from an approximation reverse kinematical calculation unit 57, which will be described later. The force detection unit 53, which functions as an observer, calculates a torque $T_{exT}$ that is generated in each of the joint portions by an external force applied to the robot arm 5, based upon the electric current value i, the current value q of each of the joint angles, and the joint angle error compensating output $u_{qe}$. Moreover, the force detection unit 53 also converts the torque to an equivalent tip unit external force $F_{ext}$ of the tip unit of the robot arm 5, based upon $F_{ext}=J_v(q)^{-T}\tau_{ext}-[0, 0, m_g]^T$, and outputs the equivalent tip unit external $F_{ext}$ thus converted to an impedance calculation unit 51. In this case, $J_v(q)$ is a Jacob matrix that satisfies the following equation:

$$v=Jv(q)q \qquad \text{[Equation 1]}$$

where =[$v_x$, $v_y$, $v_z$, $\omega_x$, $\omega_y$, $\omega_z$]$^T$, and ($v_x$, $v_y$, $v_z$) represent a translation speed of the tip unit of the robot arm 5 in the tip unit coordinate system 42, while ($\omega_x$, $\omega_y$, $\omega_z$) represent an angular velocity of the tip unit of the robot arm 5 in the tip unit coordinate system 42. Moreover, m represents a weight of a grabbed object grabbed by the hand 30, and g represents gravitational acceleration. The value of the weight m of the grabbed object may be inputted to the force detection unit 53 through the input/output IF 24 by the person 4 prior to the grabbing process of the object. Moreover, the grabbing process of the object is actually carried out by the hand 30 of the robot arm 5, and based upon the estimated result of the equivalent tip unit external force $F_{ext}$ of the force detection unit 53 at this time, the value of the weight m of the grabbed object may be calculated.

In order to control operations of the robot arm 5, respective operations of the operation generating device 12, the control apparatus main body unit 11, and the peripheral apparatus 14 are executed so that pieces of information of the respective joint angles, outputted from the encoders 44 to be described later of the respective joint portions of the robot arm 5, are acquired by the control apparatus main body unit 11 through counter boards of the input/output IF 24, and based upon the respective pieces of joint angle information thus acquired, the control apparatus main body unit 11 calculates control instruction values for rotating operations of the respective joint portions. The respective control instruction values, thus calculated, are given to the motor driver 25 used for drive-controlling the respective joint portions of the robot arm 5 through the D/A board of the input/output IF 24, and based upon the respective control instruction values sent from the motor driver 25, the motors 43 of the respective joint portions of the robot arm 5 are driven. Moreover, a hand driving motor 62, as one example of a hand driving device drive-controlled by the motor driver 25, and an encoder 61 used for detecting a rotation phase angle of the rotation axis of the hand driving motor 62 are further installed in the hand 30 so that the rotation angle information, detected by the encoder 61, is acquired by the control apparatus main body unit 11 through the counter board of the input/output IF 24, and based upon the rotation angle information thus acquired, control instruction values in open/close operations of the hand 30 are calculated by the hand control unit 54 (shown in FIG. 3) of the control unit 22 of the control apparatus main body unit 11. The control instruction values, thus calculated, are given to the motor driver 25 that also carries out open/close driving operations of the hand 30 through a D/A board of the input/output IF 24 so that the rotations of the motor 62 are drive-controlled in accordance with the respective control instruction values sent from the motor driver 25; thus, the rotation axis of the hand driving, motor 62 is forwardly/reversely rotated so that the hand 30 is opened and closed.

For example, the control apparatus main unit 11, the operation generating device 12, the peripheral apparatus 14, and the grabbed position detection unit 23 are respectively constituted by generally-used personal computers.

—Grabbed Position Detection Unit—

Reference numeral 23 represents a grabbed position detection unit, and when the robot arm 5 is grabbed by the person 4, it detects which portion (which position) of the robot arm 5 is grabbed by the person 4 so as to carry out a manipulation (detects the grabbed position of the robot arm 5 by the person 4). More specifically, an image recognizing process of the hand 4a of the manipulating person 4 is carried out by the grabbed position detection unit 23 based upon image data obtained by an image pick-up device 19 such as a camera, and the grabbed position detection unit 23 detects which portion among the fore-arm link 32, the upper arm link 33, and the hand 30 of the robot arm 5 is grabbed by the hand 4a for manipulation.

(Operation Generating Device 12)

The operation generating device 12 is designed to have an operation information database 17 that functions as one example of an operation information acquiring unit, a force detection unit characteristic database 18 that functions as one example of a characteristic information acquiring unit, an operation instruction unit 27, an operation correcting unit 20, an operation storage unit 15, and a control method switching unit 16. Between the operation correcting unit 20 and the control parameter managing unit 21, information of the tip unit position and orientation of the robot arm 5, information of a force applied by the person 4, an operation instruction, and the like are inputted and outputted thereto and therefrom. The tip unit position and orientation of the robot arm 5, information of a force applied to the robot arm by the person 4, and the like are outputted to the operation storage unit 15 from the control parameter managing unit 21. Additionally, detailed explanations of respective control modes, that is, (i) position control mode, (ii) impedance control mode, and (iii) force control mode, in the operation generating device 12 will be given in the description of the control parameter managing unit 21 of the control apparatus main unit 11.

—Operation Information Database—

To and from the operation information database 17, operation information to and from the operation instruction unit 27 is inputted and outputted, and operation information to and from the operation correcting unit 20 is inputted and outputted, so that various pieces, of operation information are inputted thereto and stored therein by the operation storage unit 15.

The following description will discuss the operation information database 17 in detail.

In the operation information database 17, for example, pieces of information relating to operations of the robot arm 5 (operation information), shown in FIG. 5, are stored by the operation storage unit 15. Specific data examples of the operation information are shown below:

(1) Job ID numbers (see columns "job ID" of FIG. 5) used for identifying jobs.
(2) Operation ID numbers (see columns "operation ID" of FIG. 5) used for identifying individual operations in a job.
(3) Information relating to the tip unit position and orientation of the robot arm 5 in the operation (see columns, "position-orientation" in FIG. 5),
(4) Information relating to a force to be applied to a target object upon carrying out the operation by using the robot arm 5 (see columns "force" in FIG. 5).
(5) Information relating to a flag that indicates which piece of information relating to parameters of the tip unit position, orientation, and force of the robot arm 5 is valid (see columns "flag" in FIG. 5).
(6) Information indicating an open/Close state of the band, that is, as to whether the hand 30 is opened or closed (see columns "hand" in FIG. 5).
(7) Information relating to periods of time during which the respective operations are executed (see columns "time" in FIG. 5).
(8) Information relating to a type of a parameter to be corrected upon correcting operation information of the operation information database 17 by the operation correcting unit 20 (see columns "correction parameter flag" in FIG. 5).
(9) Progress information indicating whether or not an operation of the robot arm 5 is being executed (see columns "progress information in FIG. 5).

In this case, the job ID is a mark used for identifying information relating to the corresponding job, and the operation ID is a mark used for identifying information relating to the corresponding operation.

The "position-orientation" in the operation information database 17 of FIG. 5, that is, the information relating to the tip unit position and orientation of the robot arm 5, represents the tip unit position and orientation of the robot arm 5, and is indicated by (x, y, z, φ, θ, ψ) based upon the coordinates of the origin position $O_e$ and the orientation.

The information relating to "farce" represents information relating to a force to be applied by the robot arm 5 to an object to be subjected to the job thereof, and components in x, y, z, φ, θ, ψ directions of the force are indicated by ($f_x$, $f_y$, $f_z$, $f_φ$, $f_θ$, $f_ψ$). For example, in a case where $f_z$=5[N], this means that the wiping job is carried out by applying a force of 5[N] in the z-axis direction. More specifically, this corresponds to, for example, a case in which, upon carrying out a wiping job on the top plate of an IH cooking heater 6 or the like, the wiping job is carried out by applying a force on the surface of the top plate.

The information relating to "flag" of the operation information database of FIG. 5 gives a value that indicates which piece of information is valid among the tip unit position, orientation, and force of the robot arm 5 based upon the operation information indicated by the respective "operation IDs". More specifically, it is indicated by a numeric value of 32 bits shown in FIG. 6. In FIG. 6, when the respective values of the tip unit position, orientation, and force are valid in the respective bits, these are indicated by "1", while, when the respective values of the tip unit position, orientation, and force are invalid therein, these are indicated by "0". For example, in the $0^{th}$ bit, when the value of the x-coordinate of the tip unit position of the robot arm 5 is valid, "1" is given thereto, while, when the value thereof is invalid, "0" is given thereto. Moreover, in the $1^{st}$ bit, when the value of the y-coordinate of the tip unit position of the robot arm 5 is valid, "1" is given thereto, while, when the value thereof is invalid, "0" is given thereto. In the $2^{nd}$ bit, when the value of the z-coordinate of the tip unit position of the robot arm 5 is valid, "1" is given thereto, while, when the value of the z-coordinate of the tip unit position is invalid, "0" is given thereto. Successively, in the $3^{rd}$, $4^{th}$, and $5^{th}$ bits, the validity or invalidity of each of parameters φ, θ, ψ of the orientation is indicated (that is, "1" is given thereto when it is valid, while "0" is given thereto when it is invalid). Moreover, in the $6^{th}$ bit to the $11^{th}$ bit, the validity of each of components of a force is indicated (that is, "1" is given thereto when it is valid, while "0" is given thereto when it is invalid). With respect to the information relating to "flag", since more bits (32 bits) are prepared for expansion in the future, bits from the $12^{th}$ bit to the $31^{st}$ bit are not used so that "0" is given to each of these bits; however, only the $12^{th}$ bit may be prepared as a variable to be stored. In FIG. 6, since "1" is given to the $0^{th}$ bit and the $1^{st}$ bit, the $3^{rd}$ bit to $5^{th}$ bit, and $8^{th}$ bit, these indicate that only x, y, φ, θ, ψ information as the tip unit position of the operation information and the orientation information, and $f_z$ as the force information are valid. As a result, among pieces of operation information, since "0," is given to the $2^{nd}$ bit, $6^{th}$ to $7^{th}$ bits, and $9^{th}$ to $11^{th}$ bits, even when any value is stored as each of the values of z, $f_x$, $f_y$, $f_z$, $f_\phi$, $f_\theta$, $f_\psi$, the value is defined as invalid.

The information relating to "hand" that corresponds to information as to whether the hand 30 is opened or closed in the operation information database 17 of FIG. 5 is given as a flag indicating the presence or absence of the open/close of the hand 30 during an operation of the robot arm 5, and when the hand 30 is opened, "0" is given thereto, while, when it is closed, "1" is given thereto.

The information relating to "time" in the operation information database 17 corresponds to a period of time during which each of the operations of the robot arm 5 is executed, and indicates that the operation stored in the corresponding "operation ID" is executed in a period of time stored as this information relating to "time". That is, the period of time represents not the absolute period of time, but a relative period of time from the previous operation. In other words, the information represents the period of time during which the hand 30 of the robot arm 5 is shifted to the "position and orientation" indicated by the "operation ID", or the period of time during which the force applied thereby has reached "force" indicated by the "operation ID".

The information relating to "correction parameter flag" in the operation information database 17 of FIG. 5 gives information as to which parameter should be corrected in an operation correcting unit 20, which will be described later. More specifically, it is indicated by a numeric value of 32 bits shown in FIG. 7. In FIG. 7, when the respective values of the tip unit position, orientation and force can be corrected in the respective bits, these are indicated by "1", while, when the respective values of the tip unit position, orientation and force cannot be corrected, these are indicated by "0". For example, in the $0^{th}$ bit, when the value of the x-coordinate of the tip unit position of the robot arm 5 can be corrected, "1" is given thereto, while, when the value thereof cannot be corrected, "0" is given thereto. Moreover, in the $1^{st}$ bit, when the value of the y-coordinate of the tip unit position of the robot arm 5 can be corrected, "1" is given thereto, while, when the value the y-coordinate of the tip unit position cannot be corrected, "0" is given thereto. In the $2^{nd}$ bit, when the value of the z-coordinate of the tip unit position of the robot arm 5 can be corrected, "1" is given thereto, while, when the value of the z-coordinate of the tip unit position cannot be corrected, "0" is given thereto. Successively, in the $3^{rd}$, $4^{th}$, and $5^{th}$ bits, the possibility of correction of each of parameters $\phi$, $\theta$, $\psi$ of the orientation is indicated (that is, "1" is given thereto when the correction can be made, while "0" is given thereto when the correction cannot be made). Moreover, in the $6^{th}$ bit to the $11^{th}$ bit, the possibility of correction of each of components of a force is indicated (that is, "1" is given thereto when the correction can be made, while "0" is given thereto when the correction cannot be made). With respect to the information relating to "flag", since more bits (32 bits) are prepared for expansion in the future, bits from the $12^{th}$ bit to the $31^{st}$ bit are not used so that "0" is given to each of these bits; however, only the $12^{th}$ bit may be prepared as a variable to be stored.

The information relating to "progress information" in the operation information database 17 of FIG. 5 corresponds to information that indicates whether or not the corresponding operation is being currently executed, and in a case where the operation is being currently executed, "1" is given thereto, while, in a case where it is not the operation that is being currently executed, "0" is given thereto, and the resulting information is stored in the operation information database 17 by the operation storage unit 15. More specifically, when a job is started by the operation instruction unit 27, among the respective operations of the job, with respect to the operation that is being currently carried out (executed), "1" is stored by the operation storage unit 15, and with respect to an operation that is not being currently carried out (executed), "0" is stored by the operation storage unit 15.

—Operation Instruction Unit—

To the operation instruction unit 27, an instruction for starting operations of a job corresponding to "job ID" specified by the person 4 through the input IF is inputted. Upon receipt of the instruction for starting the operations of the job corresponding to the specified "job ID", the operation instruction unit 27 starts the operations of the job having the specified "job ID". More specifically, "1" is set to the "progress information" of the "operation ID" by the operation information instruction unit 27, and stored in the operation information database 17 by the operation storage unit 15. With respect to the pieces of "progress information" of the other "operation IDs", "0" is given thereto by the operation instruction unit 27, and stored in the operation information database 17 by the operation storage unit 15. All the operations of the job having the job ID specified by the operation instruction unit 27 are executed successively, starting from a job having the smallest number of the "operation ID", and when the last operation has been executed, the sequence returns to the operation of the leading "operation ID" of the "job ID" so that the sequence of operations is executed repeatedly.

Figure 8:
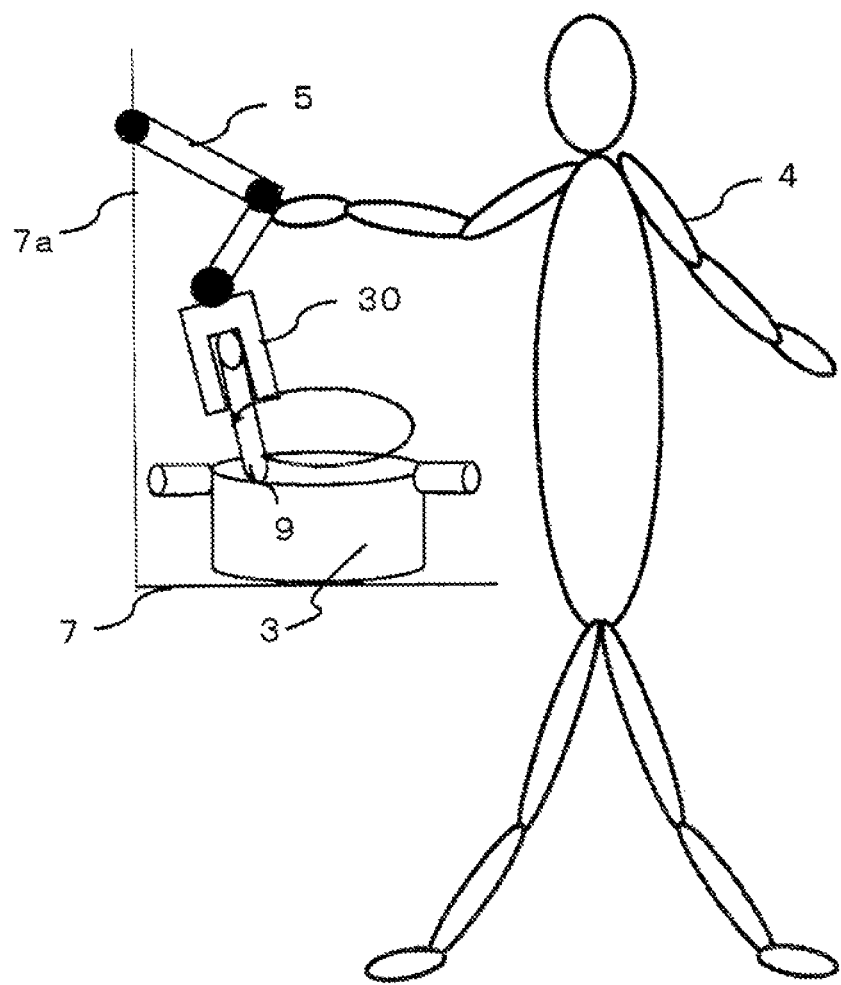
FIG. 8 is a view showing an operation of the control apparatus for a robot and a manipulation state of the robot arm by a person of the first embodiment of the present invention.

Pieces of information of the position and orientation of the tip unit of the robot arm 5, and time in the operation information database 17 are formed by processes in which, for example, as shown in FIG. 8, the person 4 grabs the robot arm 5, and moves the robot arm 5 in an impedance control mode, which will be described later, so that information of the tip unit position and orientation of the robot arm 5 is obtained every certain fixed period of time (for example, every 0.2 msec.), and stored in the operation information database 17 by the operation storage unit 15 together with the corresponding period of time. Moreover, the information of force in the operation information database 17 is formed by inputting a value of a desired force to be applied, through the data input IF 26. Additionally, in FIG. 8, reference numeral 3 represents a pot serving as one example of a cooking tool, and reference numeral 9 represents a ladle serving as one example of a cooking tool, grabbed by the hand 30 and used for mixing the pot 3.

—Force Detection Unit Characteristic Database—

The force detection unit characteristic database stores information (characteristic information) representing characteristics of the force detection unit 53 (shown in FIG. 3), and one example thereof is shown in FIG. 9A. The characteristic information is, for example, configured by information relating to the grabbed position of the robot arm 5 by the Person 4 (see columns of "grabbed position ID" of FIG. 9A), information relating to whether or not the detection of a force is available at the position where the person 4 is grabbing the robot arm 5 (see columns of "presence/absence of detection" of FIG. 9A), and information relating to whether or not there is a possibility of receiving any drag from the contact surface upon force detection (see columns of "presence/absence of possibility of influences of a drag" in FIG. 9A).

Figures 9B, 10:
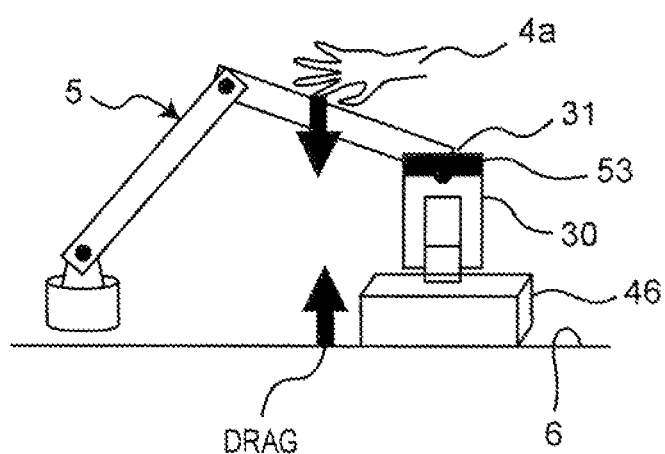
FIG. 9B is an explanatory view showing the list of a force detection unit characteristic database of the control apparatus for a robot of the first embodiment of the present invention.
FIG. 10 is a view showing an operation of the control apparatus for a robot and a manipulation state of the robot arm by a person of the first embodiment of the present invention.

The information relating to the "grabbed position ID" of FIG. 9A represents information used for determining which position of the robot arm 5 is grabbed by the person based on the table of FIG. 9B stored in the force detection unit characteristic database 18. The respective pieces of information relating to the "grabbed position IDs" are determined by the table shown in FIG. 9B. More specifically, in a case where the upper arm link 33 of FIG. 2 is grabbed (manipulation A of FIG. 28), "1" is given to the "grabbed position ID" of "upper arm" from FIG. 9B. Moreover, in a case where the fore-arm link 32 is grabbed (manipulation B of FIG. 28), "2" is given to the "grabbed position ID" of "fore-arm" from FIG. 9B, and this fact is detected by the control method switching unit 16 from the force detection unit characteristic database 18. In the same manner, in a case where the wrist portion 31 is grabbed, "3" is given to the "grabbed position ID" of "fore-arm" from FIG. 9B. In the same manner, in a case where the hand 30 is grabbed (manipulation C of FIG. 28), "4" is given to the "grabbed position ID" of "hand" from FIG. 9B, and this fact is detected by the control method switching unit 16 from the force detection unit characteristic database 18.

In the information relating to "presence/absence of detection" of FIG. 9A, in a case where, upon application of a force by the person 4, with the grabbed position indicated by each of the "grabbed position IDs" being grabbed by the person 4, the grabbed state is detectable by the force detection unit 53, "1" is set, while, in a case where it is not detectable by the force detection unit 53, "0" is set.

The information relating to "presence/absence of possibility of influences of drag" corresponds to information indicating whether or not the force detection unit 53 might receive any influence of a drag from the contact surface, when, during a predetermined job carried out by the robot arm, for example, the hand 30 of the robot arm 5 is directly made in contact with a contact surface, or when the hand 30 of the robot arm 5 is indirectly made in contact with a contact surface through an object or the like grabbed by hand 30. More specifically, suppose that, as shown in FIG. 10, the robot arm 5 grabs a sponge 46 serving as an object, for example, one example of a wiping tool, and carries out a wiping job by applying a force to a cooking apparatus 6, such as an IH cooking heater or a gas heater. In a case where, midway during this cleaning fob, upon detection of a force applied by the person 4 with the robot arm 5 being grabbed, the force detection unit 53 receives influences of a drag from the contact surface and the force detection unit 53 fails to correctly detect the force, this state is defined as being influenced by a drag, "1" is set thereto. In contrast, in a case where the force detection unit 53 can correctly detect the force applied by the person 4, without receiving any influences from the contact surface, "0" is set thereto.

As shown in a specific example of FIG. 10, suppose that in a case where a wiping job is being carried out with the force detection unit 53 being attached only to the wrist portion 31, and with the sponge 46 grabbed with the hand 30, the hand 30 is made in contact with the cooking apparatus 6 directly or indirectly through the sponge 46 and is influenced by a drag from the top plate of the cooking apparatus 6. At this time, in a case where the hand 30 or the wrist portion 31 is further grabbed by the human hand 4a of the person A, a force detecting operation is available by the force detection unit 53. In contrast, in a case where a portion other than the hand 30 or the wrist portion 31 is grabbed by the human hand 4a of the person 4, the force detecting operation is not available by the force detection unit 53. In this case, the force detection unit characteristic database 18 is set to a state as shown in FIG. 9A. That is, since the attached force detection unit 53 may be influenced by the drag, the information relating to the "presence/absence of possibility of influences from a drag" of FIG. 9A is all set to "1", regardless of the grabbed positions. Moreover, since the force detection unit 53 is allowed to detect a force when the hand 30 or the wrist portion 31 is grabbed, the "presence/absence of detection" is set to "1" in a case where the "grabbed position ID" is "3" indicating the wrist portion 31, as well as in a case where the "grabbed position ID" is "4" indicating the hand 30, respectively. In the same manner, in a case where the upper arm link 33 or the fore-arm link 32 is grabbed, since the force applied by the person 4 is not directly detected, the "presence/absence of detection" is set to "0" in the case of the "grabbed position ID" of "1" indicating the upper arm link 33, as well as in the case of the "grabbed position ID" of "2" indicating the fore-arm link 32, respectively.

In a case where a manipulation-use force sensor 53a and a force control-use force sensor 53b are installed on the fore-arm link 32 as shown in FIG. 27A, the force detection unit characteristic database 18 has an arrangement as shown in FIG. 30A. When the person 4 manipulates the fore-arm link 32 as shown in FIG. 27A, the force from the person 4 is directly detected by the manipulation-use force sensor 53a of FIG. 27A; therefore, in the case of the "grabbed position ID" of "2" (indicating "tore-arm" as shown in FIG. 30B), the "presence/absence of detection" is set to "1". Moreover, supposing that, even if the manipulation-use force sensor 53a is made in contact with the cooking apparatus 6 directly or indirectly, it is not influenced by a drag, the "presence/absence of possibility of influences from a drag" is set to "0" in the case of the "grabbed position ID" of "2". With respect to the grabbed positions other than this, the same is true for the example of FIG. 10; therefore, the description thereof will be omitted.

In a case where torque sensors 53c, 53d, and 53e are attached to the respective joint portions of the robot arm 5 as shown in FIG. 27B, since a force applied by the person 4 can be detected even when any portion of the robot arm 5 is grabbed and manipulated, the "presence/absence of detection" is set to "1" in all the grabbed positions as shown in FIGS. 31A and 31B. Moreover, in a case where the torque sensors 53c, 53d, and 53e of FIG. 27B are such sensors as to be influenced by a drag from the contact face, the "presence/absence of possibility of influences of a drag" is set to "1" in all the grabbed positions.

As described above, by preparing the force detection unit characteristic database 18 in accordance with the characteristic of the force detection unit 53 such as a force sensor, it becomes possible to switch control methods by using a control method switching unit 16, which will be described later.

—Operation Correcting Unit—

During an operation of the robot arm 5 in any one of control modes, that is, (i) a position control mode, (ii) an impedance control mode, (iii) a force control mode, and a control mode formed by combining these modes in respectively different directions, based upon the pieces of information of the position, orientation, force, and time of the operation information database 17, the operation correcting unit 20 receives an instruction for starting a correcting operation from the data input IF 26 through the operation instruction unit 27. Then, the operation correcting unit 20 has such a function that, after switching the control method by the control method switching unit 16, the operation information of the robot arm 5 in the operation information database 17 is corrected by allowing the person 4 to apply a force to the robot arm 5 based upon the operation correcting information of the operation correcting information database 18. The respective control modes of (i), (ii), and (iii) will be discussed in detail later, together with the description of the operations of the control parameter managing unit 21.

The following description will discuss functions of the operation correcting unit 20.

The person 4 selects a job that is desirably executed by the robot arm 5 among jobs specified by "operation IDs" of the operation information database 17 through the data input IF 26, and inputs the selected information to the operation instruction unit 27 to be specified. With respect to the specified job, the operation instruction unit 27 gives an instruction for selecting the job to the operation correcting unit 20. The operation correcting unit 20 gives an instruction to the control parameter managing unit 21 so as to execute the operation information of the job having the "job ID" selected from the operation information database 17 (more specifically, information relating to the position information, orientation information, and time information), with the control mode being act in accordance with the flag.

More specifically, in a case where the job having "1" of the "job ID" of FIG. 5 is selected, in the case of the operation having "1" of the "operation ID" with "1" of the "job ID", since the "flag" is "1" in each of the $0^{th}$, $1^{st}$, $3^{rd}$, $4^{th}$, and $5^{th}$ bits, this indicates that x, y, $\phi$, $\theta$, $\psi$ of the tip unit position of the robot arm 5 are valid. Therefore, with respect to x, y, $\phi$, $\theta$, $\psi$, operations are carried out in the position control mode, and with respect to the z-axis, since the $8^{th}$ bit of the "flag" is "1", the operation correcting unit 20 gives instruction to the control parameter managing unit 21 so as to carry out the operation in the force control mode.

Figure 16A:
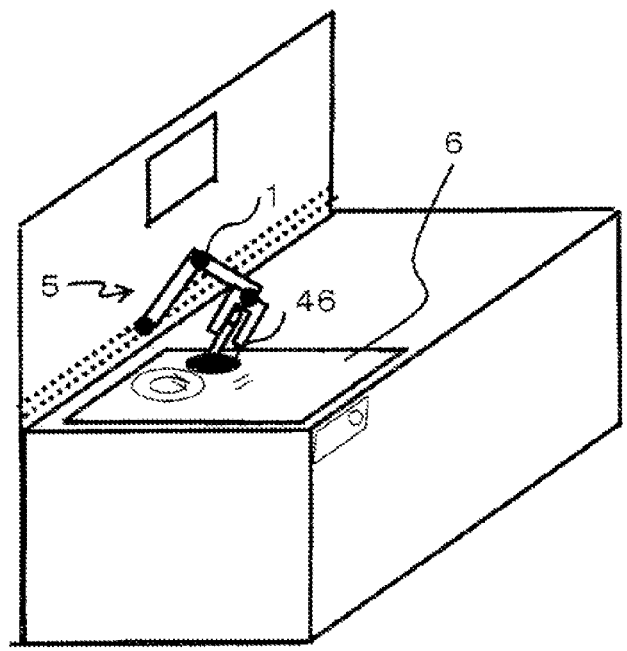
FIG. 16A is a view showing an operation of the control apparatus for a robot and a manipulation state of the robot arm by a person of the first embodiment of the present invention.

Through the operations described above, the robot arm 5 starts a wiping job on the top plate of an IH cooking heater 6 or the like, as shown in FIG. 16A.

Suppose that, in a case where, while the wiping job is being carried out on the top plate of the IH cooking apparatus 6 or the like, the person 4 finds another stained place that is different from the very place on which the wiping job is executed on the top plate of the IH cooking heater 6 or the like, and the person 4 desires to cause the robot arm 5 to carry out a wiping operation at the either place, and therefore, the person 4 inputs an instruction for starting a correction to the operation instruction unit 27 through the data input IF 26 so as to move the robot arm 5 to the other place by using the data input IF 26. In this case, upon receipt of the instruction for starting the correction from the data input IF 26, the operation instruction unit 27 outputs an instruction for starting the correction to the operation correcting unit 20.

Upon receipt of the instruction for starting the correction from the data input IF 26, the operation correcting unit 20 gives an instruction to the control parameter managing unit 21 so as to set the control mode and execute the corresponding operation in accordance with the correcting parameter flag of the operation information database 17. More specifically, since a correcting parameter flag of the "operation ID" of the job having "1" in the "job ID" of FIG. 5 that is under operation (operation having "1" of the progress information) has "1" only in the 8" bit, with the other bits being "0" in FIG. 5, this indicates that only the force component of the z-axis is correctable among the operations of the robot arm 5. Upon correcting the force component, the force hybrid impedance control mode is set so as to correct the corresponding force component by a force applied by the person 4, and an instruction for switching the control method in the z-axis direction is outputted from the operation correcting unit 20 to the control method switching unit 16.

When the person 4 grabs the robot arm 5, the grabbed position detection unit 23 detects which portion of the robot arm 5 is grabbed by the person 4, and the grabbed position detection unit 23 inputs the result of the detection to the control method switching unit 16. Then, the control method switching unit 16 switches the control method depending on the grabbed position so that the control method switching unit 16 gives an instruction to the control parameter managing unit 21 so as to carry out an operation by using the control method.

Figure 16B:
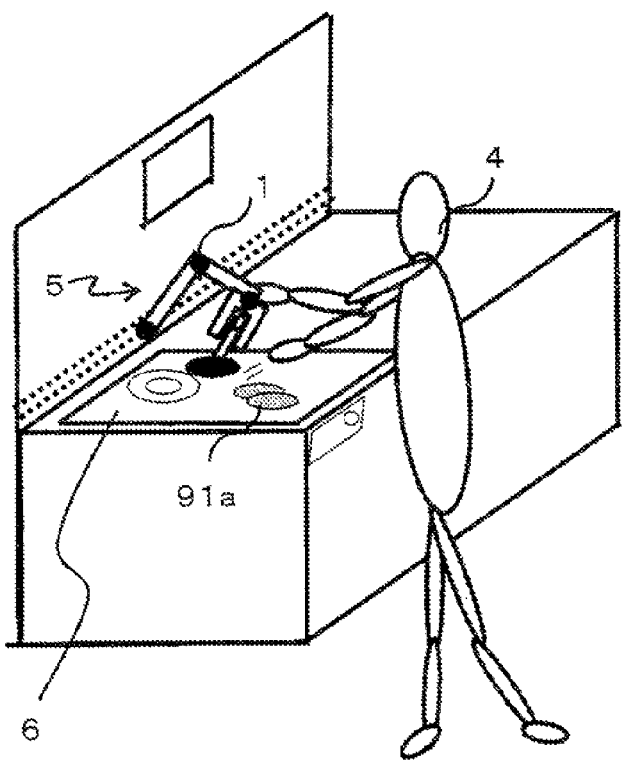
FIG. 16B is a view showing an operation of the control apparatus for a robot and a manipulation state of the robot arm by a person of the first embodiment of the present invention.

As shown in FIG. 16B, in order to clean the vicinity of a stain 91 with a stronger force being applied thereto, the person 4 grabs the robot arm 5, and applies a force to the robot arm 5 from the person 4 toward the portion of the stain 91a. The information of the applied force is detected by the force detection unit 53 of the control unit 22, and inputted to the operation correcting unit 20 through the control parameter managing unit 21. In the operation correcting unit 20, of the information of the "job ID" and the operation information of the "operation ID" that are currently under operation, the value of the force component of the z-axis, which is being operated in the force control, is revised to the value of the inputted force component, and thus corrected.

The operation of the robot arm 5 corrected by the operation correcting unit 20 in accordance with the force applied to the robot arm 5 by the person 4 so that the wiping job is carried out, with a stronger rubbing force of the robot arm 5 being applied to the IH cooking heater 6.

Through the above-mentioned operations, the operation correcting unit 20 allows the person 4 to apply a force to the robot arm 5, during an operated state in accordance with the operation information of the operation information database 17, so that the operation information can be corrected. Moreover, by using the control method switching unit 16, a force, applied by the person 4, can be correctly detected, even if any portion of the robot arm 5 is grabbed by the person 4.

—Control Method Switching Unit—

Upon receipt of an instruction from the operation correcting unit 20 during an operation in any one of the following modes:

(i) position control mode;
(ii) impedance control mode;
(iii) force control mode; and
(iv) control mode formed by combining these in respectively different directions, the control method switching unit 16 switches the control method to a control method to be used when the person 4 grabs the robot arm 5 to correct parameter of a force based upon the grabbed position detected by the grabbed position detection unit 23 and the information stored in the force detection unit characteristic database 18. In the present invention, for example, even in a case where, after determination by the control method switching unit 16 as to whether or not the control method is switched, the resulting control method for controlling the operations of the robot arm 5 is switched to the control method prior to the switching (prior to the determination as to whether or not the switching is made) (as a result, no change in the control methods is made), this operation is referred to as "switching is made in the control methods."

Figure 11:
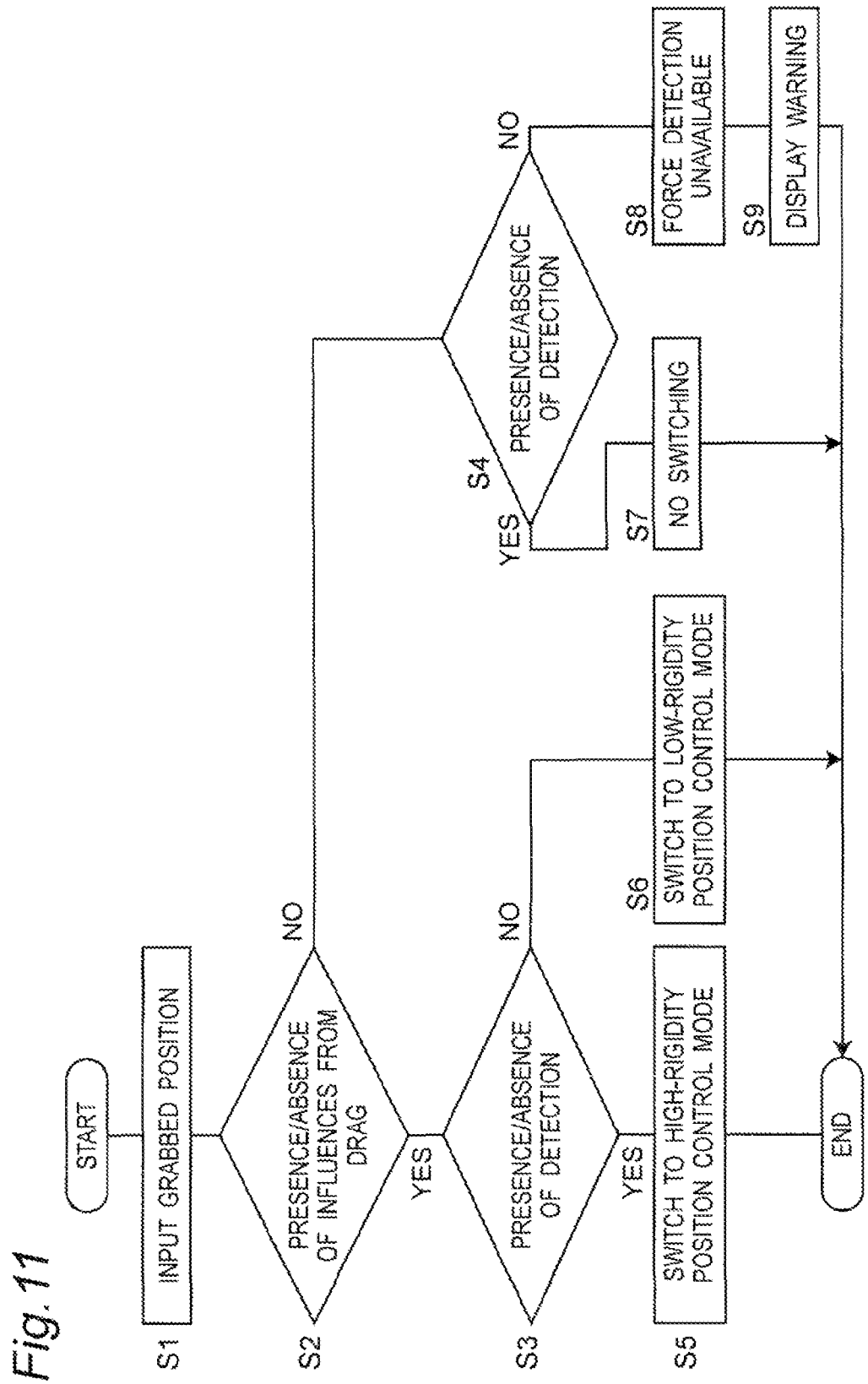
FIG. 11 is a flow chart showing operation steps of a control method switching unit of the control apparatus for a robot of the first embodiment of the present invention.

For example, in a structure in which a force sensor serving as one example of the force detection unit 53 is attached to the wrist portion 31 as shown in FIG. 10, in a case where, midway during an operation of the robot arm 5 in the force control mode of (iii), an instruction is given so as to carry out an operation in a force hybrid impedance control mode serving as one example of the control mode of (iv), switching is made in the control methods, and the switching operations in this case are shown in a flow chart of FIG. 11.

When the control method switching unit 16 receives the instruction so as to carry out a controlling operation in the force hybrid impedance control mode of (iv) from the operation correcting unit 20, the control method switching unit 16 detects the grabbed position of the robot arm 5 by the person 4 by using the grabbed position detection unit 23, and inputs the resulting detected information to the control method switching unit 16 (step S1).

Next, the characteristic relating to the presence/absence of a drag in the force detection unit 53 at the grabbed position detected by the grabbed position detection unit 23 is detected by the control method switching unit 16 by using the force detection unit characteristic database 18 (step S2). For example, in a case where the person 4 is grabbing the fore-arm link 32, since the "grabbed position ID" indicating the "forearm" is "2" in the force detection unit characteristic database 18 of FIG. 9B, the control method switching unit 16 detects that, in the case of the "grabbed position. ID" of "2", the "presence/absence of a possibility of influences from a drag" corresponds to "1" in accordance with FIG. 9A. In the same manner, in a case where the person 4 is grabbing the hand 30, since the "grabbed position ID" indicating the "hand" is "4" in FIG. 9B, the control method switching unit 16 detects that, in the case of the "grabbed position ID" of "4" in FIG. 9A, the "presence/absence of a possibility of influences from a drag" corresponds to "1". In these cases, since the "presence/absence of a possibility of influences from a drag" is "1" (influences from a drag are present), "Yes" is given to step S2, and the sequence proceeds to step S3. In a case where "presence/absence of a possibility of influences from a drag" is "0" (influences from a drag are absent), "No" is given to step S2, and the sequence proceeds to step S4.

Next, in step S3 and step S4, the control method switching unit 16 detects a characteristic relating to the "presence/absence of detection" of the force detection unit 53 of the grabbed position detected by the grabbed position detection unit 23 by using the force detection unit characteristic database 18 (step S3, step S4). In these steps S3 and S4, in a case where the "presence/absence of detection" is "1" (that is, in a case where it is detectable by the force detection unit 53), "Yes" is respectively given to step S3 and step S4, and the sequence proceeds to step S5 or step S7. In a case where the "presence/absence of detection" is "0" (that is, in a case where it is detectable by the force detection unit 53), "No" is respectively given to step S3 and step S4, and the sequence proceeds to step S6 or step S8. In a case where, for example, in step S3 and step S4, the person 4 is grabbing the fore-arm link 32, since the "grabbed position ID" indicating the "forearm" is "2" in the force detection unit characteristic database 18 of FIG. 9B, the control method switching unit 16 detects that, in the case of the "grabbed position ID" of FIG. 9A of "2", the "presence/absence of detection" corresponds to "0" (that is, the control method switching unit 16 detects that the detection is unavailable on the fore-arm by the force detection unit 53). In the same manner, in a case where the person 4 is grabbing the hand 30, since the "grabbed position ID" indicating the "hand" of FIG. 9B is "4", the control method switching unit 16 detects that, in the case of the "grabbed position ID" of "4" in FIG. 9A, the "presence/absence of detection" corresponds to "1" (that is, that the detection is available on the hand 30 by the force detection unit 53).

Figure 21A:
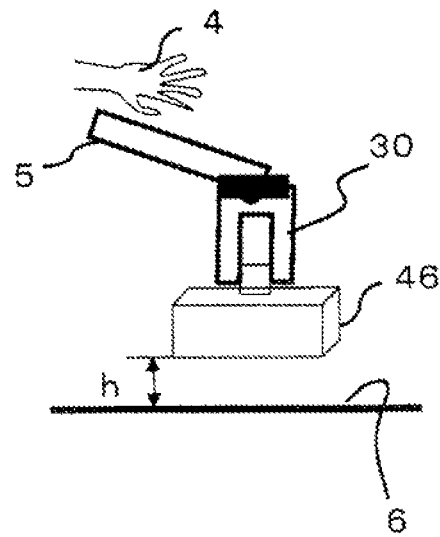
FIG. 21A is a view showing an operation of the control apparatus for a robot and a manipulation state of the robot arm by a person of the first embodiment of the present invention.
Figure 21B:
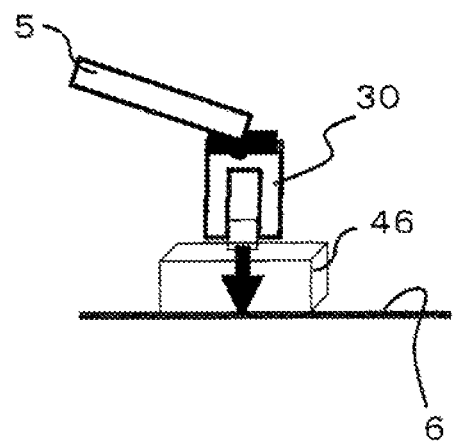
FIG. 21B is a view showing an operation of the control apparatus for a robot and a manipulation state of the robot arm by a person of the first embodiment of the present invention.

In step S5, switching is made by the control method switching unit 16 to a high rigidity position control mode to be described later (control method in which the robot arm 5 cannot be moved by the person 4). That is, in step S2, the "presence/absence of a possibility of influences of a drag" is set to "1" (that is, the state influenced by the drag), and in the case of the "presence/absence of detection" corresponding to "1" in step S3 (for example, in a case where the hand 30 is grabbed, and influenced by the drag, and detectable by the force detection unit 53), in step S5, switching is made by the control method switching unit 16 to the high rigidity position control mode (control method in which the robot arm 5 cannot be moved by the person 4) at such a position as not to allow the robot arm 5 to be directly or indirectly made in contact with the contact surface. Additionally, as will be described later based upon FIG. 21A, the current tip-unit position of the robot arm 5 that is carrying out a job such as a wiping job on the contact surface is acquired, and by setting a position apart from the contact surface by a height h based upon the tip-unit position, the state in which the robot arm 5 is not made in contact with the contact surface, directly or indirectly can be set. Moreover, in a case where the corresponding position is not "the position where the robot arm 5 is not made in contact with the contact surface", a switching operation is carried out to "the position where the robot arm 5 is not made in contact with the contact surface" at a point of time when the person grabs the robot arm 5.

In this manner, the robot arm 5 is prevented from being directly or indirectly made in contact with the contact surface so that it becomes possible to eliminate the influences of a drag from the contact surface, and the control mode is further set in the high-rigidity position control mode so that it becomes possible to prevent the robot arm 5 from being easily moved to be directly or indirectly made in contact with the contact surface.

Moreover, in step S6, switching is made by the control method switching unit 16 to a low-rigidity position control mode which is a control method for allowing the robot arm 5 to be moved by a force of the person 4. In other words, in a case where the "presence/absence of a possibility of influences from a drag" is "1" in step 2, with the "presence/absence of a possibility of influences from a drag" being set to "0" in step S3 (for example, in a case where, with the fore-arm link 32 being grabbed, influences from a drag are present, and the detection is not available in the force detection unit 53), switching is made to the low-rigidity position control mode which is a control method for allowing the robot arm 5 to be moved by a force of the person 4. In an attempt to apply to the robot arm 5 a desirable force to be applied to the contact surface through the robot arm 5, the person 4 pushes the robot arm 5 in an approaching direction to the contact surface, while grabbing the robot arm 5. Since the low-rigidity position control mode is set, the robot arm 5 can be easily moved by the force applied by the person 4 so that the robot arm 5 can be indirectly or directly made in contact with the contact surface. Since the "presence/absence of detection" is set to "0", the force, applied to the robot arm 5 by the person 4, is not directly detected by the force detection unit 53; however, since the drag applied from the contact surface to the robot arm 5 is equal to the applied force by the person 4, by detecting the drag from the contact surface through the force detection unit 53, the applied force by the person 4 can be detected by the force detection unit 53. Additionally, in a case where the force applied to the robot arm 5 by the person 4 is extremely small due to influences of friction on the contact surface or the like, that is, in a case where it is not possible to determine whether the corresponding force is a force applied to the robot arm 5 by the person 4, or an erroneously detected force due to influences of the friction, only when the detected force by the force detection unit 53 exceeds a certain threshold value (for example, 0.5 (N)), the corresponding force may be defined as valid.

In step S7, no switching is made among the control methods by the control method switching unit 16. That is, in a case where, in step S2, the "presence/absence of a possibility of influences from a drag" is "0", with the "presence/absence of detection" being set to "1" in step S4 (see FIG. 30A in which the force sensors 53a and 53b are disposed as shown in FIG. 27A, and the fore-arm link 32 is grabbed), no switching is made among the control methods. That is, even when the robot arm 5 is moved by a force applied by the person 4, no influences of a drag from the contact surface are given, and since the "presence/absence of detection" is set to "1", the force applied by the person 4 can be directly detected by the force detection unit 53; therefore, setting is made so that the controlling process is carried out in the force control mode, as it is, prior to the switching to the force hybrid impedance control mode of (iv) (that is, setting is made so that the control mode prior to a determination as to switching in S2 and S4 (prior to the switching determination), as it is, is executed, or setting is made so that switching is made to the force control mode). Additionally, in this case, no switching among the control methods is made by the control method switching unit 16; however, since, even in a case where switching is made to the position control mode, the force can be correctly detected, switching can be made to the position control mode by the control method switching unit 16, instead of making no switching among the control methods.

Moreover, in step S8, since the detection of a drag from the contact face is not available, it is not possible to detect the force applied by the person 4, and the sequence proceeds to step S9. In step S9, the person 4 is informed of the fact that no detection has been made, for example, by a warning display given to the person 4. That is, in a case where, in step S2, the "presence/absence of a possibility of influences from a drag" is "0", with the "presence/absence of detection" being set to "0" in step S4, since it is not possible to detect the drag from the contact surface, the control method switching unit 16 determines that the force applied by the person 4 cannot be detected in step S8. Therefore, in step S9, the control method switching unit 16 informs the person 4 of the fact that no detection has been made by, for example, giving a warning display to the person 4.

—Operation Storage Unit—

The operation storage unit 15 stores operation information corrected by the operation correcting unit 20 in the operation information database 17. Moreover, to the operation storage unit 15, pieces of information of the tip unit position (position of the hand 30) and orientation of the robot arm 5, and a force applied to the robot arm 5 by the person 4 are also inputted from the control parameter managing unit 21, and stored in the operation storage unit 15.

(Control Apparatus Main Unit 11)

The control apparatus main unit 11 is designed to have a control parameter managing unit 21 and a control unit 22. Tip unit positions and information of force or the like of the robot arm 5 are inputted and outputted to and from each other between the control unit 22 and the control parameter managing unit 21.

—Control Parameter Managing Unit—

The following description will discuss the control parameter managing unit 21 in detail.

The control parameter managing unit 21 carries out a setting by which operation modes of the robot arm 5 are switched among six modes, that is, the position control mode, the impedance control mode, the hybrid impedance control mode, the force hybrid impedance control mode of (iv), the high-rigidity position control mode, and the low-rigidity position control mode of the robot arm 5, based upon the instruction of the operation correcting unit 20 or the control method switching unit 16. Moreover, the control parameter managing unit 21 carries out a setting process of mechanical impedance setting values at the time of the impedance control mode as well as at the time of the hybrid impedance control mode. Furthermore, the control parameter managing unit 21 also carries out a setting process of the tip unit position and an orientation target correcting output $r_{d\Delta}$ to be outputted by the hybrid impedance calculation unit 51, which will be described later, and a setting process of operation information to be sent to the target track generation unit 55. Based upon an instruction from the operation correcting unit 20 or the control method switching unit 16, the control parameter managing unit 21 gives an instruction to the control unit 22 so as to operate the robot arm 5 in accordance with the set control mode so that the robot arm is operated under control of the control unit 22. Moreover, the control parameter managing unit 21 sends information of the tip-unit position or force of the robot arm 5, or the like, from the control unit 22 to the operation correcting unit 20.

(i) Position Control Mode

The position control mode is a mode in which the robot arm 5 is operated based upon the tip unit position and the orientation target vector instruction of the target track generation unit 55, which will be described later, that is, a mode in a control method for controlling the operation of the robot arm 5 so as not to be moved even upon application of the force to the robot arm 5 by the person 4. More specifically, the position control mode is a mode in which the robot arm 5 is manipulated while being moved, during a job such as a mixing job or a wiping job.

(ii) Impedance Control Mode

The impedance control mode corresponds to a mode for a control method in which the robot arm 5 is operated in response to a force that is detected by the force detection unit 53 and applied to the robot arm 5 by the person 4, or the like. For example, in the impedance control mode, as shown in FIG. 8, the person 4 directly holds the robot arm 5, and directs the robot arm 5 to a work place (position of a pot 3 in FIG. 8).

(iii) Force Control Mode

Figure 13:
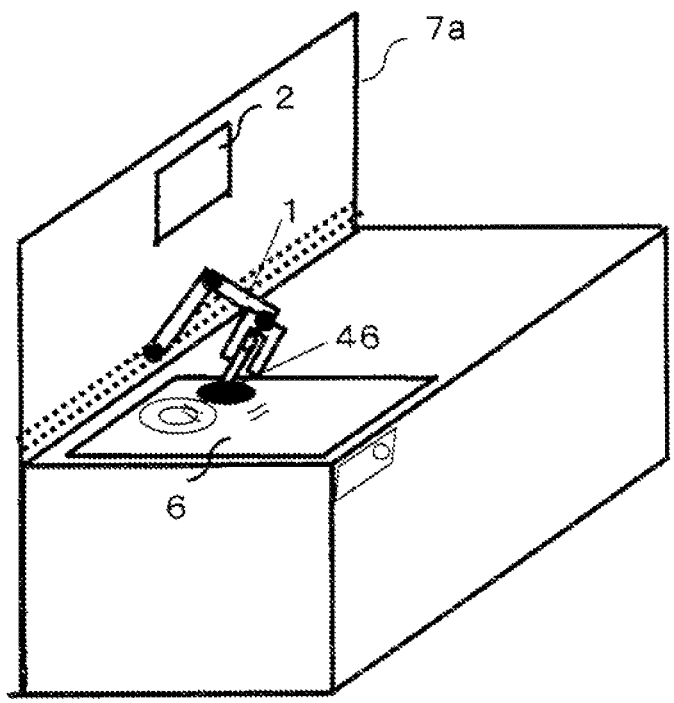
FIG. 13 is a view showing an operation state of the control apparatus for a robot in the first embodiment of the present invention.
Figure 14:
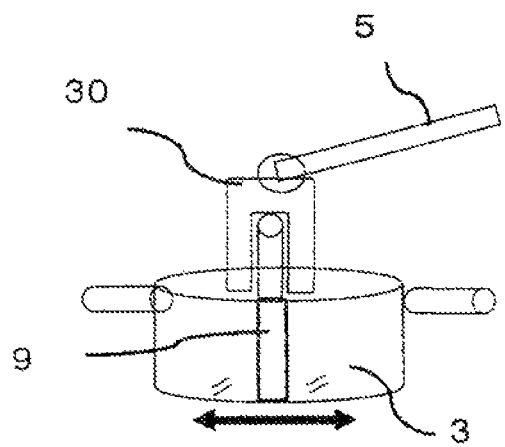
FIG. 14 is a view showing an operation state of the control apparatus for a robot in the first embodiment of the present invention.

The force control mode is a control mode for a control method in which the operation of the robot arm 5 is controlled so that the operation is carried out, with a target object being pressed by the robot arm 5 with a force that is set to the control parameter managing unit 21 from the operation correcting unit 20. For example, as shown in FIG. 13, in a case where, upon carrying out a wiping job on the top plate of an IH cooking heater 6, such a wiping job as to rub the surface of the top plate with a force being applied thereto is executed, or as shown in FIG. 14, in a case where such a mixing job as to rub the bottom of a pot 3, with a force being applied thereto, is carried out, this force control mode is used so as to apply the force in a controlled direction.

(iv) Hybrid Impedance Control Mode

Figure 12A:
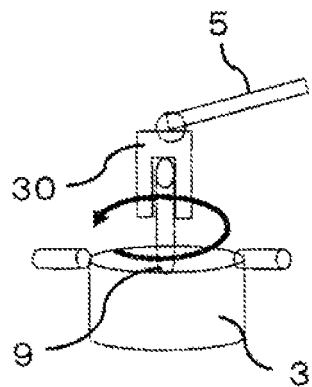
FIG. 12A is a view showing an operation of the control apparatus for a robot and a manipulation state of the robot arm by a person of the first embodiment of the present invention.
Figure 12B:
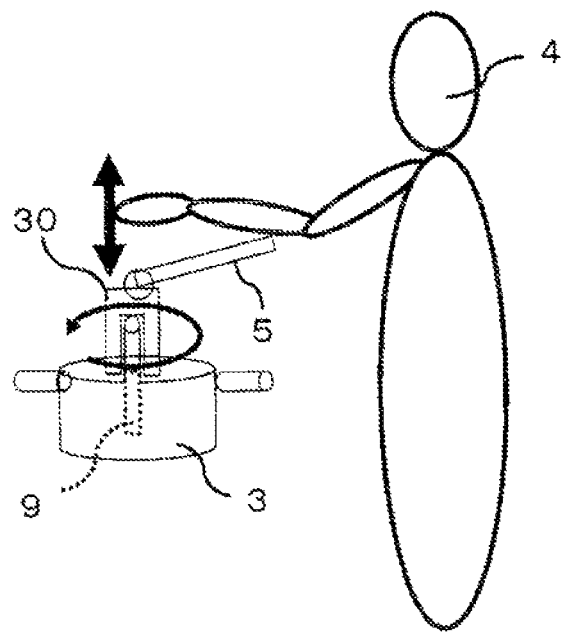
FIG. 12B is a view showing an operation of the control apparatus for a robot and a manipulation state of the robot arm by a person of the first embodiment of the present invention.
Figure 12C:
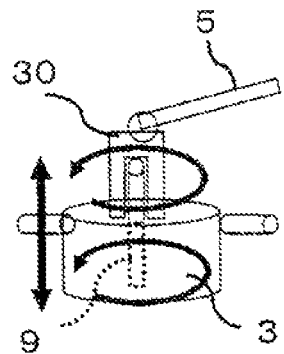
FIG. 12C is a view showing an operation of the control apparatus for a robot and a manipulation state of the robot arm by a person of the first embodiment of the present invention.

The hybrid impedance control mode is a mode of a control method for controlling operations of the robot arm 5 so that, during an operation of the robot arm 5 in the position control mode, a force applied to the robot arm 5 is detected by the force detection unit 53 and the robot arm 5 is actuated in response to the force detected by the force detection unit 53. More specifically, in a case where, as shown in FIG. 12A, while the robot arm 5 is carrying out a mixing job in the position control mode, the person 4 attempts to correct the operation of the robot arm 5 so as to mix a portion on the bottom side of the pot 3, the control parameter managing unit 21 outputs an instruction to the control unit 22 so as to switch the mode to the hybrid impedance control mode. As a result, as shown in FIG. 12B, by allowing the person 4 to apply a force downward to the robot arm 5 while grabbing the robot arm 5 in the hybrid impedance control mode (see a downward arrow in FIG. 12B), it is possible to correct the mixing job in the vertical direction to a mixing job for mixing a portion on the bottom side of the pot, as shown by a downward arrow and an arrow in a rotation direction on the lower side, while carrying out the mixing job in the horizontal direction in the position control mode. This control method corresponds to the hybrid impedance control mode.

(v) Force Hybrid Impedance. Control Mode

The force hybrid impedance control mode is a mode of a control method for controlling operations of the robot arm 5 so that, during an operation of the robot arm 5 in the force control mode, the robot arm 5 is actuated in response to a force applied to the robot arm 5 by the person 4. More specifically, this mode is used in a case where, as shown in FIG. 16A, while the robot arm 5 is carrying out a wiping job on the top plate of an IH cooking heater 6 or the like, the person 4 finds a badly stained portion 91a, as shown in FIG. 16B, and the person 4 is allowed to grab the robot arm 5 to move the robot arm 5 to the badly stained portion 91a so as to correct the force to be applied to the top plate by the robot arm 5. Additionally, the force hybrid impedance control mode corresponds to a specific control mode to which the mode is switched by the control method switching unit 16.

The above-mentioned control modes can be set differently in the respective directions of the six axes.

For example, the wiping job of FIG. 16A is carried out by control modes in which switching is made among the hybrid impedance control mode, the impedance control mode and the position control mode so that the switched mode is further operated in the force control mode in which the operation is carried out with a force specified by the control method switching unit 16 being applied thereto. Additionally, it is not possible to set the impedance control mode in a di-reaction in which the force control mode has been set (that is, the force control mode and the impedance control made are in a mutually exclusive relationship).

For example, as shown in FIG. 16A, in a case where, upon carrying out a wiping job on the top plate of the IH cooking heater 6, the wiping job is executed with a force specified vertically downward onto the cleaning surface, while the job is being carried out circularly in parallel with the cleaning surface, more specifically, the six axes of (x, y, z, ϕ, θ, ψ) are respectively set in the following control modes. That is, the (x, y) components are set to the hybrid impedance control mode, the (ϕ, θ, ψ) components are set to the impedance control mode and the z-axis component is set to the force control mode. Upon correcting a force in the z-axis component, switching is made to the force hybrid impedance control mode.

In this manner, by setting the hybrid impedance control mode with respect to a horizontal direction relative to the cleaning surface, it is possible to move the robot arm 5 in response to a force applied to the robot arm 5 by the person 4 or the like, midway during the operation in the position control mode. Moreover, by setting the impedance control mode with respect to each of the (ϕ, θ, ψ) Components, the orientation of the robot arm 5 in a stopped state can be altered in response to a force applied to the robot arm 5 by the person 4 or the like. Furthermore, by setting the z-axis component to the force control mode, it is possible to carry out an operation with a specified pressing force being applied thereto. By further setting the force hybrid impedance control mode, the operation of the robot arm 5 can be corrected so as to carry out the wiping job by using a force applied by the person 4. Additionally, the operation may be carried out, with the force control mode being set only on the z-axis component among the six axes of (x, y, z, ϕ, θ, ψ), while the other axes are being operated in the position control mode. In this case, even upon application of an unexpected force, such as a collision force, to the robot arm 5, it is possible to prevent the position control component from being erroneously moved.

The high-rigidity position control mode is a mode in which the position control mode during the operation of the robot arm 5 is allowed to have higher rigidity. More specifically, this mode is achieved by making higher the gain in the positional error compensating unit 56, which will be described later, so that even when the person 4 applies a force thereto, the robot arm 5 cannot be easily moved. For this reason, by switching to the high-rigidity position control mode, with the robot arm 5 being not made in contact with the contact surface directly or indirectly, influences of a drag from the contact surface are prevented from being given thereto, it is possible to correctly detect a force applied by the person 4. Moreover, the current tip-unit position of the robot arm 5 that is carrying out a job such as a wiping operation on the contact surface is acquired, and by setting a position apart from the contact surface by a height h based upon the tip-unit position, the state in which the robot arm 5 is not made in contact with the contact surface directly or indirectly can be set (shown in FIG. 21A).

The low-rigidity position control mode is a mode in which the position control mode during the operation of the robot arm 5 is allowed to have lower rigidity. More specifically, this mode is achieved by making lower the gain in the positional error compensating unit 56, which will be described later, so that when the person 4 applies a force thereto, the robot arm 5 can be easily moved. For this reason, in a case where the force detection unit 53 fails to detect a force at the position where the person 4 grabs the robot arm 5, the person 4 is allowed to move the robot arm 5 down to a position where the robot arm 5 is made directly or indirectly in contact with the contact surface (made to collide with the contact surface), and to stop it at the contact position so that, by allowing the force detection unit 53: to detect the drag from the contact surface, it is possible to detect the force applied by the person 4 correctly.

With respect to these control modes, upon operating the robot arm 5, respectively appropriate control modes are set differently in the respective directions and orientations of the robot arm 5, and the robot arm 5 is operated correspondingly.

Moreover, during the operation of the robot arm 5 in the hybrid impedance control mode or in the impedance control mode, the person 4 can alter the setting of the tip unit position and orientation target correcting output $r_{d\Delta}$ to be outputted as a mechanical impedance parameter, or by the impedance calculation unit 51, in accordance with the parameter to be corrected.

The setting parameters of the mechanical impedance set values include inertia. M, viscosity D, and rigidity K. The setting of each of the parameters of the mechanical impedance set values is carried out by using a correction value based upon the following evaluation equations.

[Equation 2]

$$M = KM \times \text{(correction value)} \qquad \text{Equation (3)}$$

[Equation 3]

$$D = KD \times \text{(correction value)} \qquad \text{Equation (4)}$$

[Equation 4]

$$K - KK \times \text{(correction value)} \qquad \text{Equation (5)}$$

In the above-mentioned equations (3) to (5), KM, KD and, KK are gains, and correspond to certain constant values respectively.

The control parameter managing unit 21 outputs the inertia M, viscosity D, and rigidity K, that is, the mechanical impedance parameters calculated based upon the equations (3) to (5), to the control unit 22.

As shown in the equations (3) to (5), in a case where, with respect to the mixing operation in an upper portion of the pot 3 being carried out by the person 4 using the ladle 9 grabbed by the hand 30 of the robot arm 5 as shown in FIG. 12B, the person attempts to correct the operation of the robot arm 5 so as to mix a portion on the bottom side in the pot 3, if the positional components and the orientation components of the axes of the robot arm 5 other than the z-axis of the robot arm 5 are easily moved, it becomes difficult to carry out the correcting process on the operation of the robot arm 5. Therefore, by allowing the control parameter managing unit 21 to set the correction value higher only with respect to the positional components and orientation components of the axes other than the z-axis (more specifically, for example, to about 10 times as high as the correction value), the viscosity D, and rigidity K of the robot arm 5 are set to be greater; thus, the movements of the robot arm 5 become resistant or rigid so that the robot arm 5 is hardly moved.

Alternatively, another method is proposed in which among the respective components of the tip unit position and orientation target correcting output $r_{dΔ}$ to be outputted by the impedance calculation unit 51, all the values except for the value of the z-axis are set to 0. With this arrangement, since no movement is carried out by the force of the person 4 except for that in the z-axis direction, it becomes possible to prevent an erroneous manipulation.

Moreover, as described earlier, it is necessary to transfer pieces of information relating to the tip unit position and orientation of the robot arm 5, as well as the force applied by the person 4, from the control parameter managing unit 21 to the operation storage unit 15 and the operation correcting unit 20. For this reason, upon receipt of the information of the tip unit position of the robot arm 5 and the force by the control parameter managing unit 21 from the control unit 22, the control parameter managing unit 21 informs the operation storage unit 15 and the operation correcting unit 20 of these pieces of information. Moreover, the control parameter managing unit informs the control unit 22 of pieces of operation information, such as the position, orientation, and time, that have been inputted to the control parameter managing unit 21 from the operation correcting unit 20, from the control parameter managing unit 21.

—Control Unit—

Figure 3:
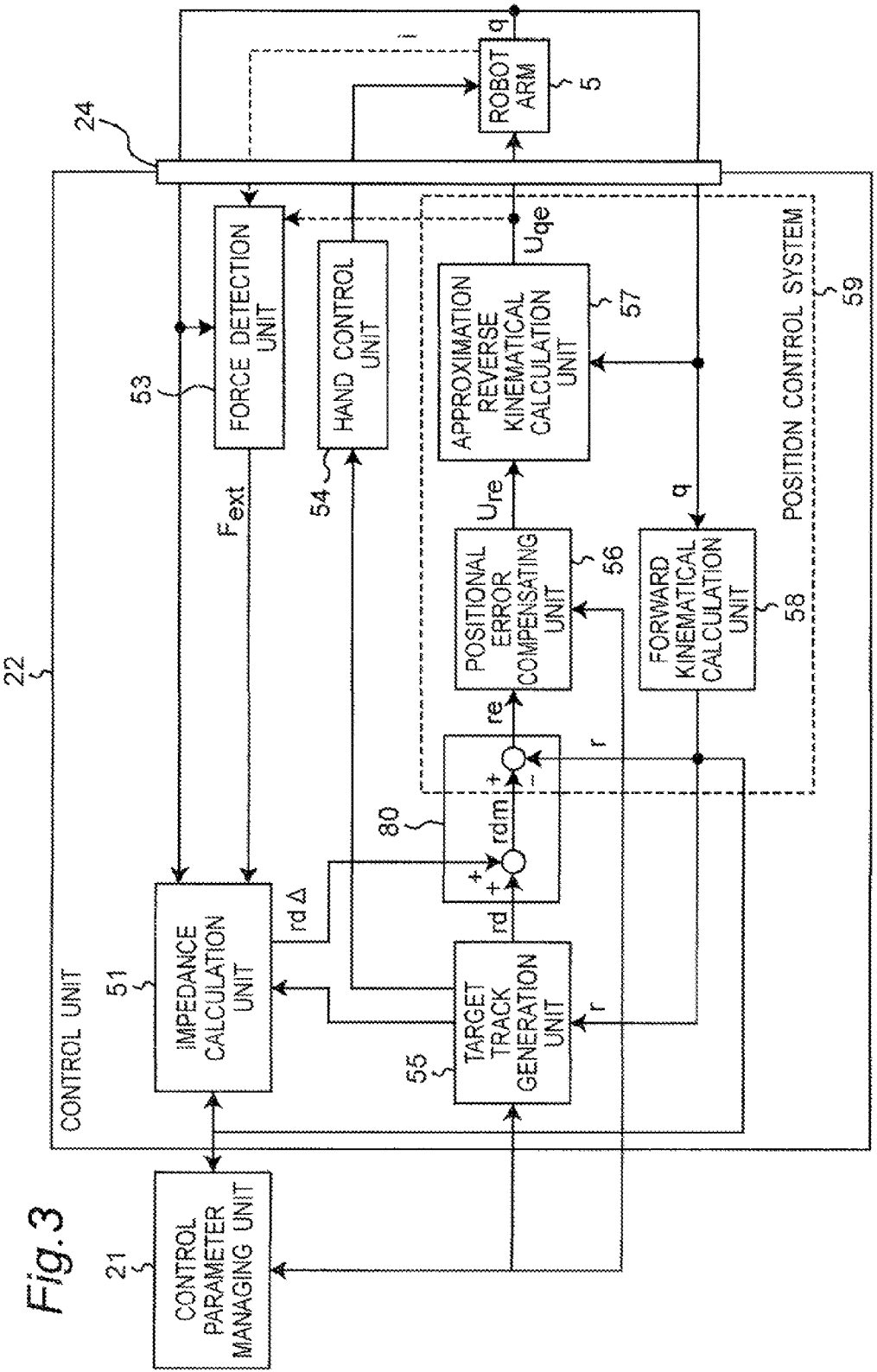
FIG. 3 is a block view showing the structure of a control unit of the control apparatus in the first embodiment of the present invention.

Referring to FIG. 3, the following description will discuss the control unit 22 in detail. The control unit 22 is constituted by a target track generation unit 55, a hand control unit 54, a force detection unit 53, an impedance calculation unit 51, a position control system 59 (having a positional error compensating unit 56, an approximation reverse kinematical calculation unit 57, and a forward kinematical calculation unit 58), and a positional error calculation unit 80. Although the force detection unit 53 is illustrated as one portion of the control unit 22 in FIG. 3, it may be prepared as a structure different from the control unit 22.

From the robot arm 5, a current value (joint angle vector) vector $q=[q_1, q_2, q_3, q_4, q_5, q_6]^T$ of each joint angle, measured by the encoder 44 of each of the joint axes, is outputted, and received by the control unit 22 through the input/output IF 24. In this case, $q_1, q_2, q_3, q_4, q_5, q_6$ are joint angles of the first joint portion 35, the second joint portion 36, the third joint portion 37, the fourth joint portion 38, the fifth joint portion 39, and the sixth joint portion 40.

In the target track generation unit 55, in order to operate the robot arm 5 in the position control mode, or in the force control mode, as well as in the position control mode or in the force control mode differently in the respective directions, target tip-unit position and orientation vectors $r_d$, and a force vector $f_d$ to be applied to the target tip unit (hand 30) are generated by the target track generation unit 55 from the operation information generated by the operation correcting unit 20 and inputted to the target track generation unit 55 through the control parameter managing unit 21.

More specifically, when the operation information is inputted to the target track generation unit 55 from the operation correcting unit 20 through the control parameter managing unit 21, the tip-unit position and orientation target vectors $r_d$, the force vector $f_d$ to be applied to the target tip unit, and flags indicating which parameter is valid differently depending on the respective directions, which are used for achieving a target operation of the robot arm 5, are outputted from the target track generation unit 55 to the positional error calculation unit 80. The target operation of the robot arm 5 is provided with a position and orientation ($r_{d0}, r_{d1}, r_{d2}, \ldots$), and a force ($f_{d0}, f_{d1}, f_{d2}, \ldots$) for each point of time ($t=0, t=t_1, t=t_2, \ldots$) from the operation correcting unit 20 in accordance with a target job, and the target track generation unit 55 interpolates the track and force between the respective points by using polynomial interpolation to generate the tip-unit position and orientation target vectors $r_d$, and the target force vector $f_d$.

At the time of the impedance control mode, the tip-unit position of the robot arm 5 at the time of switching to the impedance control mode is outputted as the tip-unit position and orientation target vectors $r_d$ to form a target. Moreover, an open/close instruction of the hand 30 is given to the hand control unit 54 to be described later, by using an open/close flag relating to the hand 30 in the operation information database 17.

Reference numeral 54 represents the hand control unit 54, which, based upon the open/close flag inputted from the target track generation unit 55, gives an instruction to the robot arm 5 through the input/output IF 24 so as to open/close the hand 30.

Reference numeral 53 represents the force detection unit which detects an external force $F_{ext}$ to be applied to the robot arm 5 by a contact between the person 4 or the like and the robot arm 5. In this case, when the robot arm 5 is being operated with an object having a weight m being grabbed by its tip unit, mg is preliminarily reduced from the detected $F_{ext}$. In this case, g represents gravitational acceleration. The value of a mass m of the grabbed object can be inputted to the force detection unit 53 through the data input IF 26 by the person 4, prior to grabbing the object.

The impedance calculation unit 51 is a unit having a function for allowing the robot arm 5 to achieve the control of a mechanical impedance value of the robot arm 5 to a mechanical impedance set value, and upon switching to the position control mode by the control parameter managing unit 21, 0 is outputted from the impedance calculation unit 51.

In contrast, upon switching to the impedance control mode or the hybrid impedance control mode in the control parameter managing unit 21, based upon the inertia M, viscosity D, and rigidity K that are impedance parameters preliminarily set by the control parameter managing unit 21, the current value q of each of the joint angles, and the external force $F_{ext}$ detected by the force detection unit 53, the tip unit position and orientation target correcting output $r_{dΔ}$, used for allowing the robot arm 5 to achieve the control of the mechanical impedance value of the robot arm 5 to a mechanical impedance set value, is calculated by the impedance calculation unit 51 based upon the following equation (6) so that the tip unit position and orientation target correcting output $r_{dΔ}$ thus calculated and found is outputted to the positional error calculation unit 80.

Moreover, in a case where, upon switching to the force control mode in the control parameter managing unit 21, there is a force component specified by "flag", based upon the inertia M, viscosity D, and rigidity K that are impedance parameters preliminarily set by the control parameter managing unit 21, the current value q of each of the joint angles, the external force $F_{ext}$ detected by the force detection unit 53, and $f_d$ outputted from the target track generation unit 55, the tip unit position and orientation target correcting output $r_{d\Delta}$, used for allowing the robot arm 5 to achieve the control of the mechanical impedance value of the robot arm 5 to a mechanical impedance set value, is calculated by the impedance calculation unit 51 based upon the following equation (10) so that the tip unit position and orientation target correcting output $r_{d\Delta}$ thus calculated and found is outputted to the positional error calculation unit 80.

The tip unit position and orientation target correcting output $r_{d\Delta}$ is added to the tip unit position and orientation target vector $r_d$ outputted by the target track generation unit 55 in the positional error calculation unit 80 so that a tip unit position and orientation correcting target vector $r_{dm}$ is generated. In a case where, at the time of the hybrid impedance control mode, the operation of the robot arm 5 is regulated in accordance with the correcting parameter, that is, for example, in a case where the robot arm 5 is allowed to move only in the z-axis direction, the impedance calculation unit 51 sets components of the tip unit position and orientation target correcting output $r_{d\Delta}$ other than the z component to 0.

[Equation 5]

$$r_{d\Delta} = (s^2 \hat{M} + s\hat{D} + \hat{K})^{-1} F_{ext} \quad \text{Equation (6)}$$

where the following equations are satisfied and s represents a Laplace operator.

[Equation 6]

$$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad \text{Equation (7)}$$

[Equation 7]

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad \text{Equation (8)}$$

[Equation 8]

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad \text{Equation (9)}$$

[Equation 9]

$$r_{d\Delta} = (s^2 \hat{M} + s\hat{D} + \hat{K})^{-1} (F_{ext} - f_d) \quad \text{Equation (10)}$$

In this case, M, D, and K are calculated by equation (7), equation (8), and equation (9).

Reference numeral 58 represents a forward kinematical calculation unit to which a joint-angle vector q that is the current value q of each of the joint angles measured by the encoder 44 of each of the joint portions of the robot arm 5 is inputted through the input/output IF 24. In the forward kinematical calculation unit 58, geometrical calculations are carried out to convert the joint angle vectors q of the robot arm 5 to the tip unit position and orientation vector r by the forward kinematical calculation unit 58. The tip unit position and orientation vector r calculated by the forward kinematical calculation unit 58 is outputted to the positional error calculation unit 80, the impedance calculation unit 51, and the target track generation unit 55.

Reference numeral 56 represents the positional error compensating unit, and after an error $r_e$ between the tip unit position and orientation vector r calculated by the forward kinematical calculation unit 58 from the joint angle vector q measured in the robot arm 5 and the tip unit position and orientation correcting target vectors $r_{dm}$ has been found by the positional error calculation unit 80, the error $r_e$ is inputted to the positional error compensating unit 56, and a positional error compensating output $u_{re}$ is outputted from the positional error compensating unit 56 to the approximation reverse kinematical calculation unit 57.

Moreover, when the high-rigidity position control mode is set, the positional error compensating unit 56 sets three gains, that is, proportional, differential, and integral gains, that are diagonal matrixes of a constant to predetermined greater values, that is, values greater than those in the normal position control mode. More specifically, the values are set about two times as high as those values in the normal position control mode. In this case, "high rigidity" means higher rigidity in comparison with that in the normal position control mode. When the values are set to two times as high as those values in the normal position control mode, the rigidity can be made about two times as high as that in the normal position control mode. Thus, it becomes possible to achieve a position controlling process with high rigidity. Additionally, by changing the gain values for each of the components, for example, a controlling process can be carried out with high rigidity only in the z-axis direction, with the normal positional control being carried out in the other directions.

Furthermore, when the low-rigidity position control mode is set, the positional error compensating unit 56 sets three gains, that is, proportional, differential, and integral gains, that correspond to diagonal matrixes of a constant to predetermined smaller values, that is, values smaller than those in the normal position control mode. More specifically, each of the values is set about a half of each of those values in the normal position control mode. In this case, "low rigidity" means lower rigidity in comparison with that in the normal position control mode. When each of the values is set to about a half of each of those values in the normal position control mode, the rigidity can be made about half that in the normal position control mode; thus, it becomes possible to achieve a position controlling process with low rigidity. Additionally, by changing the gain values for each of the components, for example, a controlling process can be carried out with low rigidity only in the z-axis direction, with the normal positional control being carried out in the other directions.

Based upon the positional error compensating output $u_{re}$ inputted from the positional error compensating unit 56 and the joint angle vector q measured in the robot arm 5, the approximation reverse kinematical calculation unit 57 carries out approximation calculations of reverse kinematics by using an approximation $u_{out}=J_r(q)^{-1}u_{in}$.

$$\dot{r}=J_r(q)\dot{q} \qquad \text{[Equation 10]}$$

In this case, $J_r(q)$ is a Jacob matrix that satisfies the above equation, $u_{in}$ is an input to the approximation reverse kinematical calculation unit 57, and $u_{out}$ is an output from the approximation reverse kinematical calculation unit 57, and supposing that the input $u_t$, is a joint angle error $q_e$, a conversion equation from the tip unit position and orientation error $r_e$ to the joint angle error $q_o$, as represented by $q_o=J_r(q)^{-1}r_e$, is obtained. Therefore, when the positional error compensating output $u_{re}$ is inputted to the approximation reverse kinematical calculation unit 57 from the positional error compensating unit 56, a joint angle error compensating output $q_{uo}$ for use in compensating for the joint angle error $q_o$ is outputted from the approximation reverse kinematical calculation unit 57 to the motor driver 25 of the robot arm through the input/output IF 24 as an output from the approximation reverse kinematical calculation unit 57.

The joint angle error compensating output $U_{qo}$ is given to the motor driver 25 of the robot arm 5 through the D/A board of the input/output IF 24 as a voltage instructing value, and, each of the joint portions is consequently driven to forwardly/reversely rotate by each of the motors 43 so that the robot arm 5 is operated.

With respect to the control unit 22 configured as described above, the following description will discuss a principle of the impedance-controlling operation of the robot arm 5.

The impedance controlling operation basically corresponds to a feed-back controlling (position-controlling) operation of the tip unit position and the orientation error by the positional error compensating unit 56 (in the same manner as in the hybrid impedance control), and a portion, surrounded by a dotted line in FIG. 3, corresponds to a position controlling unit 59. For example, when a PID compensator is used as the positional error compensating unit 56, a controlling operation is executed by the position controlling unit 59 so that the tip unit position and the orientation error $r_o$ is converged to 0; thus, it becomes possible to achieve a target impedance controlling operation of the robot arm 5.

Upon switching to the impedance control mode or the hybrid impedance control mode or the force hybrid impedance control mode in the control parameter managing unit 21, the tip unit position and orientation target correcting output $r_{d\Delta}$ is added by the impedance calculation unit 51 in the positional error calculation unit 80 with respect to the position control system 59 explained earlier so that the target value of the tip unit position and orientation is corrected. For this reason, in the position control system 59, the target value of the tip unit position and orientation is slightly deviated from the original value, with the result that an operation for controlling the mechanical impedance value of the robot arm 5 to the appropriately determined set value is achieved so that the positional controlling operation of the position control system 59 can be corrected. Since the tip unit position and orientation target correcting output $r_{d\Delta}$ is calculated by equation (6) in the case of the impedance control mode or the hybrid impedance control mode, and since the output is calculated by equation (10) in the case of the force hybrid impedance control mode, operations for controlling the mechanical impedance values of the inertia M, viscosity D, and rigidity K of the robot arm 5 to the appropriately determined set values can be achieved.

(Peripheral Apparatus 14)

The peripheral apparatus 14 is designed to have a data input IF (interface) 26, an input/output IF (interface) 24, a motor driver 25, and a display unit 2. Control information such as control signals is outputted from the control unit 22 to the input/output IF 24. Correcting information, such as a correcting parameter or the like stored in the operation information database 17, and an image, a photograph or a text corresponding to an operation ID axe outputted from the operation correcting unit 20 to the display unit 2 so that the image, photograph or text of the operation of the robot arm 5, described in the operation information, is displayed on the display unit 2.

The input/output IF 24 is designed to have, for example, a D/A board, an A/D board, and a counter board that are connected to an expansion slot, such as a PCI bus of a personal computer. To the input/output IF 24, respective pieces of joint angle information outputted from encoders 44, which will be described later, of the respective joint portions of the robot arm 5, and angle information outputted from an encoder 61 of the hand 30 are inputted, and the input/output IF 24 inputs these pieces of information to the control unit 22. Moreover, control information, such as control signals, is also inputted to the input/output IF 24 from the control unit 22, and the input/output IF 24 outputs control information, such as a control instruction value, to the motor driver 25. The motor driver 25 outputs control information, such as control instruction values, to a motor 43, which will be described later, of each of the joint portions of the robot arm 5, and a motor 62 of the hand 30.

The data input IF (interface) 26 is an interface through which the person 4 inputs or alters operation information to be described later by using an input device, such as a keyboard, a mouse or a microphone. Moreover, the data input IF 26 may be designed so that, by using an input device such as a button 13a of the operation panel 13 of FIG. 1, instructions for starting and finishing a control operation as well as for starting and finishing a correcting operation, given by the person 4, are received by the operation instruction unit 27. The button 13a may be prepared as, for example, a toggle switch so that inputting operations for starting the control operation and for finishing the control operation can be carried out by using a single button, or may be prepared as a control operation starting button and a control operation finishing button separately.

The display unit 2 is prepared as, for example, a display device formed on the side surface of the robot arm 5 or the work bench 7, and used for displaying operation information and the like.

Figure 15:
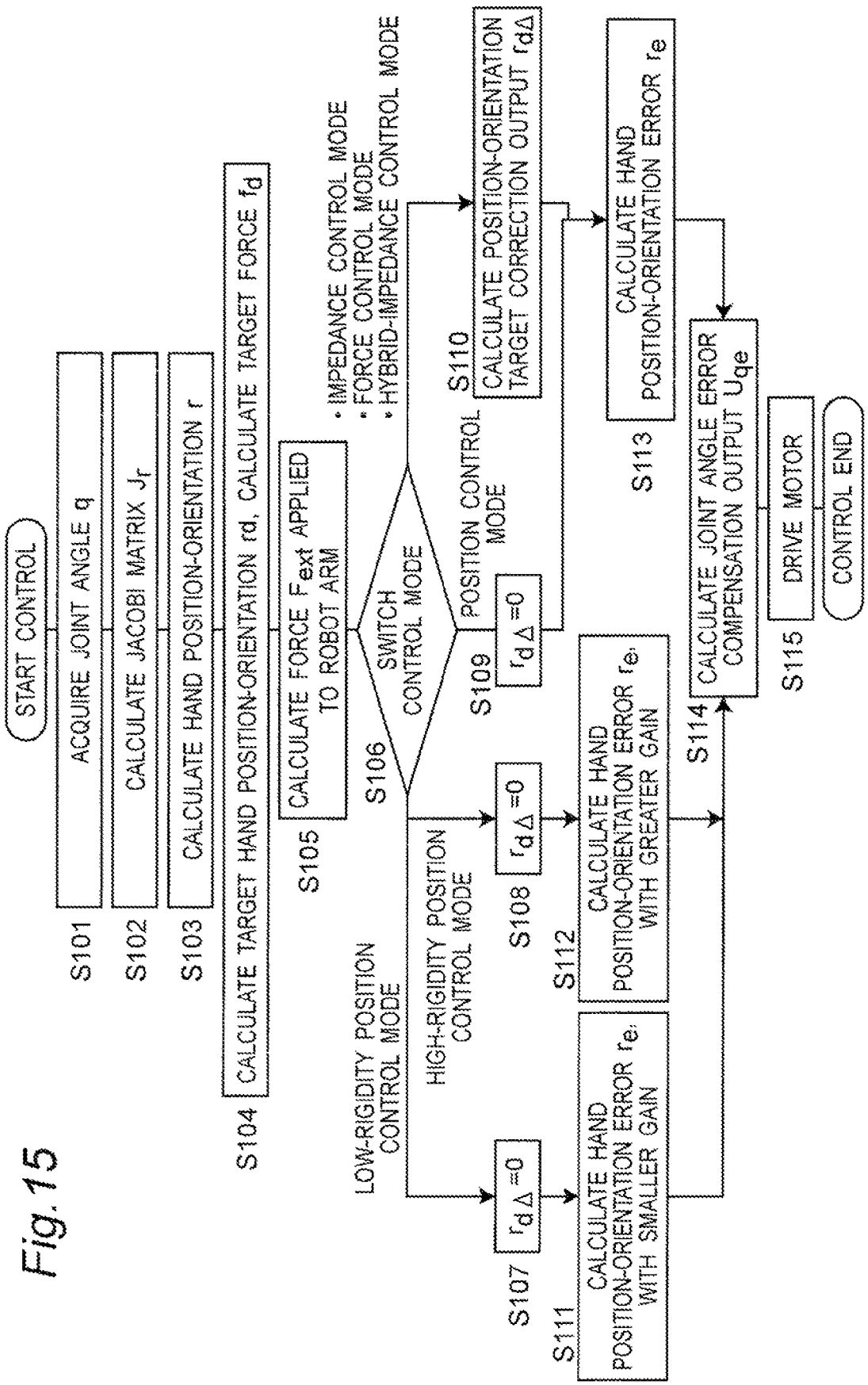
FIG. 15 is a flow chart showing operation steps of a control unit of the control apparatus for a robot in accordance with the present invention.

Referring to a flow chart of FIG. 15, the following description will discuss actual operation steps of the control program that is made based upon the principle described above.

The joint angle data (joint variable vector or joint angle vector q), calculated by each of the encoders 44 of the joint portions of the robot arm 5, is received by the control unit 22 of the control apparatus main unit 11 from the encoder 44 through the input/output IF 24 (step s101).

Next, based upon the joint angle data (joint variable vector or joint angle vector q) thus received by the control unit 22, the reverse kinematical calculation unit 57 executes calculations, such as the Jacob matrix $J_r$ required for kinematical calculations of the robot arm 5 (step S102).

Next, the forward kinematical calculation unit 58 calculates the current tip unit position and orientation vector r of the robot arm 5 from the joint angle data (joint variable vector or joint angle vector q) from each of the encoders 44 of the robot arm 5, and outputs the resulting data to the positional error calculation unit 80, the target track generation unit 55, and the impedance calculation unit 51 (step S103).

Next, based upon operation information transmitted from the operation correcting unit 20 through the control parameter managing unit 21, the target track calculation unit 55 calculates the tip unit position and orientation target vector $r_d$ of the robot arm 5, and the target force vector $f_d$, and at the time of the impedance control mode, outputs the tip unit position of the robot arm 5 to the positional error calculation unit 80 as a target tip unit position and orientation target vector $r_d$ (step S104).

Next, the force detection unit 53 calculates an equivalent tip-unit external force $F_{ext}$ at the tip unit of the robot arm 5 from a driving current value i of the motor 43, the joint angle data (joint variable vector or joint angle vector q), and the joint angle error compensating output $u_{qe}$, and outputs the resulting data to the impedance calculation unit 51 (step S105).

Next, in step S106, in a case where the operation correcting unit 20, which will be described later, gives an instruction that "correction is required", while the force component of the six axes is to be corrected by a correction parameter, in the control parameter managing unit 21, as well as in a case where switching is made to the low-rigidity position control mode in the control method switching unit 16, the control mode of the component set as the force component is switched to the low-rigidity position control mode. Thereafter, the sequence proceeds to step S107.

Moreover, in step S106, in a case where the operation correcting unit 20, which will be described later, gives an instruction that "correction is required", while the force component of the six axes is to be corrected by a correction parameter, in the control parameter managing unit 21, as well as in a case where, switching is made to the high-rigidity position control mode in the control method switching unit 16, the control mode of the component set as the force component is switched to the high-rigidity position control mode. Thereafter, the sequence proceeds to step S108.

Furthermore, in step S106, in a case where a positional component of the six axes is corrected in the control parameter managing unit 21, the desired positional component to be corrected is switched to the impedance control mode by the control method switching unit 16. Thereafter, the sequence proceeds to step S110.

Furthermore, in step S106, in a case where no correction is made in the control parameter managing unit 21, the sequence proceeds to step S109 so that the position control mode is set.

In step S106, in a case where the operation correcting unit 20, which will be described later, gives an instruction that "correction is required", while the force component of the six axes is to be corrected by a correction parameter, in the control parameter managing unit 21, as well as in a case where "no switching" is set in the control method switching unit 16, the control mode is switched to the control method (force control mode) prior to the switching. Thereafter, the sequence proceeds to step S110.

In step S107 (processes in the impedance calculation unit 51), in a case where the low-rigidity position control mode is set in the control parameter managing unit 21, the impedance calculation unit 51 sets the tip unit position and orientation target correcting output $r_{d\Delta}$ to 0 vector. Thereafter, the sequence proceeds to step S111.

In step S108 (processes in the impedance calculation unit 51), in a case where the high-rigidity position control mode is set in the control parameter managing unit 21, the impedance calculation unit 51 sets the tip unit position and orientation target correcting output $r_{d\Delta}$ to 0 vector. Thereafter, the sequence proceeds to step S112.

In step S109 (processes in the impedance calculation unit 51), in a case where the position control mode is set in the control parameter managing unit 21, the impedance calculation unit 51 sets the tip unit position and orientation target correcting output $r_{d\Delta}$ to 0 vector. Thereafter, the sequence proceeds to step S113.

In step S110, in a case where the impedance control mode or the force control mode is set in the control parameter managing unit 21, based upon the inertia M, viscosity D, and rigidity K of the mechanical impedance parameters, set by the control parameter managing unit 21, the joint angle data (joint variable vector or joint angle vector q), and the equivalent tip-unit external force $F_{ext}$ to be applied to the robot arm 5 calculated by the force detection unit 53, the tip unit position and orientation target correcting output $r_{d\Delta}$ is calculated by the impedance calculation unit 51. Moreover, based upon the correction parameters, any one of the component values of the tip unit position and orientation target correcting output $r_{d\Delta}$ is set to 0.

In step S113, the positional error compensating unit 56 calculates a tip unit position and orientation correction target vector $r_{dm}$, which is a sum between the tip unit position and orientation target vector $r_d$ and the tip unit position and orientation target correcting output $r_{d\Delta}$, and an error $r_a$ of the tip unit position and orientation corresponding to a difference between the current tip unit position and orientation vector r. As a specific example of the positional error compensating unit 56, a PID compensator is proposed. By appropriately adjusting three gains, that is, proportional gain, differential gain, and integral gain, corresponding to an orthogonal matrix of a constant, the controlling process of the positional error compensating unit 56 is executed so as to converge the positional error to 0. Thereafter, the sequence proceeds to step S114.

In step S111, by appropriately adjusting three gains, that is, proportional gain, differential gain and integral gain, corresponding to an orthogonal matrix of the constant of the positional error compensating unit 56, the controlling process of the positional error compensating unit 56 is executed so as to converge the positional error to 0. By reducing each of the gains to a certain value, the positional controlling process with low rigidity is achieved. Thereafter, the sequence proceeds to step S114.

In step S112, by appropriately adjusting three gains, that is, proportional gain, differential gain, and integral gain, corresponding to an orthogonal matrix of the constant of the positional error compensating unit 56, the controlling process of the positional error compensating unit 56 is executed so as to converge the positional error to 0. By increasing each of the gains to a certain value, the positional controlling process with high rigidity is achieved. Thereafter, the sequence proceeds to step S114.

In step S114, in the approximation reverse kinematical calculation unit 57, by multiplying the positional error compensating output $u_{re}$ by a reverse matrix of the Jacob matrix $J_r$ calculated in step S102, the approximation reverse kinematical calculation unit 57 converts the positional error compensating output $u_{re}$ from the value relating to the error of the tip unit position and orientation to a joint angle error compensating output $u_{qe}$ that is a value relating to the error of the joint angle.

Next, in step S115, the joint angle error compensating output $u_{qe}$ is given to the motor driver 25 from the approximation reverse kinematical calculation unit 57 through the input/output IF 24. Based upon the joint angle error compensating output $u_{qe}$, the motor driver 25 changes the amount of electric current flowing through each of the motors 43 of the joint portions. By this change in the amount of electric current, a rotating movement is generated in each of the joint portions in the robot arm 5 so that the robot arm 5 carries out operations.

By executing the above-mentioned steps S101 to S115 repeatedly as the controlling calculation loop, the control of the operations of the robot arm 5 can be achieved, that is, the controlling operations for setting the mechanical impedance values of the robot arm 5 to the appropriately determined set values can be achieved.

Referring to a flow chart of FIG. 17, the following description will discuss operation steps of the above-mentioned operation correcting unit 20, data input IF 26, operation storage unit 15, operation information database 17, grabbed position detection unit 23, control method switching unit 16, and control parameter managing unit 21.

The person 4 is allowed to input a selection instruction corresponding to a job to be desirably executed by the robot arm 5 selected among the jobs in the operation information database 17, that is, a selection instruction for a selected (specified) "job ID", to the operation instruction unit 27 through the data input IF 26 (step S50).

Next, based upon the selection instruction inputted to the operation instruction unit 27, the operation correcting unit 20 sets a control mode in accordance with the "flag" of the operation information relating to the "job ID" stored in the operation information database 17 and then selected (specified) (step S51).

Next, when the person 4 inputs an instruction for starting the operation of the selected job to the operation instruction unit 27 by using the data input IF 26, the operation instruction unit 27, upon receipt of the operation starting instruction, gives an instruction for carrying out the operation in the set control mode to the control parameter managing unit 21 through the operation correcting unit 20 (step S52). The control parameter managing unit 21 gives an instruction to the control unit 22 so as to operate the robot arm 5 in the set control mode so that the robot arm 5 is operated under control of the control unit 22.

Next, during the operation of the robot arm 5, the person 4 inputs an instruction for starting a correction to the operation instruction unit 27 by using the input IF 26 (step S53). Upon receipt of the instruction for starting a correction, the operation instruction unit 27 inputs an instruction for starting the operation correction to the operation correcting unit 20. Then, in a case where the "operation parameter flag" corresponds to the force control mode, the operation correcting unit 20 gives an instruction for switching the control method to the control method switching unit 16. The control method switching unit 16 determines the control method based upon the grabbed position (step S54) detected by the grabbed position detection unit 23 and information stored in the force detection unit characteristic database 18, and gives an instruction to the control parameter managing unit 21 so as to carry out the operation in the determined control method (step S55).

Next, by allowing the person 4 to grab the robot arm 5 and apply a force to the robot arm 5 in a desired correcting direction, the operation correcting unit 20 corrects the operation information. More specifically, the force detection unit 53 detects the information of the force used by the person 4 to make the correction (step S56), and the resulting information detected by the force detection unit 53 is inputted to the operation correcting unit 20 through the control parameter managing unit 21 the operation correcting unit 20, of the operation information of "job ID" and "operation ID", the value of the force component of the z-axis that is being operated in the force control mode is revised to the value of the inputted force component so as to be corrected (step S57).

Next, the operation information corrected by the operation correcting unit 20 is stored in the operation information database 17 by the operation storage unit 15 (step S58).

By using the above-mentioned operation steps S101 to S115 of FIG. 15 and operation steps S50 to S58 of FIG. 17, even when the person 4 directly grabs any portion (any position) of the robot arm 5 during the operation of the robot arm 5, the force applied by the person 4 is correctly detected by the force detection unit 53 based upon operation information, and based upon the force information detected by the force detection unit 53, the operation correction unit 20 can correct the operation information.

The following explanation will be given by exemplifying a case in which, midway during a wiping Job in the force control mode, in an attempt to correct the degree of a force to be applied to the wiping job by applying a force to the robot arm 5 more strongly, the person 4 switches the control method by the control method switching unit 16 so that the operation for the wiping job of the robot arm 5 is corrected. For example, after the control method has been switched: to the high-rigidity position control mode, the operation correcting process is carried out by further switching to a slightly floated state from the contact surface (see FIG. 21A) so as to eliminate influences of the drag from the contact surface; however, since, midway during the correction of the force by the person 4, the high-rigidity position control mode is exerted with the slightly floated state from the contact surface, it is not possible to carry out the correction while confirming how much stain is being removed in real time by applying the corrected force. Therefore, in the control method switching unit 16, upon switching to either the low-rigidity position control mode or the high-rigidity position control mode in step S3 of the flow chart of FIG. 11, switching processes are alternately carried out between the force control mode prior to the correction and the control mode during the correction (the low-rigidity position control mode or the high-rigidity position control mode) (more specifically, the switching processes are carried out every 0.02 seconds). In the force control mode, the force control is carried out by using the corrected force, and in the control mode during, the correction (in the low-rigidity position control mode or the high-rigidity position control mode), by alternately carrying out the corrections by the use of the corrected force repeatedly, the operation correcting unit 20 is allowed to carry out the correction while confirming whether the job is being carried out correctly based upon the value corrected by the person 4.

Additionally, in this example, the explanation has been given by exemplifying the wiping job; however, as shown in FIG. 14, midway during a mixing operation in the force control mode while rubbing the bottom of the pot, the correction can be made as well by the operation correcting unit 20 in the same method.

Moreover, in this example, the explanation has been given by exemplifying a structure, in which the force detection unit 53 is attached to the wrist (hand 30); however, in a case where, as shown in FIG. 27A, a manipulation-use force sensor 53a and a control-use force sensor 53b are attached thereto, or in a case where, as shown in FIG. 27B, torque sensors, 53c, 53d, and 53c are attached to the respective joints, the correction can be made by using the same method, by preparing the force detection unit character database 18 in association with the characteristics of the force sensors 53a, 53b, 53c, 53d, and 53e, as shown in FIG. 31A or FIG. 31A.

Figure 28:
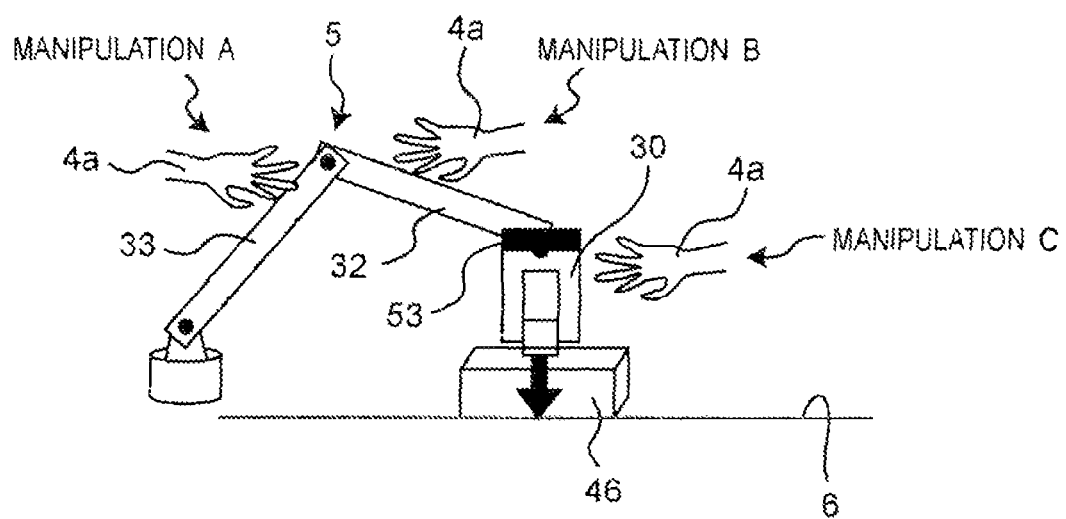
FIG. 28 is a view showing a robot arm manipulating state by a person carried out on the robot arm in the control apparatus for a robot in the first embodiment of the present invention.

Moreover, in a case where the person 4 is carrying out a manipulation in a bridging manner among a plurality of grabbed positions, such as a border between the manipulation A and the manipulation B in FIG. 28, or between the manipulation B and the manipulation C, the grabbed position at which a more grabbed portion is grabbed by the hand 4a of the person 4 may be detected by the grabbed position detection unit 23.

Second Embodiment

Since the basic structure of a control apparatus of the robot arm in a second embodiment of the present invention is the same as that of the first embodiment, explanations for the common portions will be omitted, and the following description will discuss only different portions in detail.

Figure 18:
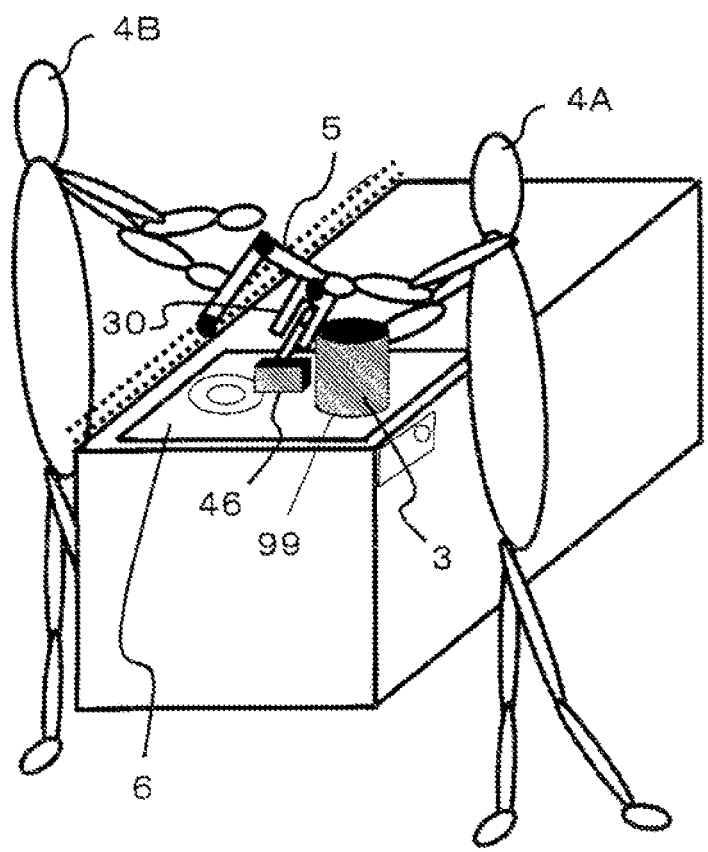
FIG. 18 is a view showing an operation of the control apparatus for a robot and a manipulation state of the robot arm by a person of a second embodiment of the present invention.
Figure 19:
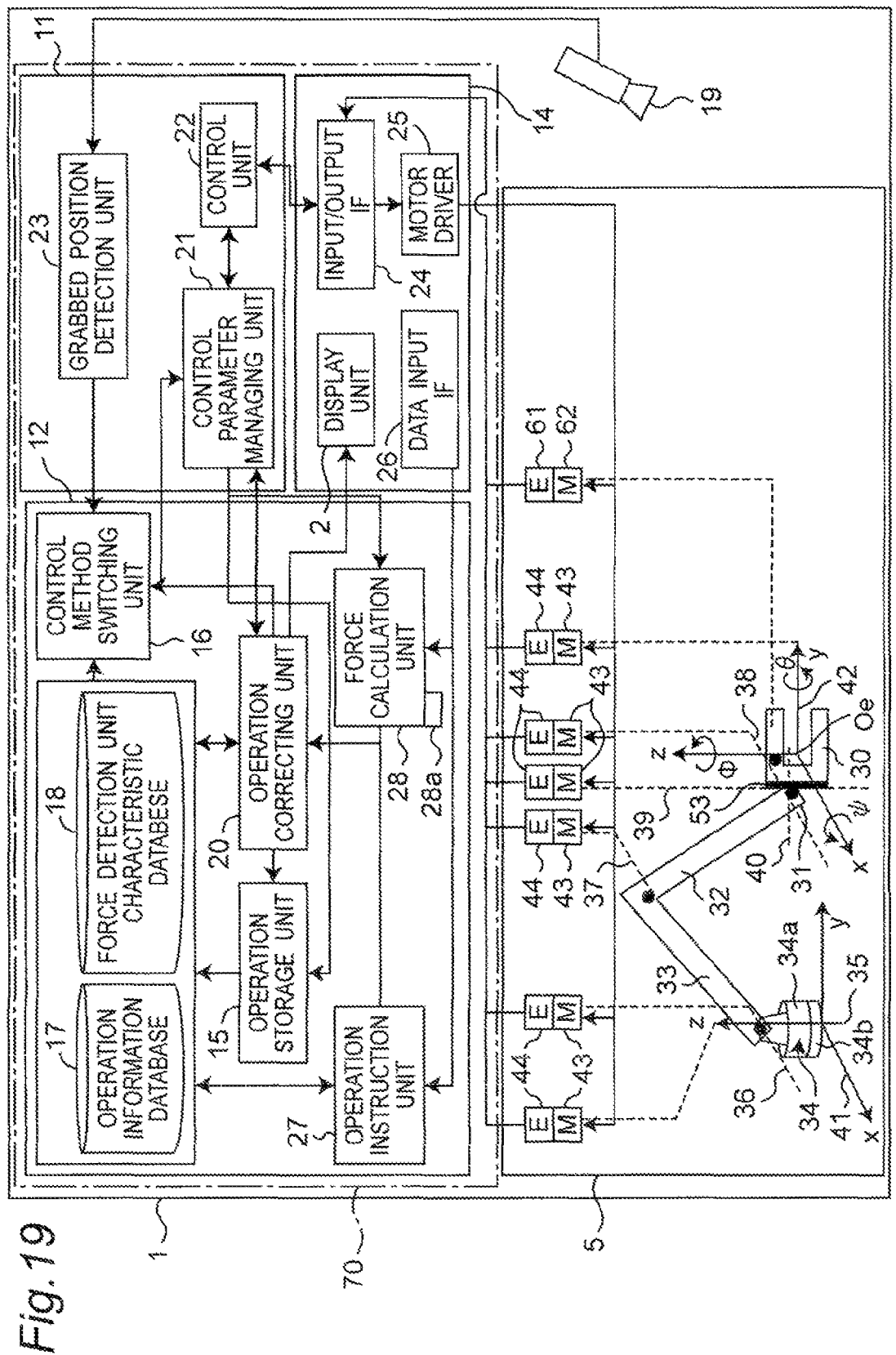
FIG. 19 is a view showing detailed structures of the control apparatus and a robot arm to be controlled that form a robot system in the second embodiment of the present invention.

In the same manner as in the first embodiment, as shown in FIGS. 16A and 16B, the following explanation will be given by exemplifying a state in which, when a wiping job is carried out by using a robot system 1, the manipulation is carried out with one robot arm 5 being grabbed by a plurality of persons 4A, 4B, as shown in FIG. 18, or the manipulation is carried out with a plurality of portions of one robot arm 5 being grabbed by one person 4. FIG. 19 is a view showing specific structures of a robot arm 5 that is a target to be controlled and a control apparatus 70 for the robot arm 5, which form the robot system 1 in the second embodiment. Since the robot arm 5, the peripheral apparatus 14, the control parameter managing unit 21, the control unit 22, the control apparatus 70, the operation information database 17, the force detection unit characteristic database 18, the operation instruction unit 27, and the operation storage unit 15 are the same as those of the first embodiment, the descriptions there of will be omitted. A major difference from the first embodiment is that a force calculation unit 28 is installed, which calculates one force to be used for an operation correcting process from a plurality of pieces of force information detected by the force detection unit 53, by using a force calculation method table 81, which will be described later.

When a person 4 grabs the robot arm 5, the grabbed position detection unit 23 detects which portion of the robot arm 5 is grabbed by the person 4 to manipulate the robot arm 5, and in a case where a plurality of persons 4A, 4B grab the robot arm 5 or in a case where one person 4 grabs a plurality of portions thereof by using both of the hands or the like, the grabbed position detection unit 23 detects the respective grabbed positions. More specifically, based upon image data of the image pick-up device 19 such as a camera, the hands of the manipulating persons 4, 4A, and 4B are image-recognized, and the grabbed position detection unit 23 detects which portion among the fore-arm link 32, the upper arm link 33, and the hand 30 of the robot arm 5 is being grabbed by each of the person's hands for manipulation.

Based upon the grabbed position detected by the grabbed position detection unit 23 and information stored in the force detection unit characteristic database 18, the control method switching unit 16 switches the control method when the person 4 grabs the robot arm 5 to correct the force parameter.

In a case where a plurality of grabbed positions are detected, the control method switching unit 16 finds the control method at each of the grabbed positions by using the same method as that of the first embodiment. For example, in a case where the robot arm 5 is operated with the two portions of the fore-arm link 32 and the hand 30 being grabbed by one person 4, the control method switching unit 16 detects from the force detection unit characteristic database 18 that by using the force detection unit characteristic database 18 of FIG. 9A, when the person 4 grabs the fore-arm link 32 of the robot arm 5 for manipulation of the robot arm 5, the "grabbed position ID" becomes "2" based upon the force detection unit characteristic database 18 of FIG. 94, and that by using the force detection unit characteristic database 18 of FIG. 9A, the "presence/absence of detection" becomes "0" in the case of "2" of the "grabbed position ID", with the "presence/absence of possibility of influences of a drag" corresponding to "1". In the same manner, when the person 4 grabs the hand 30, the control method switching unit 16 detects from the force detection unit characteristic database 18 that the "grabbed position ID" becomes "4" based upon the force detection unit characteristic database 18 of FIG. 9B, and that by using the force detection unit characteristic database 18 of FIG. 9A, the "presence/absence of detection" becomes "1" in the case of "4" of the "grabbed position ID", with the "presence/absence of possibility of influences of a drag" corresponding to "1". The control method switching unit 16 finds the control method at each of the grabbed positions. For example, in the case of "2" of the "grabbed position ID" (in the case of the "fore-arm"), in the same manner as in the first embodiment, since, based upon the flow chart of FIG. 11, the "presence/absence of detection" is "0", with the "presence/absence of possibility of influences of a drag" corresponding to "1", the low-rigidity position control mode is set (see step S6 of FIG. 11). In the case of "4" of the grabbed position ID (in the case of the "hand"), in the same manner as in the first embodiment, since, based upon the flow chart of FIG. 11, the "presence/absence of detection" is "1", with the "presence/absence of possibility of influences of a drag" corresponding to "1", the high-rigidity position control mode is set (see step S5 of FIG. 11). Next, the control modes thus found (the low-rigidity position control mode and the high-rigidity position control mode in this example) are alternately switched repeatedly by the control method switching unit 16.

By using the same method as that of the first embodiment, a force is detected by the force detection unit 53 at each of the entire grabbed positions, and the results thus detected are inputted to the operation correcting unit 20 through the control parameter managing unit 21.

FIG. 20A is an example of the force calculation method table 81 stored in a built-in database of the force calculation unit 28 or the memory 28a thereof.

In this Figure, "calculation method" refers to a description as to how to calculate information (force information) relating to each force from the pieces of information (force information) relating to a plurality of forces detected by the force detection unit 53 in the force calculation unit 28 of FIG. 19. More specifically, upon calculating the maximum value from the pieces of force information, a description "maximum" is given thereto, upon calculating the minimum value from the pieces of force information, a description "minimum" is given thereto, upon calculating, the average value of the pieces of force information, a description "averaged" is given thereto, upon finding a sum of the pieces of force information, a description "summed" is given thereto, and upon finding a sum of the pieces of force information after multiplying the pieces of force information by weight coefficients, a description "weighted" is given thereto.

When switching is made among a plurality of control methods in the control method switching unit 16, the force calculation unit 28 calculates to find one force to be used for the operation correction from pieces of force information detected by the force detection unit 53 at the respective grabbed positions, while the person 4 is grabbing the robot arm 5 at a plurality of grabbed positions, by using the force calculation method table 81.

More specifically, the force calculation unit 28 refers to the force calculation method table 81, and executes calculations, for example, in accordance with a "calculation method", with its "flag" being set to "1". In the case of the force calculation method of table 81 shown in FIG. 20A, since the "summed" value is "1", the force calculation unit 28 sums up all the values of the output values of the force detection unit 53 at the respective grabbed positions.

The "flag" corresponds to a flag for indicating which calculation method is valid among a plurality of calculation methods, and in this example, since the method for calculating the "summed" value is "1", it is indicated that the method for calculating the "summed" value in the force calculation unit 28 is valid. Therefore, pieces of force information detected by the force detection unit 53 at the respective grabbed positions are all summed up by the force calculation unit 28. The value of the forces summed up by the force calculation unit 28 is outputted to the operation correcting unit 20.

Additionally, in a case where the "calculation method" of FIG. 20A corresponds to "weighted", a description is given as ("flag", "coefficient ID") as shown in FIG. 20A, and the "flag" is a flag indicating which calculation method is used for the calculations, and the "coefficient ID" corresponds to a weighting coefficient indicated by the coefficient ID shown in FIG. 20C.

As shown in FIG. 20A, in a case where the "calculation method" corresponds to "weighted" as shown in FIG. 20A, if the coefficient ID is "4", the force calculation unit 28 preliminarily acquires the coefficient as (0.6, 0.4) from FIG. 20C. In a case where the person 4 grabs two positions of the robot arm 5, based upon these coefficients, the force calculation unit 28 multiplies the value of a force first detected by the force detection unit 53 by 0.6, and the force calculation unit 28 multiplies the value of a force second detected by the force detection unit 53 by 0.4 so that the values obtained by respectively multiplying the coefficients are summed up by the force calculation unit 28. In a case where the robot arm 5 is grabbed at three positions, the calculations can be carried out by using "3" as the "coefficient ID" of FIG. 20C.

In the operation correcting unit 20, the operation information of the operation information database 17 is corrected in the same method as that of the first embodiment.

As described above, even in a case where a plurality of portions of the robot arm 5 are grabbed by a plurality of persons 4A, 4B, or by a person 4 with both of the hands, the force can be correctly detected by the force detection unit 53 and the force calculation unit 28. Moreover, by preparing the force calculation unit 24, even when the person 4 is an elder person or a child, with the force for use in correction being insufficient, the "summed" value is used in the calculation method so that a greater force can be applied. Moreover, in a case where a child and an adult are respectively grab the robot arm, by selecting the "maximum" value as the "calculation method" in the force calculation unit 28, a force applied by the adult rather than a force applied by the child can be preferentially used. Furthermore, in a case where one person 4 manipulates the robot arm by using both of the hands, by selecting "maximum" value as the "calculation method" in the force calculation unit 28, a force that is exerted by one hand that is more comfortably used with a stronger force than the other hand can be preferentially selected rather than the force to be applied by the other hand. Moreover, in a case where a plurality of positions are grabbed, by selecting the "minimum", or "averaged" or "weighted" value as the "calculation method", a safer manipulation can be obtained in order to prevent a strong force from being abruptly applied to cause a dangerous state.

In this example, the "summed" value is used as the "calculation method"; however, the person 4 may be allowed to input which calculation method to be selected through the data input IF 26 or the like. In this case, "1" is set to the flag of the "calculation method" inputted through the data input IF 26. Moreover, depending on the state of the person 4 to carry out manipulations (for example, depending on an elder person, a child, or the like), calculations can be carried out, while switching is made among the ID1 to ID3 on demand, for example, as shown in FIG. 20B. In this case, an ID used for identifying whether "an elder person" or "a child" or the like may be inputted, or the age of the operator may be inputted by using the data input IF 26 so that, if he or she is 65 years old or more, the determination is made as "an elder person", while, if he or the is 15 years old or less, the determination is made as "a child" by the force calculation unit 28 so that it is possible to detect whether the person is an elder person or a child.

Third Embodiment

Since the basic structure of a control apparatus of the robot arm in a third embodiment of the present invention is the same as that of the first embodiment, explanations for the common portions will be omitted, and the following description will discuss only different portions in detail.

Figure 22A:
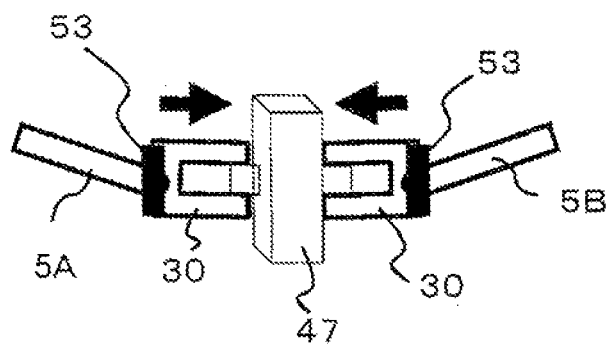
FIG. 22A is a view showing an operation of the control apparatus for a robot and a manipulation state of the robot arm by a person of a third embodiment of the present invention.
Figure 22B:
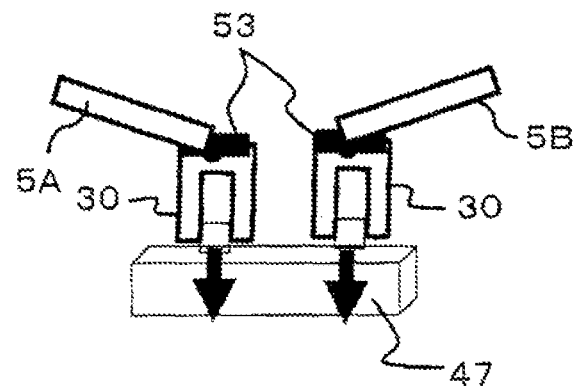
FIG. 22B is a view showing an operation of the control apparatus for a robot and a manipulation state of the robot arm by a person of the third embodiment of the present invention.
Figure 22C:
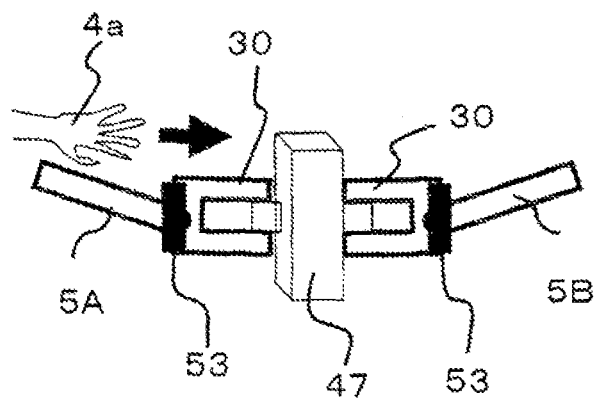
FIG. 22C is a view showing an operation of the control apparatus for a robot and a manipulation state of the robot arm by a person of the third embodiment of the present invention.
Figure 22D:
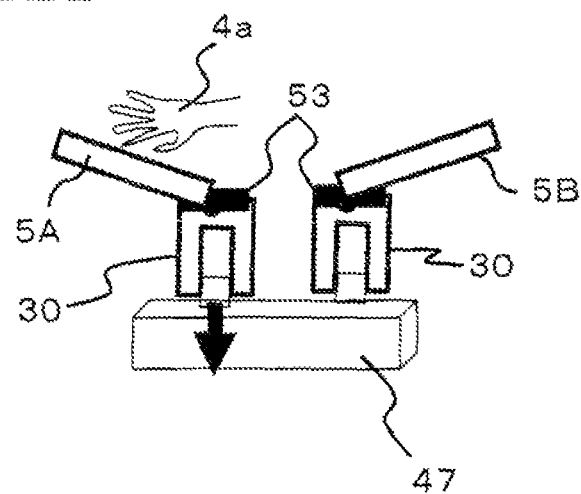
FIG. 22D is a view showing an operation of the control apparatus for a robot and a manipulation state of the robot arm by a person of the third embodiment of the present invention.

As shown in FIGS. 22A to 22D, the following description will exemplify a state in which a plurality of robot arms 5A and 5B are operated. FIG. 22A shows a job in which, for example, upon cooking, dough is rounded into balls or dough is extended, that a job in which a plurality of robot arms 5A and 5B are applying forces to an object 47 in cooperation with each other. Moreover, FIG. 22B shows a job in which, upon cooking, dough is kneaded, or, for example, upon carrying out a wiping job, forces are simultaneously applied onto a contact surface by a plurality of robot arms 5A and 5B. The following description will exemplify an arrangement in which, during such a job, as shown in FIGS. 22C and 22D, the person 4 manipulates one of the robot arm 5A of the robot arms 5A and 5B so that the degree of application of the force of the robot arms 5A and 5B is corrected.

Figure 23:
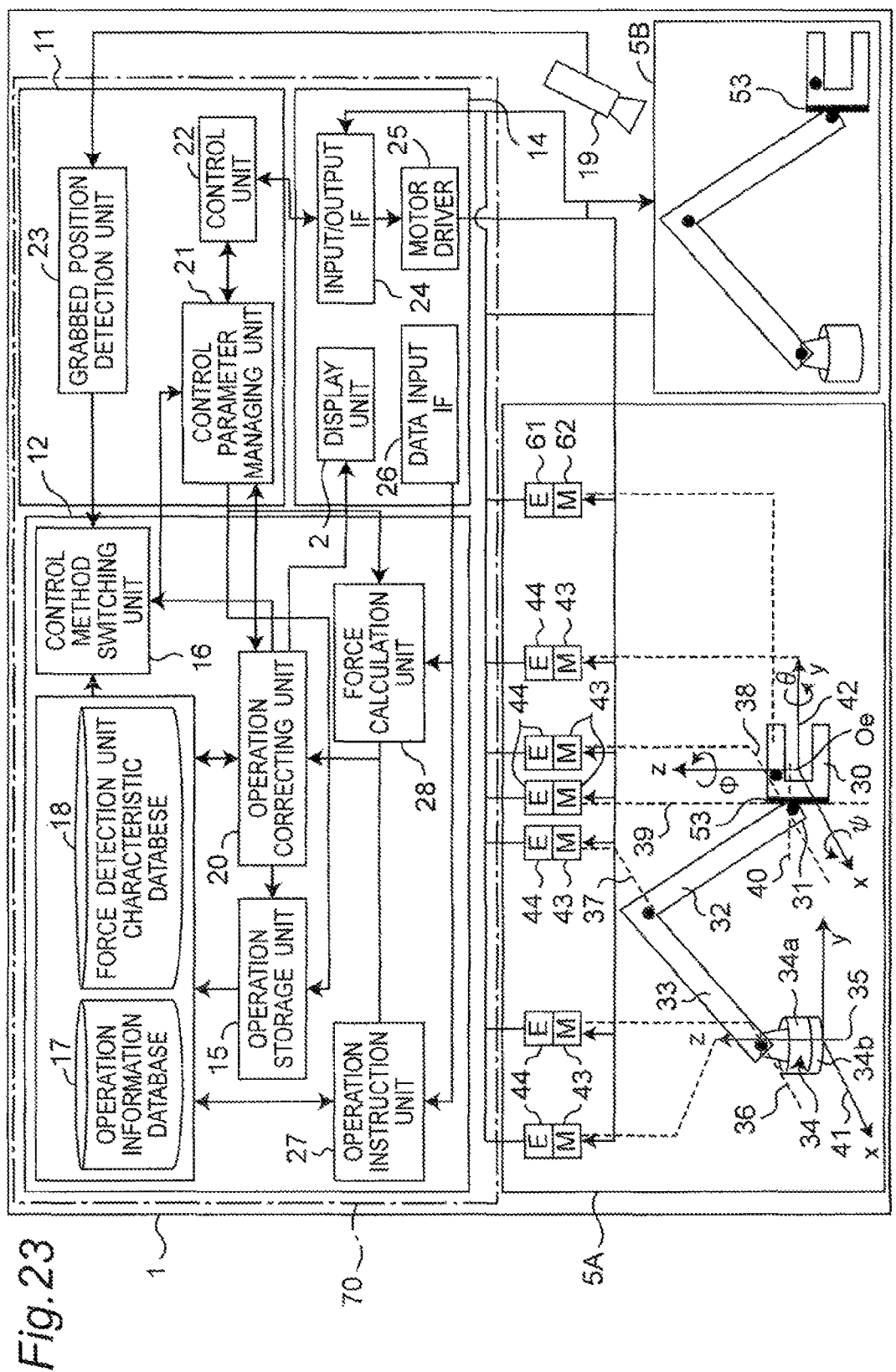
FIG. 23 is a view showing detailed structures of the control apparatus and a robot arm to be controlled that form a robot system in the third embodiment of the present invention.

FIG. 23 is a view showing specific structures of a first robot arm 5A and a second robot arm 5B that are targets to be controlled and a control apparatus 70 for the first robot arm 5A and the second robot arm 5B, which form a robot system 1 in the third embodiment. Since the respective robot arms of the first robot arm 5A and the second robot arm 5B, the operation instruction unit 27, and the peripheral apparatus 14 are the same as those of the first embodiment, the descriptions thereof will be omitted.

FIG. 24 shows an example an operation information database 17 in the third embodiment. In FIG. 24, "job IDs" are ID numbers used for identifying jobs to be carried out by a plurality of robot arms 5A and 5B. "Operation IDs" are operation ID numbers used for identifying operations of the robot arms 5A and 5B in each of the jobs. "Robot IDs" are ID numbers used for identifying the robot arms 5A and 5B, and, for example, "1" corresponds to the first robot arm 5A and "2" corresponds to the second robot arm 5B. Pieces of information, "position and orientation", "force", "flag", "hand", "time", and "correction parameter flag" are information relating to the operations of the robot arms 5A and 5B identified by the "robot IDs", and the explanations of these are the same as those of the first embodiment; therefore, the specific descriptions thereof will be omitted. "Progress information" corresponds to information that indicates whether or not operations of the respective robot arms 5A and 5B are currently being carried out.

FIG. 25A shows a force detection unit characteristic database 18 of the third embodiment. "Robot IDs" are ID numbers used for identifying a plurality of robot arms 5A and 5B. The "grabbed position ID", "presence/absence of detection", and "presence/absence of possibility of influences of a drag" represent characteristics of the force detection units of the respective robot arms 5A and 5B identified by the "robot IDs", and since the respective explanations thereof are the same as those of the first embodiment, the respective descriptions thereof will be omitted.

The operation storage unit 15 identifies the operation information corrected by the operation correcting unit 20, which will be described later, by using the "robot IDs" for each of the robot arms, and stores the resulting data in the operation information database 17.

When a person 4 grabs the robot arm 5A or the robot arm 5B, the grabbed position detection unit 23 detects which portion of the robot arm 5A or the robot arm 5B is grabbed by the person 4 to manipulate the robot arm 5. More specifically, based upon image data of the image pick-up device 19 such as a camera, the hand 4a of the manipulating person 4 is image-recognized by the grabbed position detection unit 23, and the grabbed position detection unit 23 detects which portion among the fore-arm link 32, the upper arm link 33, and the hand 30 of the robot arm 5A or the robot arm 5B is being grabbed by the person's hand 4A so as to be manipulated.

Based upon the instruction of the operation correcting unit 20 or the control method switching unit 16, the control parameter managing unit 21 switches the control mode of the robot arm 5A and the robot arm 5B, sets the tip unit position and orientation target correcting output $r_{dΔ}$ outputted by the impedance calculation unit 51 of each of the robot arms 5A and 5B, and also sets the operation information to be sent to the target track generation unit 55. The control parameter managing unit 21 receives the operation information or the instruction for switching the control method together with the "robot ID" for identifying the robot arm 5A or 5B, from the operation correcting unit or the control method switching unit 16, and an instruction is given from the control parameter managing unit 21 to the control unit 20; however, since the contents of the instruction to each of the robot arms 5A and 5B and the operations of the control unit 20 after the receipt of the instruction are the same as those of the first embodiment, the description thereof will be omitted.

Based upon the grabbed position (which position of which robot arm 5A or 5B), detected by the grabbed position detection unit 23 for each of the robot arms identified by the robot ID, and the information stored in the force detection unit characteristic database 18, the control method switching unit 16 switches the control method for use in allowing the person 4 to grab the robot arm 5A or 5B to correct the force parameter.

More specifically, in the force detection characteristic database 18 of FIG. 25A, based upon the identification ID ("robot ID" and "grabbed position ID" (with respect to the "grabbed position ID", in the same manner as in the first embodiment, the "grabbed position ID" is found from the "grabbed position" of FIG. 25B)) of the robot arm 5A or 55 detected by the grabbed position detection unit 23 and the "grabbed position. ID", the control method is determined by the flow chart of FIG. 11 in the same manner as in the first embodiment, by reference to the "presence/absence of detection" and the "presence/absence of a possibility of influences from a drag".

The force detection unit 53 detects forces at all the grabbed positions in the same method as in the first embodiment, and inputs the resulting forces to the operation correcting unit 20 through the control parameter managing unit 21.

Based upon pieces of force information detected at the grabbed positions of the robot arms 5A and 5B in the control method switching unit 16, the force calculation unit 28 calculates forces to be used for correcting operations of the respective robot arms 5A and 5B by using a force calculation method table 81.

FIG. 26A shows an example of the force calculation method table 81.

The "calculation method" in the force calculation unit 28 describes how to calculate pieces of information relating to forces (force information) to be used for correcting the operations of the robot arms 5A and 5B, from pieces of information relating to the forces (force information) of the robot arms 5A and 5B detected by the force detection unit 53. More specifically, the maximum value is calculated from the pieces of force information of the respective robot arms 5A and 5B, and in a case where this is used as a correction value for all the robot arms 5A and 5B, a description "maximum" is given thereto. Moreover, in a case where the minimum value is calculated from the pieces of force information so as to use this value as a correction value for all the robot arms 5A and 5B, a description "minimum" is given thereto. Furthermore, in a case where the average value of pieces of force information is calculated so as to use this value as a correction value for all the robot arms 5A and 5B, a description "average" is given thereto. In a case where pieces of force information are summed up so that the summed value is used as a correction value for all the robot arms 5A and 5B, a description "summed" is given thereto. Moreover, in a case where, after multiplying the pieces of force information by weight coefficients, a sum of the values is used for executing calculations, a description "weighted" is given thereto.

More specifically, the force calculation unit 28 refers to the force calculation method table 81, and executes calculations, for example, in accordance with a "calculation method", with its "flag" corresponding to "1". In the case of the force calculation method of table 81 shown in FIG. 26A, since the "summed" value is "1", the force calculation unit 28 sums up all the values of the output values of the force detection unit 63 at the grabbed positions of the respective robot arms 5A and 5B.

The "flag" corresponds to a flag for indicating which calculation method is valid among a plurality of calculation methods, and in this example, since the method for calculating the "summed" value is "1", it is indicated that the method for calculating the "summed" value in the force calculation unit 28 is valid. Therefore, pieces of force information detected by the force calculation unit 28 at the respective grabbed positions are all summed up by the force calculation unit 28. The value of the forces summed up by the force calculation unit 28 is outputted to the operation correcting unit 20.

Additionally, in a case where the "calculation method" of FIG. 26A corresponds to "weighted" value, a description is given as ("flag", "coefficient ID") as shown in FIG. 26A, and the "flag" is a flag indicating which calculation method is used for the calculations, and the "coefficient ID" corresponds to a weighting coefficient indicated by the coefficient ID shown in FIG. 26C.

As shown in FIG. 26A, in a case where the "calculation method" corresponds to "weighted" value as shown in FIG. 26A, if the coefficient ID is "4", the force calculation unit 28 preliminarily acquires the coefficient as (0.6, 0.4) from FIG. 26C, and with respect to the force values from the two robot arms 5A and 5B, based upon the coefficient, the force calculation unit 28 multiplies a force value of the first robot arm 5A detected by the force detection unit 53 by 0.6, and the force calculation unit 28 multiplies a force value of the second robot arm 53 detected by the force detection unit 53 by 0.4 so that the values obtained by respectively multiplying the coefficients are summed up by the force calculation unit 28. In the case of the three robot arms 5, the calculations can be carried out by using "3" as the "coefficient ID" of FIG. 26C.

In the operation correcting unit 20, the operation information of the operation information database 17 is corrected in the same method as that of the first embodiment, by using the corrected values of the forces calculated by the force calculation unit 28, it is possible to correct the operations to the values corrected by the person 4.

As described above, even in a case where one or more portions of a plurality of robot arms 5A and 5B are grabbed by a person 4, the force can be correctly detected by the force detection unit 53 and the force calculation unit 28. Moreover, by preparing the force calculation unit 28, even when the person grabs only one of the robot arms 5A or 5B of the robot arms 5A and 5B, and manipulates it, it becomes possible to also correct the operations of the robot arm 5B or 5A that is not being grabbed. Moreover, even in a case where the person 4 is an elder person or a child, with the force for use in correction being insufficient, the "summed" value is used in the calculation method so that a greater force can be applied. Moreover, in a case where a child and an adult are respectively grab the robot arm, by selecting the "maximum" value as the "calculation method" in the force calculation unit 28, a force applied by the adult rather than a force applied by the child can be preferentially used. Furthermore, in a case where one person 4 manipulates the robot arm by using both of the hands, by selecting "maximum" value as the "calculation method" in the force calculation unit 28, a force that is exerted by one hand that is more comfortably used with a stronger force than the other hand can be preferentially selected rather than the force to be applied by the other hand. Moreover, in a case where a plurality of positions are grabbed, by selecting the "minimum", or "averaged" or "weighted" value as the "calculation method", a safer manipulation can be obtained in order to prevent a high force being abruptly applied to cause a dangerous state.

In this example, the "summed" value is used as the "calculation method"; however, the person 4 may be allowed to input which calculation method to be selected through the data input IF 26 or the like. In this case, "1" is set to the flag of the "calculation method" inputted through the data input IF 26. Moreover, depending on the state of the person 4 to carry out manipulations (for example, depending on an elder person, a child, or the like), calculations can be carried out, while switching is made among the ID1 to ID3 on demand, for example, as shown in FIG. 26B. In this case, an ID used for identifying whether "an elder person" or "a child" or the like may be inputted, or the age of the operator may be inputted by using the data input IF 26 so that, if he or she is 65 years old or more, the determination is made as "an elder person", while, if he or she is 15 years old or less, the determination is made as "a child" by the force calculation unit 28 so that it is possible to detect whether the person is an elderly person or a child.

Moreover, in the first to third embodiments, explanations have been given by exemplifying the robot arm 5; however, not limited to the arm, the present invention may be applied to a moving robot that is moved by wheels, or a walking robot with two legs, or a walking robot with multiple legs, or the like, and, the same effects are exerted in relation to contact between the moving robot or the like and the human being.

Moreover, in the first to third embodiments, as one example of the operation information acquiring unit, the operation information database 17 has been exemplified; however, not limited to the database, as the operation information acquiring unit, another means may be used in which the information can be acquired by using a net work or the like from a database stored in another device such as a server, as long as it has a function for acquiring operation information relating to the operations of the robot arm.

Moreover, in the first to third embodiments, the force detection unit characteristic database 18 has been exemplified as one example of the characteristic information acquiring unit; however, not limited to the database, as the characteristic information acquiring unit, another means may be used in which the information can be acquired by using a net work or the like from a database stored in another device such as a server, as long as it has a function for acquiring information relating to the presence/absence of a force detection at the time when the person grabs the robot arm at the grabbed position detected by the grabbed position detection unit, and characteristic information relating to the presence/absence of a possibility of influences from a drag from the contact surface when the job is carried out by the robot arm while being grabbed by the person at the grabbed position.

By properly combining the arbitrary embodiments of the aforementioned various embodiments, the effects possessed by the embodiments can be produced.

INDUSTRIAL APPLICABILITY

The present invention can be effectively utilized as a control apparatus and a control method for a robot arm, a robot having the control apparatus for a robot arm, a control program for a robot arm, and an integrated electronic circuit for a robot arm that are used for controlling operations of a robot arm upon carrying out a job by a person and the robot such as a house-service robot in cooperation with each other. Moreover, not limited to the house-service robot, the present invention can be applied to industrial robots, or a control apparatus and a control method for a robot arm in a movable mechanism in a production facility or the like, or a robot having a control apparatus for the robot arm, or a control program and an integrated circuit for a robot arm.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A control apparatus for a robot arm, which controls an operation of the robot arm so as to carry out a job by using the robot arm, comprising:
    an operation information acquiring unit that acquires operation information relating to the operation of the robot arm, the operation information including a force component;
    a force detection unit that detects a force externally applied to the robot arm;
    a grabbed position detection unit that, when a person grabs the robot arm, detects a grabbed position indicating a portion of the robot arm grabbed by the person, the portion of the robot arm grabbed by the person being a portion of the robot arm where the force detection unit is not available to detect a force externally applied to the robot arm by the person;
    a characteristic information acquiring unit that acquires pieces of characteristic information including (i) information relating to whether or not the force detection unit is available to detect the force externally applied to the robot arm by the person at a time when the person grabs the robot arm at the grabbed position detected by the grabbed position detection unit and (ii) information relating to whether or not there is a possibility that the force detection unit receives influences of a drag from a contact surface when the robot arm is manipulated while being grabbed by the person at the grabbed position;

a control method switching unit that switches control methods of the robot arm using (i) the grabbed position detected by the grabbed position detection unit, (ii) the information relating to whether or not the force detection unit is available to detect the force externally applied to the robot arm by the person acquired by the characteristic information acquiring unit, and (iii) the information relating to whether or not there is the possibility that the force detection unit receives the drag from the contact surface acquired by the characteristic information acquiring unit; and an operation correcting unit that, during the operation of the robot arm based upon the operation information acquired by the operation information acquiring unit, corrects a value of the force component of the operation information acquired by the operation information acquiring unit by using a manipulation of the robot arm by the person and the switched control methods of the robot arm by the control method switching unit, wherein, based upon the operation information corrected by the operation correcting unit, the operation of the robot arm is controlled.

2. The control apparatus for a robot arm according to claim 1, wherein the control method switching unit switches from a first control method for controlling the operation of the robot arm to a second control method for controlling the operation of the robot arm, the second control method being any one of the following control methods:
   (I) a control method for controlling the operation of the robot arm so that the robot arm is moved by a force externally applied to the robot arm by the person;
   (II) a control method for controlling the operation of the robot arm so as not to be moved by a force externally applied to the robot arm by the person; and
   (III) a control method for controlling the operation of the robot arm by using the first control method, and wherein, in a case of the second control method being the control method of (I), the force detection unit detects the force externally applied to the robot arm during the manipulation of the robot arm by the person or detects the force externally applied to the robot arm by using the drag from the contact surface when the robot arm directly or indirectly collides with the contact surface during the manipulation of the robot arm by the person, and wherein, in a case of the second control method being the control method of (II) or being the control method of (III), the force detection unit detects the force externally applied to the robot arm upon application of the force externally applied to the robot arm by the person.

3. The control apparatus for a robot arm according to claim 1, wherein the control method switching unit switches from a first control method for controlling the operation of the robot arm to a second control method for controlling the operation of the robot arm, the second control method being to any one of the following control methods:

(I) in a case where the characteristic information contains (i) information indicating that there is not a possibility that the force detection unit receives influences of the drag from the contact surface (ii) information indicating that the force detection unit is available to detect the force externally applied to the robot arm by the person, a control method for controlling the operation of the robot arm by using the first control method or a control method for controlling the operation of the robot arm so as not to be moved by a force externally applied to the robot arm by the person;

(II) in a case where the characteristic information contains (i) information indicating that there is the possibility that the force detection unit receives influences of the drag from the contact surface (ii) information indicating that the force detection unit is available to detect the force externally applied to the robot arm by the person, a control method for controlling the operation of the robot arm so that, upon application of a force externally applied to the robot arm by the person, the robot arm is prevented from being moved to directly or indirectly collide with the contact surface;

(III) in a case where the characteristic information contains (i) information indicating that there is the possibility that the force detection unit receives influences of the drag from the contact surface (ii) information indicating that the force detection unit is not available to detect the force externally applied to the robot arm by the person a control method for controlling the operation of the robot arm so that the robot arm is moved by the force externally applied to the robot arm by the person.

4. The control apparatus for a robot arm according to claim 1, wherein, upon detection of a plurality of grabbed positions by the grabbed position detection unit, the control method switching unit successively switches from a first control method for controlling the operation of the robot arm to a second control method for controlling the operation of the robot arm, the second control method being any one of the following control methods:
   (I) a control method for controlling the operation of the robot arm so that the robot arm is moved by a force externally applied to the robot arm by the person;
   (II) a control method for controlling the operation of the robot arm so as not to be moved by a force externally applied to the robot arm by the person; and
   (III) a control method for controlling the operation of the robot arm by using the first control method, wherein the control apparatus further comprises a force calculation unit, which, based upon a plurality of values detected at the grabbed positions by the force detection unit in each of the successively switched control methods, calculates a value of the force externally applied to the robot arm by the person, and wherein an operation correcting unit corrects the value of the force component operation information of the operation information database, by using the value of the force calculated by the force calculation unit.

5. The control apparatus for a robot arm according to claim 4, wherein the force calculation unit calculates the value of the force externally applied to the robot arm by the person by using any one of the following calculation methods:

(I) a method for calculating a sum of the plurality of values detected at the grabbed positions by the force detection unit in each of the successively switched control methods;

(II) a method for calculating a minimum value among the plurality of values detected at the grabbed positions by the force detection unit in each of the successively switched control methods;

(III) a method for calculating a maximum value among the plurality of values detected at the grabbed positions by the force detection unit in each of the successively switched control methods; and (IV) a method in which, by multiplying each of the plurality of values detected at the grabbed positions by the force detection unit in each of the successively switched control methods by a weighting coefficient, and then summing up resulting values, and wherein the operation correcting unit corrects the value of the force component of the operation information acquired by the operation information acquiring unit, based upon the value calculated by the force calculation unit.

6. A control apparatus for robot arms, comprising:
a plurality of robot arms, which are controlled by the control apparatus according to claim 1,
wherein the grabbed position detection unit detects which robot arm of the plurality of robot arms is being grabbed by the person,
wherein the force detection unit is included in one of the plurality of robot arms,
wherein in a case where the robot arm of the plurality of robot arms being grabbed by the person is the one of the plurality of robot arms in which the force detection unit is installed, the force detection unit detects a force externally applied by the person to the robot arm of the plurality of robot arms being grabbed by the person, and
wherein the control apparatus further comprises a force calculation unit, that calculates a value for use in correcting another robot arm that is not being grabbed by the person, based upon a value of the force detected by the force detection unit,
wherein the operation correcting unit corrects the force component of the operation information acquired by the operation information acquiring unit, based upon the value calculated by the force calculation unit.

7. The control apparatus for robot arms according to claim 6,
wherein in a case where a plurality of forces are detected by the force detection unit, the force calculation unit calculates the value for use in correction using any one of the following calculation methods:

(I) a method for calculating a sum of values of the plurality of forces detected by the force detection unit;

(II) a method for calculating a minimum value among the values of the plurality of forces detected by the force detection unit;

(III) a method for calculating a maximum value among the values of the plurality of forces detected by the force detection unit;

(IV) a method in which, by multiplying each of the values of the plurality of forces detected by the force detection unit by a weighting coefficient, and then summing up resulting values, and
wherein the operation correcting unit corrects pieces of operation information relating to all of the plurality of robot arms acquired by the operation information acquiring unit, based upon the value calculated by the force calculation unit.

8. The control apparatus for a robot arm according to claim 2,
wherein, upon switching from the first method to the second method where the second method is the method for controlling the operation of the robot arm so as not to be moved by a force externally applied to the robot arm by the person, the first control method and the second control method are alternatively switched with each other, and
wherein when the first control method and the second control method are alternatively switched with each other, the force detection unit detects the force.

9. A control method for a robot arm, which controls an operation of a robot arm so that a job is carried out by the robot arm, comprising:
acquiring operation information relating to the operation of the robot arm by using an information acquiring unit, the operation information including a force component;
detecting a force externally applied to the robot arm using a force detection unit;
when a person grabs the robot arm, detecting, using a grabbed position detection unit, a grabbed position indicating a portion of the robot arm grabbed by the person, the portion of the robot arm grabbed by the person being a portion of the robot arm where the force detection unit is not available to detect a force externally applied to the robot arm by the person;
acquiring, a characteristic information acquiring unit, pieces of characteristic information including (i) information relating to whether or not the force detection unit is available to detect the force externally applied to the robot arm by the persona, at a time when the person grabs the robot arm at the grabbed position detected by the grabbed position detection unit and (ii) information relating to whether or not there is a possibility that the force detection unit receives influences of a drag from a contact surface when the robot arm is manipulated while being grabbed by the person at the grabbed position;
switching, using a control method switching unit, control methods of the robot arm using (i) the grabbed position detected by the grabbed position detection unit, (ii) the information relating to whether or not the force detection unit is available to detect the force externally applied to the robot arm by the person acquired by the characteristic information acquiring unit, and (iii) the information relating to whether or not there is the possibility that the force detection unit receives the drag from the contact surface acquired by the characteristic information acquiring unit;
during the operation of the robot arm based upon the operation information acquired by the operation information acquiring unit, correcting, using an operation correcting unit, a value of the force component of the operation information acquired by the operation information acquiring unit by using a manipulation of the robot arm by the person and the switching control methods of the robot arm by the control method switching unit;
based upon the operation information corrected by the operation correcting unit, controlling the operation of the robot arm.

10. A robot comprising:
a robot arm; and
a control apparatus for a robot arm, disclosed in claim 1, for use in controlling the operation of the robot arm.

11. A non-transitory computer readable recording medium having stored thereon a control program for a robot arm, which controls an operation of a robot arm so that a job is carried out by the robot arm, wherein, when executing, causes a computer to perform a method comprising:
- acquiring operation information relating to the operation of the robot arm by using an information acquiring unit, the operation information including a force component;
- detecting a force externally applied to the robot arm using a force detection unit;
- when a person grabs the robot arm, detecting, using a grabbed position detection unit, a grabbed position indicating a portion of the robot arm grabbed by the person, the portion of the robot arm grabbed by the person being a portion of the robot arm where the force detection unit is not available to detect a force externally applied to the robot arm by the person;
- acquiring, using a characteristic information acquiring unit, pieces of characteristic information including (i) information relating to whether or not the force detection unit is available to detect the force externally applied to the robot arm by the person, at a time when the person grabs the robot arm at the grabbed position detected by the grabbed position detection unit and (ii) information relating to whether or not there is a possibility that the force detection unit receives influences of a drag from a contact surface when the robot arm is manipulated while being grabbed by the person at the grabbed position;
- switching, using a control method switching unit, control methods of the robot arm using (i) the grabbed position detected by the grabbed position detection unit, (ii) the information relating to whether or not the force detection unit is available to detect the force externally applied to the robot arm by the person acquired by the characteristic information acquiring unit, and (iii) the information relating to whether or not there is the possibility that the force detection unit receives the drag from the contact surface acquired by the characteristic information acquiring unit;
- during the operation of the robot arm based upon the operation information acquired by the operation information acquiring unit, correcting, using an operation correcting unit, a value of the force component of the operation information acquired by the operation information acquiring unit by using a manipulation of the robot arm by the person and the switching control methods of the robot arm by the control method switching unit;
- based upon the operation information corrected by the operation correcting unit, controlling the operation of the robot arm.

12. An integrated electronic circuit for a robot arm, which controls an operation of a robot arm so that a job is carried out by the robot arm, comprising:
- an operation information acquiring unit that acquires operation information relating to the operation of the robot arm, the operation information including a force component;
- a force detection unit that detects a force externally applied to the robot arm;
- a grabbed position detection unit that, when a person grabs the robot arm, detects a grabbed position indicating a portion of the robot arm grabbed by the person, the portion of the robot arm grabbed by the person being a portion of the robot arm where the force detection unit is not available to detect a force externally applied to the robot arm by the person;
- a characteristic information acquiring unit that acquires pieces of characteristic information including (i) information relating to whether or not the force detection unit is available to detect the force externally applied to the robot arm by the person at a time when the person grabs the robot arm at the grabbed position detected by the grabbed position detection unit and (ii) information relating to whether or not there is a possibility that the force detection unit receives influences of a drag from a contact surface when the robot arm is manipulated while being grabbed by the person at the grabbed position;
- a control method switching unit that switches control methods of the robot arm using (i) the grabbed position detected by the grabbed position detection unit, (ii) the information relating to whether or not the force detection unit is available to detect the force externally applied to the robot arm by the person acquired by the characteristic information acquiring unit, and (iii) the information relating to whether or not there is the possibility that the force detection unit receives the drag from the contact surface acquired by the characteristic information acquiring unit; and
- an operation correcting unit that, during the operation of the robot arm based upon the operation information acquired by the operation information acquiring unit, corrects a value of the force component of the operation information acquired by the operation information acquiring unit by using a manipulation of the robot arm by the person and the switched control methods of the robot arm by the control method switching unit,
- wherein, based upon the operation information corrected by the operation correcting unit, the operation of the robot arm is controlled.

13. A robot comprising:
a robot arm; and
a control apparatus for a robot arm, disclosed in claim 2, for use in controlling the operation of the robot arm.

14. A robot comprising:
a robot arm; and
a control apparatus for a robot arm, disclosed in claim 3, for use in controlling the operation of the robot arm.

15. A robot comprising:
a robot arm; and
a control apparatus for a robot arm, disclosed in claim 4, for use in controlling the operation of the robot arm.

16. A robot comprising:
a robot arm; and
a control apparatus for a robot arm, disclosed in claim 5, for use in controlling the operation of the robot arm.

17. A robot comprising:
a robot arm; and
a control apparatus for a robot arm, disclosed in claim 6, for use in controlling the operation of the robot arm.

18. A robot comprising:
a robot arm; and
a control apparatus for a robot arm, disclosed in claim 7, for use in controlling the operation of the robot arm.

19. The control apparatus for a robot arm according to claim 1,
wherein the grabbed position detection unit detects the grabbed position based on image data obtained by an image pick-up device.

* * * * *